(12) United States Patent
Przybylski et al.

(10) Patent No.: US 11,592,792 B2
(45) Date of Patent: Feb. 28, 2023

(54) ENERGY CONTROL SYSTEM WITH ENERGY PROVIDER LEVEL DEMAND OPTIMIZATION

(71) Applicant: Johnson Controls Technology Company, Auburn Hills, MI (US)

(72) Inventors: Andrew J. Przybylski, Franksville, WI (US); Michael J. Wenzel, Grafton, WI (US); John H. Burroughs, Wauwatosa, WI (US); Matthew J. Ellis, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 21 days.

(21) Appl. No.: 16/775,966

(22) Filed: Jan. 29, 2020

(65) Prior Publication Data
US 2020/0241491 A1    Jul. 30, 2020

Related U.S. Application Data

(60) Provisional application No. 62/799,005, filed on Jan. 30, 2019.

(51) Int. Cl.
*G05B 13/04* (2006.01)
*G06Q 50/06* (2012.01)

(52) U.S. Cl.
CPC ......... *G05B 13/048* (2013.01); *G05B 13/047* (2013.01); *G06Q 50/06* (2013.01); *G05B 2219/2642* (2013.01)

(58) Field of Classification Search
CPC .... G05B 13/047; G05B 13/048; G05B 15/02; G05B 2219/2642; G06Q 50/06; G06Q 30/02; G06Q 30/0202; G06Q 10/04; Y02P 80/10; H04L 29/08486; H04L 67/1082

See application file for complete search history.

(56) References Cited

U.S. PATENT DOCUMENTS

| | | |
|---|---|---|
| 5,414,640 A | 5/1995 | Seem |
| 7,580,775 B2 | 8/2009 | Kulyk et al. |
| 7,894,946 B2 | 2/2011 | Kulyk et al. |
| 8,527,108 B2 | 9/2013 | Kulyk et al. |

(Continued)

OTHER PUBLICATIONS

U.S. Appl. No. 16/555,591, filed Aug. 29, 2019, Johnson Controls Technology Company.

(Continued)

*Primary Examiner* — M. N. Von Buhr
(74) *Attorney, Agent, or Firm* — Foley & Lardner LLP

(57) ABSTRACT

A method for controlling production of one or more refined resources by an energy provider includes predicting a demand for the refined resources by one or more consumers of the refined resources as a function of an incentive offered by the energy provider. The method further includes performing an optimization of an objective function subject to a constraint based on the predicted demand for the refined resources to determine an amount of the refined resources for the energy provider to produce and a value of the incentive at multiple times within a time period. The method also includes providing setpoints for equipment of the energy provider that cause the equipment to produce the amount of the refined resources determined by performing the optimization.

20 Claims, 33 Drawing Sheets

(56) References Cited

U.S. PATENT DOCUMENTS

| | | |
|---|---|---|
| 8,527,109 B2 | 9/2013 | Kulyk et al. |
| 8,918,223 B2 | 12/2014 | Kulyk et al. |
| 9,110,647 B2 | 8/2015 | Kulyk et al. |
| 9,235,657 B1 | 1/2016 | Wenzel et al. |
| 9,429,923 B2 | 8/2016 | Ward et al. |
| 9,436,179 B1 | 9/2016 | Turney et al. |
| 9,612,601 B2 | 4/2017 | Beyhaghi et al. |
| 9,703,339 B2 | 7/2017 | Kulyk et al. |
| 9,778,639 B2 | 10/2017 | Boettcher et al. |
| 9,798,336 B2 | 10/2017 | Przybylski |
| 9,852,481 B1 | 12/2017 | Turney et al. |
| 10,007,259 B2 | 6/2018 | Turney et al. |
| 10,088,814 B2 | 10/2018 | Wenzel et al. |
| 10,101,730 B2 | 10/2018 | Wenzel et al. |
| 10,139,877 B2 | 11/2018 | Kulyk et al. |
| 10,157,399 B2 * | 12/2018 | Okabe ............... G06Q 30/0206 |
| 10,175,681 B2 | 1/2019 | Wenzel et al. |
| 10,190,789 B2 | 1/2019 | Mueller et al. |
| 10,282,796 B2 | 5/2019 | Elbsat et al. |
| 10,324,483 B2 | 6/2019 | Elbsat |
| 10,359,748 B2 | 7/2019 | Elbsat et al. |
| 10,386,820 B2 | 8/2019 | Wenzel et al. |
| 10,452,034 B2 | 10/2019 | Vitullo et al. |
| 2011/0035073 A1 * | 2/2011 | Ozog .................... H02J 3/003 700/291 |
| 2011/0106328 A1 * | 5/2011 | Zhou .................... G05B 13/024 700/291 |
| 2012/0078687 A1 * | 3/2012 | Ghosh ............... G06Q 30/0207 705/14.1 |
| 2012/0185106 A1 * | 7/2012 | Ghosh .................... G06Q 10/04 700/291 |
| 2012/0310860 A1 * | 12/2012 | Kim .................. G06Q 30/0202 705/412 |
| 2014/0148963 A1 * | 5/2014 | Ozog .................... G06Q 50/06 700/291 |
| 2014/0172503 A1 * | 6/2014 | Hammerstrom ....... G05B 15/02 705/7.31 |
| 2014/0188295 A1 * | 7/2014 | Saito .................... G06Q 50/06 700/291 |
| 2015/0316907 A1 | 11/2015 | Elbsat et al. |
| 2017/0102162 A1 * | 4/2017 | Drees ....................... H02J 3/32 |
| 2017/0102433 A1 * | 4/2017 | Wenzel .................... H02J 3/32 |
| 2017/0103483 A1 * | 4/2017 | Drees ..................... H02J 15/00 |
| 2017/0177766 A1 * | 6/2017 | Song ..................... H02J 7/0029 |
| 2017/0278039 A1 * | 9/2017 | Saito .................... G06Q 30/08 |
| 2018/0004171 A1 | 1/2018 | Patel et al. |
| 2018/0004172 A1 | 1/2018 | Patel et al. |
| 2018/0075549 A1 | 3/2018 | Turney et al. |
| 2018/0254632 A1 * | 9/2018 | Elbsat .................... H02J 3/382 |
| 2018/0285800 A1 | 10/2018 | Wenzel et al. |
| 2018/0357577 A1 | 12/2018 | Elbsat et al. |
| 2019/0079473 A1 | 3/2019 | Kumar et al. |
| 2019/0139159 A1 * | 5/2019 | Sarker ..................... G06Q 30/08 |
| 2019/0155227 A1 * | 5/2019 | Song ........................ H02J 3/14 |
| 2019/0324487 A1 | 10/2019 | Elbsat et al. |
| 2021/0209532 A1 * | 7/2021 | Wenzel ..................... H02J 3/00 |

OTHER PUBLICATIONS

U.S. Appl. No. 16/684,371, filed Aug. 29, 2019, Johnson Controls Technology Company.

Ward et al., "Beyond Comfort—Managing the Impact of HVAC Control on the Outside World," Proceedings of Conference: Air Conditioning and the Low Carbon Cooling Challenge, Cumberland Lodge, Windsor, UK, London: Network for Comfort and Energy Use in Buildings, http://nceub.org.uk, Jul. 27-29, 2008, 15 pages.

* cited by examiner

# ENERGY CONTROL SYSTEM WITH ENERGY PROVIDER LEVEL DEMAND OPTIMIZATION

CROSS-REFERENCE TO RELATED PATENT APPLICATION

This application claims the benefit of and priority to U.S. Provisional Patent Application No. 62/799,005 filed Jan. 30, 2019, incorporated herein by reference in its entirety.

BACKGROUND

The present disclosure relates to energy and temperature control for a building. More specifically, the present disclosure relates to energy and temperature control for a building from an energy provider perspective. Customers frequently use excessive amounts of energy which causes power plants to operate to meet the energy consumption of the customers. At demand times of day, the power plants operate at high loads to meet the energy consumption of the customers. It would be advantageous for an energy provider to have a system which can determine optimal energy distribution and setpoint control of the customers to minimize cost incurred by the energy provider and improve customer efficiency, and can adjust customer setpoints to cause the customer sub-plants to operate such that the cost incurred by the energy provider is minimized.

SUMMARY

One implementation of the present disclosure is a method for controlling production of one or more refined resources by an energy provider, according to some embodiments. The method includes predicting a demand for the refined resources by one or more consumers of the refined resources as a function of an incentive offered by the energy provider, according to some embodiments. The method further includes performing an optimization of an objective function subject to a constraint based on the predicted demand for the refined resources to determine an amount of the refined resources for the energy provider to produce and a value of the incentive at multiple times within a time period. In some embodiments, the method includes providing setpoints for equipment of the energy provider that cause the equipment to produce the amount of the refined resources determined by performing the optimization.

In some embodiments, predicting the demand for the refined resources by the consumers of the refined resources includes obtaining a model that relates the demand for the refined resources by the consumers of the refined resources to the value of the incentive. In some embodiments, performing the optimization of the objective function subject to the constraint based on the predicted demand includes performing the optimization subject to a constraint based on the model. In some embodiments, the amount of the refined resources for the energy provider to produce and the value of the incentive are decision variables in the optimization.

In some embodiments, the incentive includes a monetary award provided from the energy provider to the consumers of the refined resources in exchange for the consumers of the refined resources reducing the demand for the refined resources.

In some embodiments, the objective function accounts for an incentive cost predicted to be incurred by the energy provider as a result of offering the incentive. In some embodiments, the incentive cost is based on the value of the incentive at the multiple times within the time period.

In some embodiments, the objective function accounts for a raw resource cost of raw resources consumed by the energy provider to produce the refined resources. In some embodiments, the raw resource cost is based on a time-varying price of the raw resources over the time period.

In some embodiments, the objective function accounts for a refined resource revenue gained by the energy provider in exchange for providing the refined resources to the consumers of the refined resources.

In some embodiments, the constraint is based on the predicted demand for the refined resources requires the amount of the refined resources for the energy provider to produce to meet or exceed the demand for the refined resources by the consumers of the refined resources.

In some embodiments, the constraint is based on the predicted demand for the refined resources and requires the amount of the refined resources for the energy provider to produce to be equal to a summation. In some embodiments, the summation includes the demand for the refined resources by the consumers of the refined resources, and an amount of the refined resources to be stored in one or more resource storage devices.

In some embodiments, providing setpoints for the equipment of the energy provider includes operating the equipment of the energy provider to produce the amount of the refined resources determined by performing the optimization.

Another implementation of the present disclosure is a system for controlling production of one or more refined resources by an energy provider, according to some embodiments. In some embodiments, the system includes one or more processing circuits. The one or more processing circuits are configured to predict a demand for the refined resources by one or more consumers of the refined resources as a function of an incentive offered by the energy provider, according to some embodiments. The one or more processing circuits are configured to perform an optimization of an objective function subject to a constraint based on the predicted demand for the refined resources to determine an amount of the refined resources for the energy provider to produce and a value of the incentive at multiple times within a time period. The one or more processing circuits are configured to provide setpoints for equipment of the energy provider that cause the equipment to produce the amount of the refined resources determined by performing the optimization.

In some embodiments, the one or more processing circuits are configured to obtain a model that relates the demand for the refined resources by the consumers of the refined resources to the value of the incentive to predict the demand for the refined resources. In some embodiments, the one or more processing circuits are configured to perform the optimization subject to a constraint based on the model. In some embodiments, the amount of the refined resources for the energy provider to produce and the value of the incentive are decision variables in the optimization.

In some embodiments, the incentive includes a monetary award provided from the energy provider to the consumers of the refined resources in exchange for the consumers of the refined resources reducing the demand for the refined resources.

In some embodiments, the objective function accounts for an incentive cost predicted to be incurred by the energy provider as a result of offering the incentive. In some embodiments, the incentive cost is based on the value of the incentive at the multiple times within the time period.

In some embodiments, the objective function accounts for a raw resource cost of raw resources consumed by the energy provider to produce the refined resources. In some embodiments, the raw resource cost is based on a time-varying price of raw resources over the time period.

In some embodiments, the objective function accounts for a refined resource revenue gained by the energy provider in exchange for providing the refined resources to the consumers of the refined resources.

In some embodiments, the constraint based on the predicted demand for the refined resources requires the amount of the refined resources for the energy provider to produce to meet or exceed the demand for the refined resources by the consumers of the refined resources.

In some embodiments, the constraint based on the predicted demand for the refined resources requires the amount of the refined resources for the energy provider to produce to be equal to a summation. In some embodiments, the summation includes the demand for the refined resources by the consumers of the raw resources, and an amount of the refined resources to be stored in one or more resource storage devices.

In some embodiments, the one or more processing circuits are configured to operate the equipment of the energy provider to produce the amount of the refined resources determined by performing the optimization.

Another implementation of the present disclosure is a method for controlling production of one or more refined resources by an energy provider, according to some embodiments. In some embodiments, the method includes predicting a demand for the refined resources by one or more consumers of the refined resources as a function of an incentive offered by the energy provider. In some embodiments, the method includes determining an amount of the refined resources for the energy provider to produce and a value of the incentive at multiple times within a time period based on the predicted demand for the refined resources. In some embodiments, the method includes providing setpoints for equipment of the energy provider that cause the equipment to produce the amount of the refined resources determined by performing the optimization.

In some embodiments, predicting the demand for the refined resources by the consumers of the refined resources includes obtaining a model that relates the demand for the refined resources by the consumers of the refined resources to the value of the incentive. In some embodiments, determining the amount of the refined resources for the energy provider to produce and the value of the incentive includes performing an optimization of an objective function subject a constraint based on the model. In some embodiments, the amount of the refined resources for the energy provider to produce and the value of the incentive are decision variables in the optimization.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
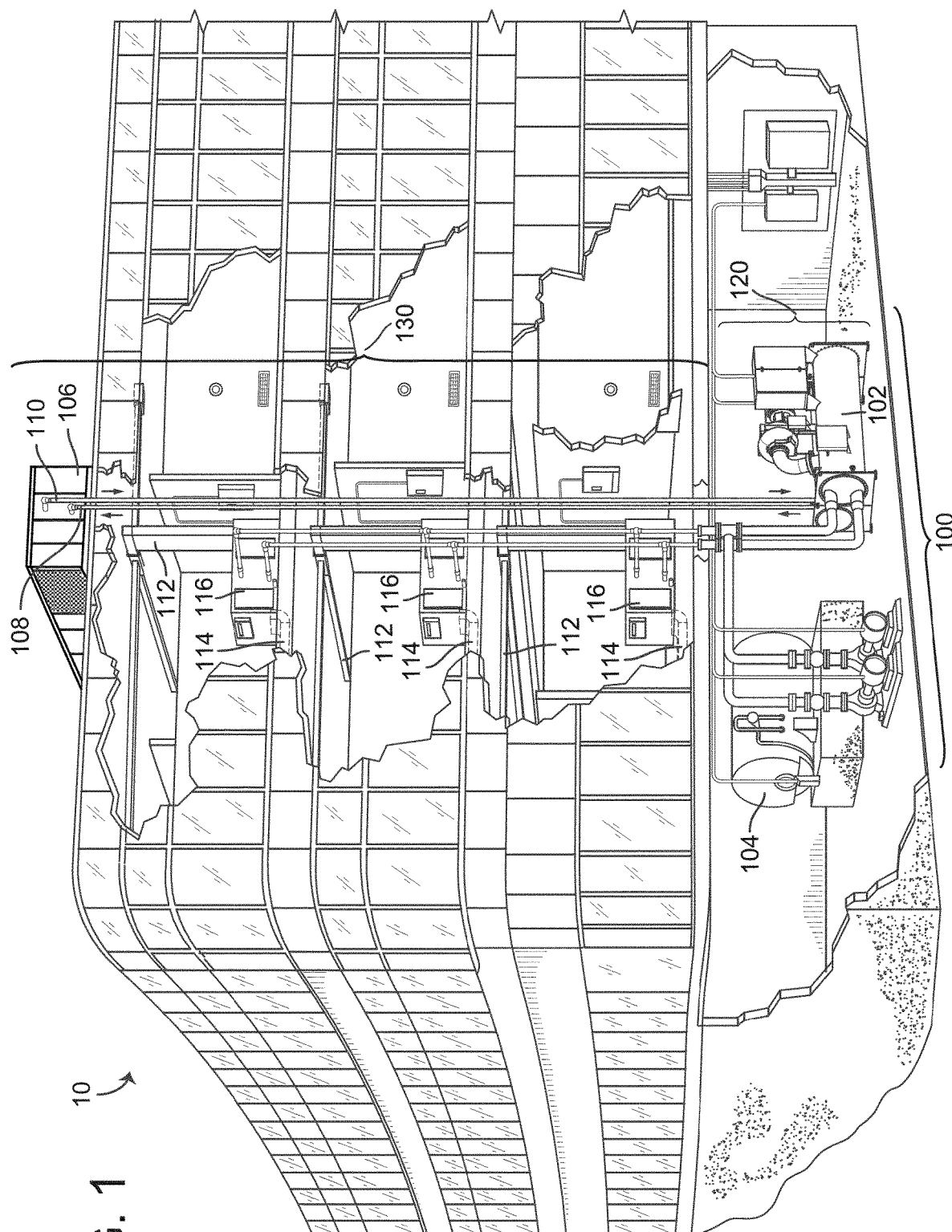
FIG. 1 is a drawing of a building equipped with a HVAC system, according to an exemplary embodiment.

Referring generally to the FIGURES, a central plant with an asset allocator and components thereof are shown, according to various exemplary embodiments. The asset allocator can be configured to manage energy assets such as central plant equipment, battery storage, and other types of equipment configured to serve the energy loads of a building. The asset allocator can determine an optimal distribution of heating, cooling, electricity, and energy loads across different subplants (i.e., equipment groups) of the central plant capable of producing that type of energy.

In some embodiments, the asset allocator is configured to control the distribution, production, storage, and usage of resources in the central plant. The asset allocator can be configured to minimize the economic cost (or maximize the economic value) of operating the central plant over a duration of an optimization period. The economic cost may be defined by a cost function $J(x)$ that expresses economic cost as a function of the control decisions made by the asset allocator. The cost function $J(x)$ may account for the cost of resources purchased from various sources, as well as the revenue generated by selling resources (e.g., to an energy grid) or participating in incentive programs.

The asset allocator can be configured to define various sources, subplants, storage, and sinks. These four categories of objects define the assets of a central plant and their interaction with the outside world. Sources may include commodity markets or other suppliers from which resources such as electricity, water, natural gas, and other resources can be purchased or obtained. Sinks may include the requested loads of a building or campus as well as other types of resource consumers. Subplants are the main assets of a central plant. Subplants can be configured to convert resource types, making it possible to balance requested loads from a building or campus using resources purchased from the sources. Storage can be configured to store energy or other types of resources for later use.

In some embodiments, the asset allocator performs an optimization process determine an optimal set of control decisions for each time step within the optimization period. The control decisions may include, for example, an optimal amount of each resource to purchase from the sources, an optimal amount of each resource to produce or convert using the subplants, an optimal amount of each resource to store or remove from storage, an optimal amount of each resource to sell to resources purchasers, and/or an optimal amount of each resource to provide to other sinks. In some embodiments, the asset allocator is configured to optimally dispatch all campus energy assets (i.e., the central plant equipment) in order to meet the requested heating, cooling, and electrical loads of the campus for each time step within the optimization period. These and other features of the asset allocator are described in greater detail below.

Building and HVAC System

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. An example of a BMS which can be used to monitor and control building 10 is described in U.S. patent application Ser. No. 14/717,593 filed May 20, 2015, the entire disclosure of which is incorporated by reference herein.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant

Figure 2:
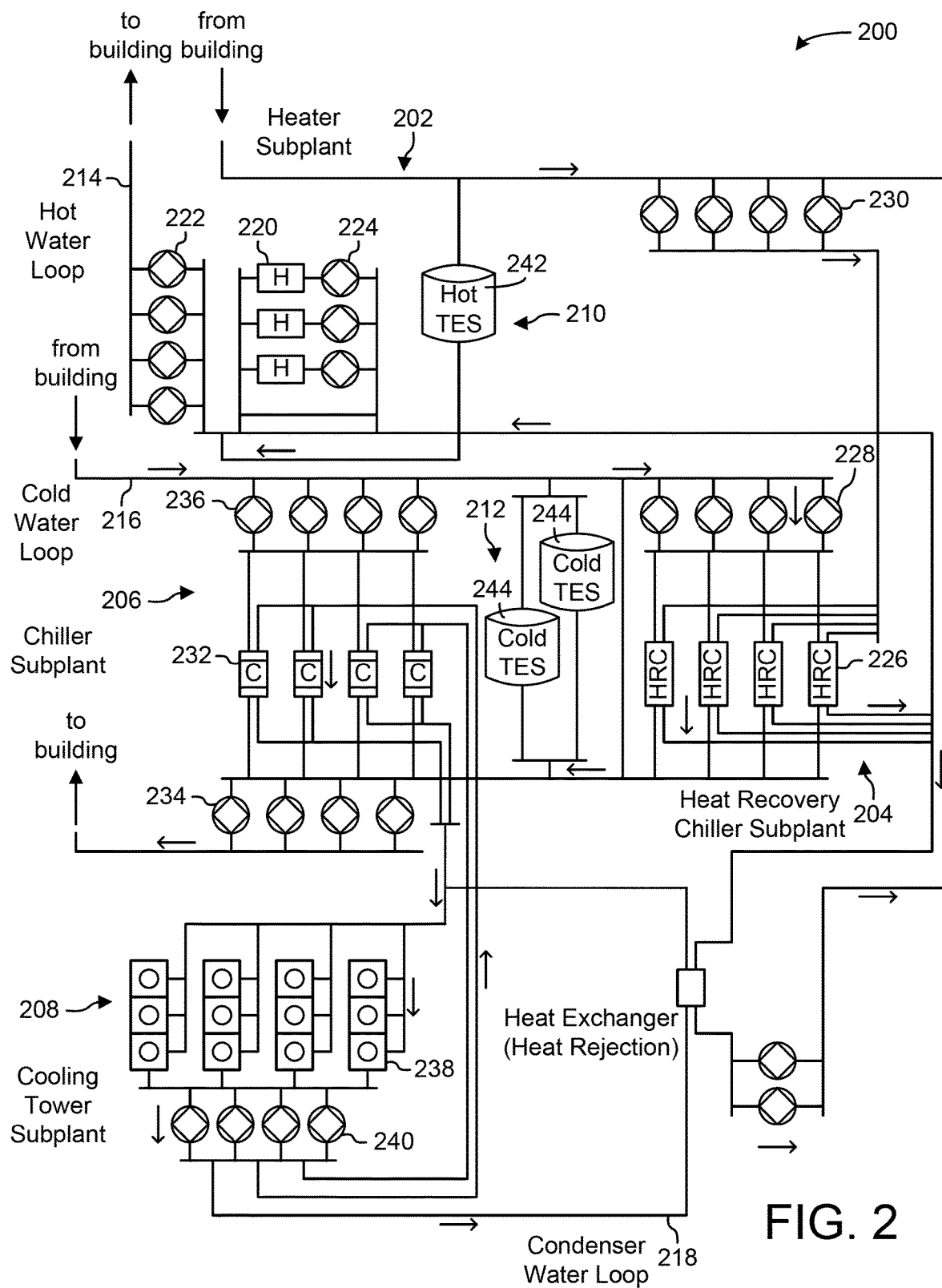
FIG. 2 is a block diagram of a central plant which can be used to serve the energy loads of the building of FIG. 1, according to an exemplary embodiment.

Referring now to FIG. 2, a block diagram of a central plant 200 is shown, according to some embodiments. In various embodiments, central plant 200 can supplement or replace waterside system 120 in HVAC system 100 or can be implemented separate from HVAC system 100. When implemented in HVAC system 100, central plant 200 can include a subset of the HVAC devices in HVAC system 100 (e.g., boiler 104, chiller 102, pumps, valves, etc.) and may operate to supply a heated or chilled fluid to AHU 106. The HVAC devices of central plant 200 can be located within building 10 (e.g., as components of waterside system 120) or at an offsite location such as a central energy facility that serves multiple buildings.

Central plant 200 is shown to include a plurality of subplants 202-208. Subplants 202-208 can be configured to convert energy or resource types (e.g., water, natural gas, electricity, etc.). For example, subplants 202-208 are shown to include a heater subplant 202, a heat recovery chiller subplant 204, a chiller subplant 206, and a cooling tower subplant 208. In some embodiments, subplants 202-208 consume resources purchased from utilities to serve the energy loads (e.g., hot water, cold water, electricity, etc.) of a building or campus. For example, heater subplant 202 can be configured to heat water in a hot water loop 214 that circulates the hot water between heater subplant 202 and building 10. Similarly, chiller subplant 206 can be configured to chill water in a cold water loop 216 that circulates the cold water between chiller subplant 206 building 10.

Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. In various embodiments, central plant 200 can include an electricity subplant (e.g., one or more electric generators) configured to generate electricity or any other type of subplant configured to convert energy or resource types.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-208 to receive further heating or cooling.

Although subplants 202-208 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-208 may provide heating and/or cooling directly to the building or campus without requiring an intermediate heat transfer fluid. These and other variations to central plant 200 are within the teachings of the present disclosure.

Each of subplants 202-208 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, one or more of the pumps in central plant 200 (e.g., pumps 222, 224, 228, 230, 234, 236, and/or 240) or pipelines in central plant 200 include an isolation valve associated therewith. Isolation valves can be integrated with the pumps or positioned upstream or downstream of the pumps to control the fluid flows in central plant 200. In various embodiments, central plant 200 can include more, fewer, or different types of devices and/or subplants based on the particular configuration of central plant 200 and the types of loads served by central plant 200.

Still referring to FIG. 2, central plant 200 is shown to include hot thermal energy storage (TES) 210 and cold thermal energy storage (TES) 212. Hot TES 210 and cold TES 212 can be configured to store hot and cold thermal energy for subsequent use. For example, hot TES 210 can include one or more hot water storage tanks 242 configured to store the hot water generated by heater subplant 202 or heat recovery chiller subplant 204. Hot TES 210 may also include one or more pumps or valves configured to control the flow rate of the hot water into or out of hot TES tank 242.

Similarly, cold TES 212 can include one or more cold water storage tanks 244 configured to store the cold water generated by chiller subplant 206 or heat recovery chiller subplant 204. Cold TES 212 may also include one or more pumps or valves configured to control the flow rate of the cold water into or out of cold TES tanks 244. In some embodiments, central plant 200 includes electrical energy storage (e.g., one or more batteries) or any other type of device configured to store resources. The stored resources can be purchased from utilities, generated by central plant 200, or otherwise obtained from any source.

Airside System

Figure 3:
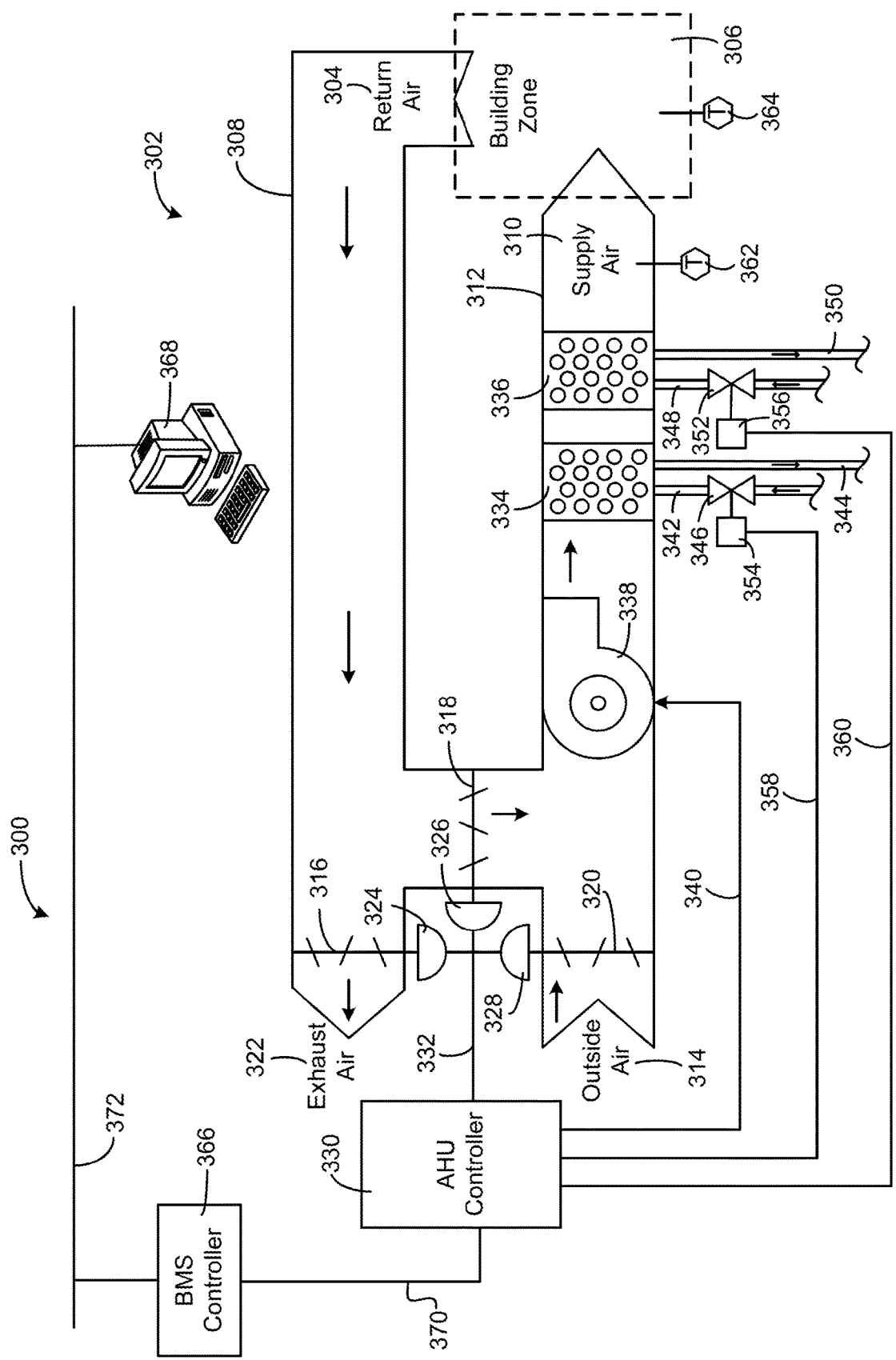
FIG. 3 is a block diagram of an airside system which can be implemented in the building of FIG. 1, according to an exemplary embodiment.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by central plant 200.

Airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from central plant 200 (e.g., from cold water loop 216) via piping 342 and may return the chilled fluid to central plant 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from central plant 200 (e.g., from hot water loop 214) via piping 348 and may return the heated fluid to central plant 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360.

Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, central plant 200, HVAC system 100, and/or other controllable systems that serve building 10. BMS controller 366 may communicate with multiple downstream building systems or subsystems (e.g., HVAC system 100, a security system, a lighting system, central plant 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Asset Allocation System

Figure 4:
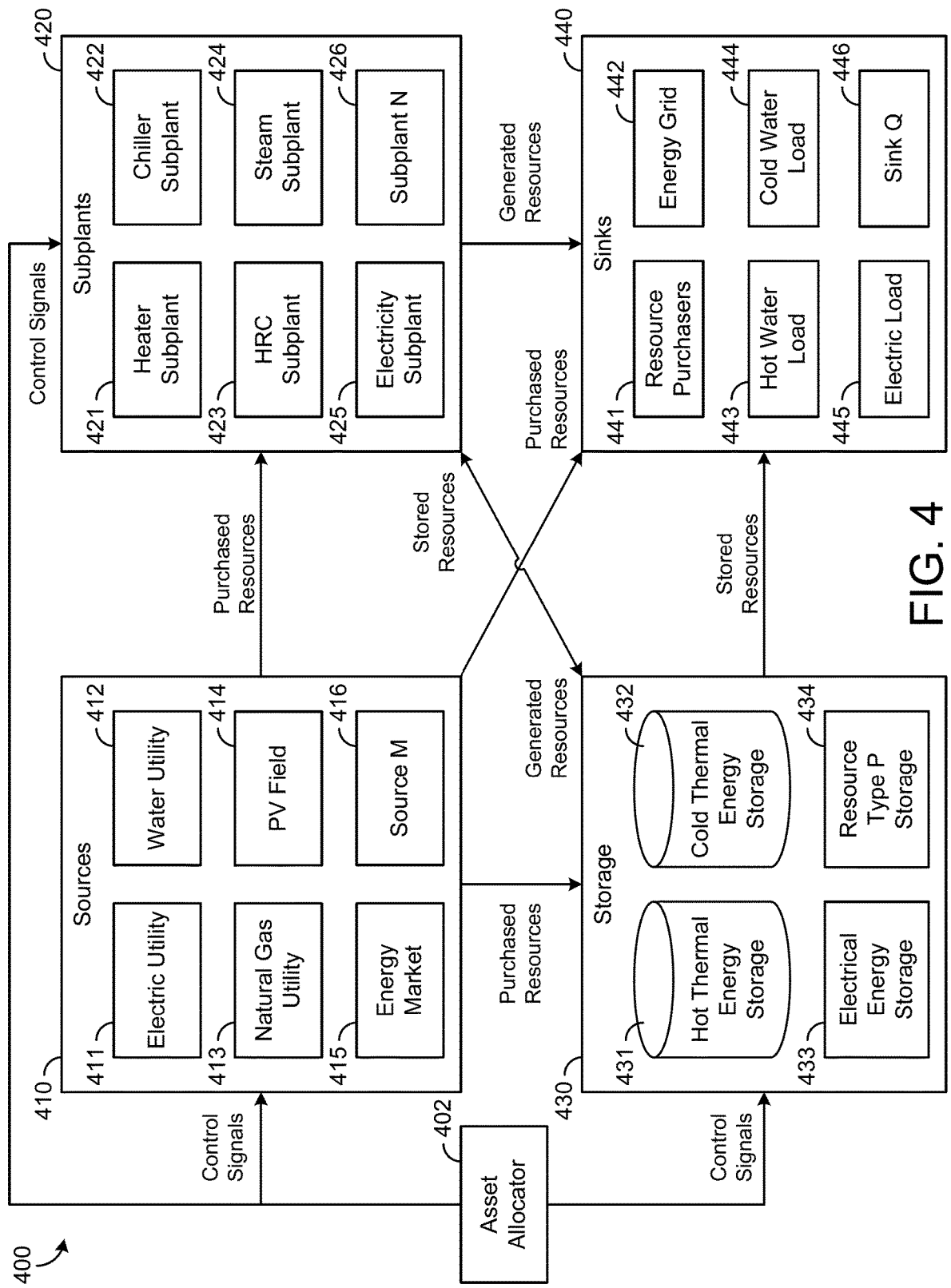
FIG. 4 is a block diagram of an asset allocation system including sources, subplants, storage, sinks, and an asset allocator configured to optimize the allocation of these assets, according to an exemplary embodiment.

Referring now to FIG. 4, a block diagram of an asset allocation system 400 is shown, according to an exemplary embodiment. Asset allocation system 400 can be configured to manage energy assets such as central plant equipment, battery storage, and other types of equipment configured to serve the energy loads of a building. Asset allocation system 400 can determine an optimal distribution of heating, cooling, electricity, and energy loads across different subplants (i.e., equipment groups) capable of producing that type of energy. In some embodiments, asset allocation system 400 is implemented as a component of central plant 200 and interacts with the equipment of central plant 200 in an online operational environment (e.g., performing real-time control of the central plant equipment). In other embodiments, asset allocation system 400 can be implemented as a component of a planning tool (described with reference to FIGS. 7-8) and can be configured to simulate the operation of a central plant over a predetermined time period for planning, budgeting, and/or design considerations.

Asset allocation system 400 is shown to include sources 410, subplants 420, storage 430, and sinks 440. These four categories of objects define the assets of a central plant and their interaction with the outside world. Sources 410 may include commodity markets or other suppliers from which resources such as electricity, water, natural gas, and other resources can be purchased or obtained. Sources 410 may provide resources that can be used by asset allocation system 400 to satisfy the demand of a building or campus. For example, sources 410 are shown to include an electric utility 411, a water utility 412, a natural gas utility 413, a photovoltaic (PV) field (e.g., a collection of solar panels), an energy market 415, and source M 416, where M is the total number of sources 410. Resources purchased from sources 410 can be used by subplants 420 to produce generated resources (e.g., hot water, cold water, electricity, steam, etc.), stored in storage 430 for later use, or provided directly to sinks 440.

Subplants 420 are the main assets of a central plant. Subplants 420 are shown to include a heater subplant 421, a chiller subplant 422, a heat recovery chiller subplant 423, a steam subplant 424, an electricity subplant 425, and subplant N, where N is the total number of subplants 420. In some embodiments, subplants 420 include some or all of the subplants of central plant 200, as described with reference to FIG. 2. For example, subplants 420 can include heater subplant 202, heat recovery chiller subplant 204, chiller subplant 206, and/or cooling tower subplant 208.

Subplants 420 can be configured to convert resource types, making it possible to balance requested loads from the building or campus using resources purchased from sources 410. For example, heater subplant 421 may be configured to generate hot thermal energy (e.g., hot water) by heating water using electricity or natural gas. Chiller subplant 422 may be configured to generate cold thermal energy (e.g., cold water) by chilling water using electricity. Heat recovery chiller subplant 423 may be configured to generate hot thermal energy and cold thermal energy by removing heat from one water supply and adding the heat to another water supply. Steam subplant 424 may be configured to generate steam by boiling water using electricity or natural gas. Electricity subplant 425 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by subplants 420 may be provided by sources 410, retrieved from storage 430, and/or generated by other subplants 420. For example, steam subplant 424 may produce steam as an output resource. Electricity subplant 425 may include a steam turbine that uses the steam generated by steam subplant 424 as an input resource to generate electricity. The output resources produced by subplants 420 may be stored in storage 430, provided to sinks 440, and/or used by other subplants 420. For example, the electricity generated by electricity subplant 425 may be stored in electrical energy storage 433, used by chiller subplant 422 to generate cold thermal energy, used to satisfy the electric load 445 of a building, or sold to resource purchasers 441.

Storage 430 can be configured to store energy or other types of resources for later use. Each type of storage within storage 430 may be configured to store a different type of resource. For example, storage 430 is shown to include hot thermal energy storage 431 (e.g., one or more hot water storage tanks), cold thermal energy storage 432 (e.g., one or more cold thermal energy storage tanks), electrical energy storage 433 (e.g., one or more batteries), and resource type P storage 434, where P is the total number of storage 430. In some embodiments, storage 430 include some or all of the storage of central plant 200, as described with reference to FIG. 2. In some embodiments, storage 430 includes the heat capacity of the building served by the central plant. The resources stored in storage 430 may be purchased directly from sources or generated by subplants 420.

In some embodiments, storage 430 is used by asset allocation system 400 to take advantage of price-based demand response (PBDR) programs. PBDR programs encourage consumers to reduce consumption when generation, transmission, and distribution costs are high. PBDR programs are typically implemented (e.g., by sources 410) in the form of energy prices that vary as a function of time. For example, some utilities may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in storage 430 allows for the resources to be purchased at times when the resources are relatively less expensive (e.g., during non-peak electricity hours) and stored for use at times when the resources are relatively more expensive (e.g., during peak electricity hours). Storing resources in storage 430 also allows the resource demand of the building or campus to be shifted in time. For example, resources can be purchased from sources 410 at times when the demand for heating or cooling is low and immediately converted into hot or cold thermal energy by subplants 420. The thermal energy can be stored in storage 430 and retrieved at times when the demand for heating or cooling is high. This allows asset allocation system 400 to smooth the resource demand of the building or campus and reduces the maximum required capacity of subplants 420. Smoothing the demand also asset allocation system 400 to reduce the peak electricity consumption, which results in a lower demand charge.

In some embodiments, storage 430 is used by asset allocation system 400 to take advantage of incentive-based demand response (IBDR) programs. IBDR programs provide incentives to customers who have the capability to store energy, generate energy, or curtail energy usage upon request. Incentives are typically provided in the form of monetary revenue paid by sources 410 or by an independent service operator (ISO). IBDR programs supplement traditional utility-owned generation, transmission, and distribution assets with additional options for modifying demand load curves. For example, stored energy can be sold to resource purchasers 441 or an energy grid 442 to supplement the energy generated by sources 410. In some instances, incentives for participating in an IBDR program vary based on how quickly a system can respond to a request to change power output/consumption. Faster responses may be compensated at a higher level. Advantageously, electrical energy storage 433 allows system 400 to quickly respond to a request for electric power by rapidly discharging stored electrical energy to energy grid 442.

Sinks 440 may include the requested loads of a building or campus as well as other types of resource consumers. For example, sinks 440 are shown to include resource purchasers 441, an energy grid 442, a hot water load 443, a cold water load 444, an electric load 445, and sink Q, where Q is the total number of sinks 440. A building may consume various resources including, for example, hot thermal energy (e.g., hot water), cold thermal energy (e.g., cold water), and/or electrical energy. In some embodiments, the resources are consumed by equipment or subsystems within the building (e.g., HVAC equipment, lighting, computers and other electronics, etc.). The consumption of each sink 440 over the optimization period can be supplied as an input to asset allocation system 400 or predicted by asset allocation system 400. Sinks 440 can receive resources directly from sources 410, from subplants 420, and/or from storage 430.

Still referring to FIG. 4, asset allocation system 400 is shown to include an asset allocator 402. Asset allocator 402 may be configured to control the distribution, production, storage, and usage of resources in asset allocation system 400. In some embodiments, asset allocator 402 performs an optimization process determine an optimal set of control decisions for each time step within an optimization period. The control decisions may include, for example, an optimal amount of each resource to purchase from sources 410, an optimal amount of each resource to produce or convert using subplants 420, an optimal amount of each resource to store or remove from storage 430, an optimal amount of each resource to sell to resources purchasers 441 or energy grid 442, and/or an optimal amount of each resource to provide to other sinks 440. In some embodiments, the control decisions include an optimal amount of each input resource and output resource for each of subplants 420.

In some embodiments, asset allocator 402 is configured to optimally dispatch all campus energy assets in order to meet the requested heating, cooling, and electrical loads of the campus for each time step within an optimization horizon or optimization period of duration h. Instead of focusing on only the typical HVAC energy loads, the concept is extended to the concept of resource. Throughout this disclosure, the term "resource" is used to describe any type of commodity purchased from sources 410, used or produced by subplants 420, stored or discharged by storage 430, or consumed by sinks 440. For example, water may be considered a resource that is consumed by chillers, heaters, or cooling towers during operation. This general concept of a resource can be extended to chemical processing plants where one of the resources is the product that is being produced by the chemical processing plat.

Asset allocator 402 can be configured to operate the equipment of asset allocation system 400 to ensure that a resource balance is maintained at each time step of the optimization period. This resource balance is shown in the following equation:

$$\Sigma x_{time} = 0 \, \forall \text{resources}, \forall \text{time} \in \text{horizon}$$

where the sum is taken over all producers and consumers of a given resource (i.e., all of sources 410, subplants 420, storage 430, and sinks 440) and time is the time index. Each time element represents a period of time during which the resource productions, requests, purchases, etc. are assumed constant. Asset allocator 402 may ensure that this equation is satisfied for all resources regardless of whether that resource is required by the building or campus. For example, some of the resources produced by subplants 420 may be intermediate resources that function only as inputs to other subplants 420.

In some embodiments, the resources balanced by asset allocator 402 include multiple resources of the same type (e.g., multiple chilled water resources, multiple electricity resources, etc.). Defining multiple resources of the same type may allow asset allocator 402 to satisfy the resource balance given the physical constraints and connections of the central plant equipment. For example, suppose a central plant has multiple chillers and multiple cold water storage tanks, with each chiller physically connected to a different cold water storage tank (i.e., chiller A is connected to cold water storage tank A, chiller B is connected to cold water storage tank B, etc.). Given that only one chiller can supply cold water to each cold water storage tank, a different cold water resource can be defined for the output of each chiller. This allows asset allocator 402 to ensure that the resource balance is satisfied for each cold water resource without attempting to allocate resources in a way that is physically impossible (e.g., storing the output of chiller A in cold water storage tank B, etc.).

Asset allocator 402 may be configured to minimize the economic cost (or maximize the economic value) of operating asset allocation system 400 over the duration of the optimization period. The economic cost may be defined by a cost function J(x) that expresses economic cost as a function of the control decisions made by asset allocator 402. The cost function J(x) may account for the cost of resources purchased from sources 410, as well as the revenue generated by selling resources to resource purchasers 441 or energy grid 442 or participating in incentive programs. The cost optimization performed by asset allocator 402 can be expressed as:

$$\arg\min_{x} J(x)$$

where J(x) is defined as follows:

$$J(x) = \sum_{sources} \sum_{horizon} \text{cost}(purchase_{resource,time}, time) -$$

-continued $$\sum_{incentives} \sum_{horizon} \text{revenue}(ReservationAmount)$$

The first term in the cost function J(x) represents the total cost of all resources purchased over the optimization horizon. Resources can include, for example, water, electricity, natural gas, or other types of resources purchased from a utility or other source 410. The second term in the cost function J(x) represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

Each of subplants 420 and storage 430 may include equipment that can be controlled by asset allocator 402 to optimize the performance of asset allocation system 400. Subplant equipment may include, for example, heating devices, chillers, heat recovery heat exchangers, cooling towers, energy storage devices, pumps, valves, and/or other devices of subplants 420 and storage 430. Individual devices of subplants 420 can be turned on or off to adjust the resource production of each subplant 420. In some embodiments, individual devices of subplants 420 can be operated at variable capacities (e.g., operating a chiller at 10% capacity or 60% capacity) according to an operating setpoint received from asset allocator 402. Asset allocator 402 can control the equipment of subplants 420 and storage 430 to adjust the amount of each resource purchased, consumed, and/or produced by system 400.

In some embodiments, asset allocator 402 minimizes the cost function while participating in PBDR programs, IBDR programs, or simultaneously in both PBDR and IBDR programs. For the IBDR programs, asset allocator 402 may use statistical estimates of past clearing prices, mileage ratios, and event probabilities to determine the revenue generation potential of selling stored energy to resource purchasers 441 or energy grid 442. For the PBDR programs, asset allocator 402 may use predictions of ambient conditions, facility thermal loads, and thermodynamic models of installed equipment to estimate the resource consumption of subplants 420. Asset allocator 402 may use predictions of the resource consumption to monetize the costs of running the equipment.

Asset allocator 402 may automatically determine (e.g., without human intervention) a combination of PBDR and/or IBDR programs in which to participate over the optimization horizon in order to maximize economic value. For example, asset allocator 402 may consider the revenue generation potential of IBDR programs, the cost reduction potential of PBDR programs, and the equipment maintenance/replacement costs that would result from participating in various combinations of the IBDR programs and PBDR programs. Asset allocator 402 may weigh the benefits of participation against the costs of participation to determine an optimal combination of programs in which to participate. Advantageously, this allows asset allocator 402 to determine an optimal set of control decisions that maximize the overall value of operating asset allocation system 400.

In some embodiments, asset allocator 402 optimizes the cost function J(x) subject to the following constraint, which guarantees the balance between resources purchased, produced, discharged, consumed, and requested over the optimization horizon:

$$\sum_{sources} \text{purchase}_{resource,time} +$$

$$\sum_{subplants} \text{produces}(x_{internal,time}, x_{external,time}, v_{uncontrolled,time}) -$$

$$\sum_{subplants} \text{consumes}(x_{internal,time}, x_{external,time}, v_{uncontrolled,time}) +$$

$$\sum_{storages} \text{discharges}_{resource}(x_{internal,time}, x_{external,time}) - \sum_{sinks} \text{requests}_{resource} =$$

$$0 \ \forall \ \text{resources}, \forall \ \text{time} \in \text{horizon}$$

where $x_{internal,time}$ includes internal decision variables (e.g., load allocated to each component of asset allocation system 400), $x_{external,time}$ includes external decision variables (e.g., condenser water return temperature or other shared variables across subplants 420), and $v_{uncontrolled,time}$ includes uncontrolled variables (e.g., weather conditions).

The first term in the previous equation represents the total amount of each resource (e.g., electricity, water, natural gas, etc.) purchased from each source 410 over the optimization horizon. The second and third terms represent the total production and consumption of each resource by subplants 420 over the optimization horizon. The fourth term represents the total amount of each resource discharged from storage 430 over the optimization horizon. Positive values indicate that the resource is discharged from storage 430, whereas negative values indicate that the resource is charged or stored. The fifth term represents the total amount of each resource requested by sinks 440 over the optimization horizon. Accordingly, this constraint ensures that the total amount of each resource purchased, produced, or discharged from storage 430 is equal to the amount of each resource consumed, stored, or provided to sinks 440.

In some embodiments, additional constraints exist on the regions in which subplants 420 can operate. Examples of such additional constraints include the acceptable space (i.e., the feasible region) for the decision variables given the uncontrolled conditions, the maximum amount of a resource that can be purchased from a given source 410, and any number of plant-specific constraints that result from the mechanical design of the plant. These additional constraints can be generated and imposed by operational domain module 904 (described in greater detail with reference to FIGS. 9 and 12).

Asset allocator 402 may include a variety of features that enable the application of asset allocator 402 to nearly any central plant, central energy facility, combined heating and cooling facility, or combined heat and power facility. These features include broadly applicable definitions for subplants 420, sinks 440, storage 430, and sources 410; multiples of the same type of subplant 420 or sink 440; subplant resource connections that describe which subplants 420 can send resources to which sinks 440 and at what efficiency; subplant minimum turndown into the asset allocation optimization; treating electrical energy as any other resource that must be balanced; constraints that can be commissioned during runtime; different levels of accuracy at different points in the horizon; setpoints (or other decisions) that are shared between multiple subplants included in the decision vector; disjoint subplant operation regions; incentive based electrical energy programs; and high level airside models. Incorporation of these features may allow asset allocator 402 to support a majority of the central energy facilities that will be seen in the future. Additionally, it will be possible to rapidly adapt to the inclusion of new subplant types. Some of these features are described in greater detail below.

Broadly applicable definitions for subplants 420, sinks 440, storage 430, and sources 410 allow each of these components to be described by the mapping from decision variables to resources consume and resources produced. Resources and other components of system 400 do not need to be "typed," but rather can be defined generally. The mapping from decision variables to resource consumption and production can change based on extrinsic conditions. Asset allocator 402 can solve the optimization problem by simply balancing resource use and can be configured to solve in terms of consumed resource 1, consumed resource 2, produced resource 1, etc., rather than electricity consumed, water consumed, and chilled water produced. Such an interface at the high level allows for the mappings to be injected into asset allocation system 400 rather than needing them hard coded. Of course, "typed" resources and other components of system 400 can still exist in order to generate the mapping at run time, based on equipment out of service.

Incorporating multiple subplants 420 or sinks 440 of the same type allows for modeling the interconnections between subplants 420, sources 410, storage 430, and sinks 440. This type of modeling describes which subplants 420 can use resource from which sources 410 and which subplants 420 can send resources to which sinks 440. This can be visualized as a resource connection matrix (i.e., a directed graph) between the subplants 420, sources 410, sinks 440, and storage 430. Examples of such directed graphs are described in greater detail with reference to FIGS. 5A-5B. Extending this concept, it is possible to include costs for delivering the resource along a connection and also, efficiencies of the transmission (e.g., amount of energy that makes it to the other side of the connection).

In some instances, constraints arise due to mechanical problems after an energy facility has been built. Accordingly, these constraints are site specific and are often not incorporated into the main code for any of subplants 420 or the high level problem itself. Commissioned constraints allow for such constraints to be added without software updates during the commissioning phase of the project. Furthermore, if these additional constraints are known prior to the plant build, they can be added to the design tool run. This would allow the user to determine the cost of making certain design decisions.

Incorporating minimum turndown and allowing disjoint operating regions may greatly enhance the accuracy of the asset allocation problem solution as well as decrease the number of modifications to solution of the asset allocation by the low level optimization or another post-processing technique. It may be beneficial to allow for certain features to change as a function of time into the horizon. One could use the full disjoint range (most accurate) for the first four hours, then switch to only incorporating the minimum turndown for the next two days, and finally using to the linear relaxation with no binary constraints for the rest of the horizon. For example, asset allocator 402 can be given the operational domain that correctly allocates three chillers with a range of 1800 to 2500 tons. The true subplant range is then the union of [1800, 2500], [3600, 5000], and [5400, 7500]. If the range were approximated as [1800, 7500] the low level optimization or other post-processing technique would have to rebalance any solution between 2500 and 3600 or between 5000 and 5400 tons. Rebalancing is typically done heuristically and is unlikely to be optimal.

Incorporating these disjoint operational domains adds binary variables to the optimization problem (described in greater detail below).

Some decisions made by asset allocator 402 may be shared by multiple elements of system 400. The condenser water setpoint of cooling towers is an example. It is possible to assume that this variable is fixed and allow the low level optimization to decide on its value. However, this does not allow one to make a trade-off between the chiller's electrical use and the tower's electrical use, nor does it allow the optimization to exceed the chiller's design load by feeding it cooler condenser water. Incorporating these extrinsic decisions into asset allocator 402 allows for a more accurate solution at the cost of computational time.

Incentive programs often require the reservation of one or more assets for a period of time. In traditional systems, these assets are typically turned over to alternative control, different than the typical resource price based optimization. Advantageously, asset allocator 402 can be configured to add revenue to the cost function per amount of resource reserved. Asset allocator 402 can then make the reserved portion of the resource unavailable for typical price based cost optimization. For example, asset allocator 402 can reserve a portion of a battery asset for frequency response. In this case, the battery can be used to move the load or shave the peak demand, but can also be reserved to participate in the frequency response program.

Plant Resource Diagrams

Figure 5A:
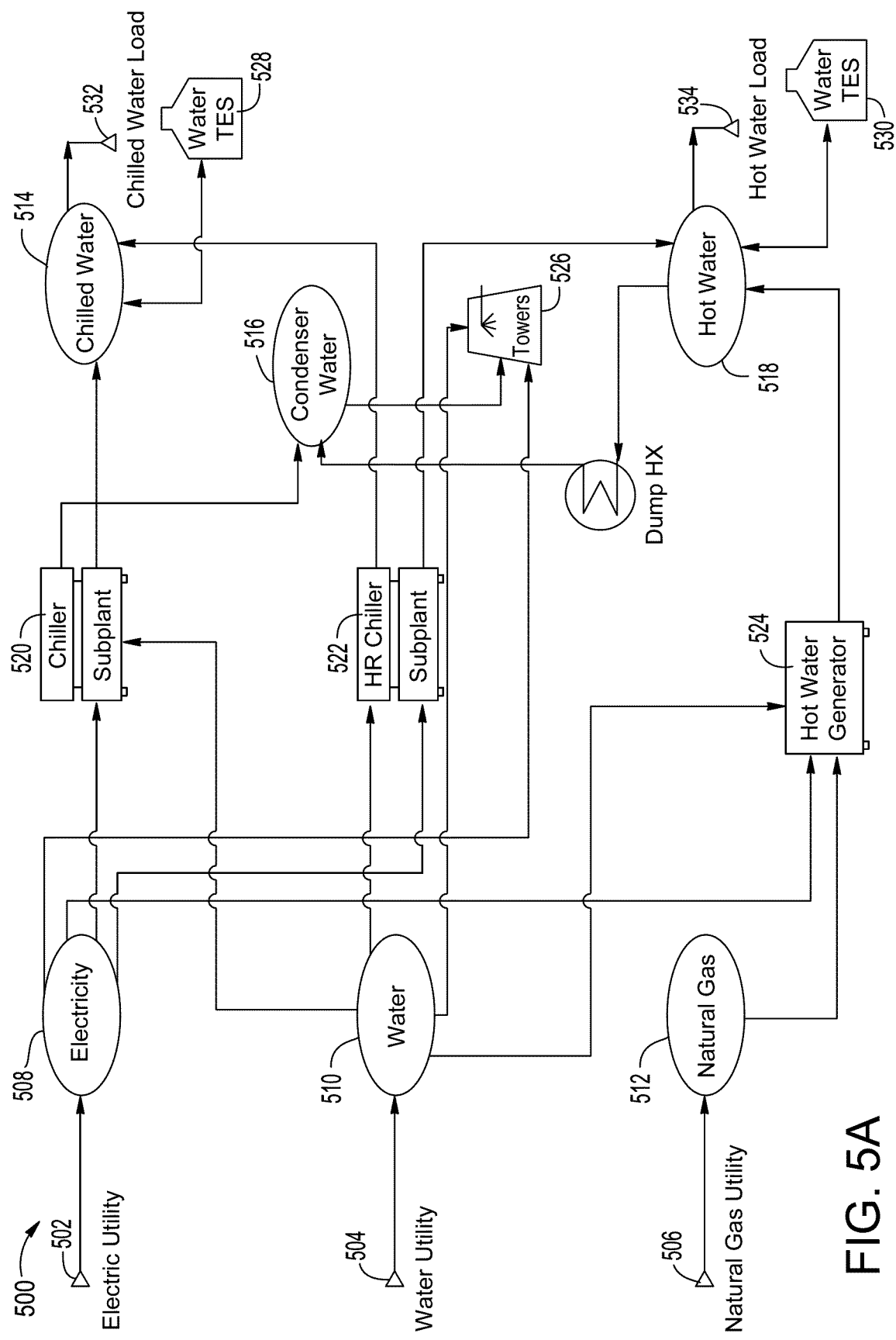
FIG. 5A is a plant resource diagram illustrating the elements of a central plant and the connections between such elements, according to an exemplary embodiment.

Referring now to FIG. 5A, a plant resource diagram 500 is shown, according to an exemplary embodiment. Plant resource diagram 500 represents a particular implementation of a central plant and indicates how the equipment of the central plant are connected to each other and to external systems or devices. Asset allocator 402 can use plant resource diagram 500 to identify the interconnections between various sources 410, subplants 420, storage 430, and sinks 440 in the central plant. In some instances, the interconnections defined by diagram 500 are not capable of being inferred based on the type of resource produced. For this reason, plant resource diagram 500 may provide asset allocator 402 with new information that can be used to establish constraints on the asset allocation problem.

Plant resource diagram 500 is shown to include an electric utility 502, a water utility 504, and a natural gas utility 506. Utilities 502-506 are examples of sources 410 that provide resources to the central plant. For example, electric utility 502 may provide an electricity resource 508, water utility 504 may provide a water resource 510, and natural gas utility 506 may provide a natural gas resource 512. The lines connecting utilities 502-506 to resources 508-512 along with the directions of the lines (i.e., pointing toward resources 508-512) indicate that resources purchased from utilities 502-506 add to resources 508-512.

Plant resource diagram 500 is shown to include a chiller subplant 520, a heat recovery (HR) chiller subplant 522, a hot water generator subplant 524, and a cooling tower subplant 526. Subplants 520-526 are examples of subplants 420 that convert resource types (i.e., convert input resources to output resources). For example, the lines connecting electricity resource 508 and water resource 510 to chiller subplant 520 indicate that chiller subplant 520 receives electricity resource 508 and water resource 510 as input resources. The lines connecting chiller subplant 520 to chilled water resource 514 and condenser water resource 516 indicate that chiller subplant 520 produces chilled water resource 514 and condenser water resource 516. Similarly, the lines connecting electricity resource 508 and water resource 510 to HR chiller subplant 522 indicate that HR chiller subplant 522 receives electricity resource 508 and water resource 510 as input resources. The lines connecting HR chiller subplant 522 to chilled water resource 514 and hot water resource 518 indicate that HR chiller subplant 522 produces chilled water resource 514 and hot water resource 518.

Plant resource diagram 500 is shown to include water TES 528 and 530. Water TES 528-530 are examples of storage 530 that can be used to store and discharge resources. The line connecting chilled water resource 514 to water TES 528 indicates that water TES 528 stores and discharges chilled water resource 514. Similarly, the line connecting hot water resource 518 to water TES 530 indicates that water TES 530 stores and discharges hot water resource 518. In diagram 500, water TES 528 is connected to only chilled water resource 514 and not to any of the other water resources 516 or 518. This indicates that water TES 528 can be used by asset allocator 402 to store and discharge only chilled water resource 514 and not the other water resources 516 or 518. Similarly, water TES 530 is connected to only hot water resource 518 and not to any of the other water resources 514 or 516. This indicates that water TES 530 can be used by asset allocator 402 to store and discharge only hot water resource 518 and not the other water resources 514 or 516.

Plant resource diagram 500 is shown to include a chilled water load 532 and a hot water load 534. Loads 532-534 are examples of sinks 440 that consume resources. The line connecting chilled water load 532 to chilled water resource 514 indicates that chilled water resource 514 can be used to satisfy chilled water load 532. Similarly, the line connecting hot water load 534 to hot water resource 518 indicates that hot water resource 518 can be used to satisfy hot water load 534. Asset allocator 402 can use the interconnections and limitations defined by plant resource diagram 500 to establish appropriate constraints on the optimization problem.

Figure 5B:
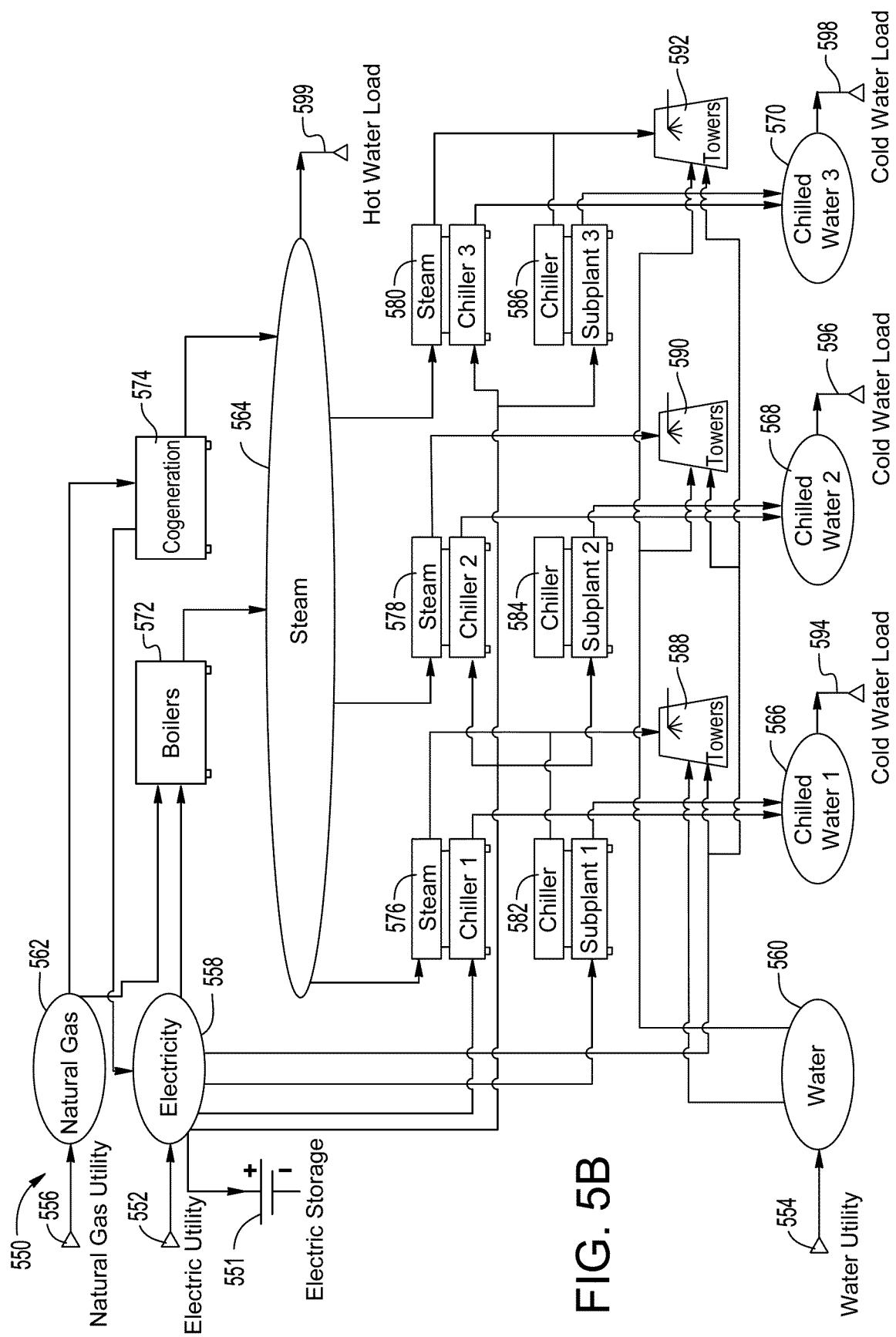
FIG. 5B is another plant resource diagram illustrating the elements of a central plant and the connections between such elements, according to an exemplary embodiment.

Referring now to FIG. 5B, another plant resource diagram 550 is shown, according to an exemplary embodiment. Plant resource diagram 550 represents another implementation of a central plant and indicates how the equipment of the central plant are connected to each other and to external systems or devices. Asset allocator 402 can use plant resource diagram 550 to identify the interconnections between various sources 410, subplants 420, storage 430, and sinks 440 in the central plant. In some instances, the interconnections defined by diagram 550 are not capable of being inferred based on the type of resource produced. For this reason, plant resource diagram 550 may provide asset allocator 402 with new information that can be used to establish constraints on the asset allocation problem.

Plant resource diagram 550 is shown to include an electric utility 552, a water utility 554, and a natural gas utility 556. Utilities 552-556 are examples of sources 410 that provide resources to the central plant. For example, electric utility 552 may provide an electricity resource 558, water utility 554 may provide a water resource 560, and natural gas utility 556 may provide a natural gas resource 562. The lines connecting utilities 552-556 to resources 558-562 along with the directions of the lines (i.e., pointing toward resources 558-562) indicate that resources purchased from utilities 552-556 add to resources 558-562. The line connecting electricity resource 558 to electrical storage 551 indicates that electrical storage 551 can store and discharge electricity resource 558.

Plant resource diagram 550 is shown to include a boiler subplant 572, a cogeneration subplant 574, several steam chiller subplants 576-580, several chiller subplants 582-586, and several cooling tower subplants 588-592. Subplants 572-592 are examples of subplants 420 that convert resource types (i.e., convert input resources to output resources). For example, the lines connecting boiler subplant 572 and cogeneration subplant 574 to natural gas resource 562, electricity resource 558, and steam resource 564 indicate that both boiler subplant 572 and cogeneration subplant 574 consume natural gas resource 562 and electricity resource 558 to produce steam resource 564.

The lines connecting steam resource 564 and electricity resource 558 to steam chiller subplants 576-580 indicate that each of steam chiller subplants 576-580 receives steam resource 564 and electricity resource 558 as input resources. However, each of steam chiller subplants 576-580 produces a different output resource. For example, steam chiller subplant 576 produces chilled water resource 566, steam chiller subplant 578 produces chilled water resource 568, and steam chiller subplant 580 produces chilled water resource 570. Similarly, the lines connecting electricity resource 558 to chiller subplants 582-586 indicate that each of chiller subplants 582-586 receives electricity resource 558 as an input. However, each of chiller subplants 582-586 produces a different output resource. For example, chiller subplant 582 produces chilled water resource 566, chiller subplant 584 produces chilled water resource 568, and chiller subplant 586 produces chilled water resource 570.

Chilled water resources 566-570 have the same general type (i.e., chilled water) but can be defined as separate resources by asset allocator 402. The lines connecting chilled water resources 566-570 to subplants 576-586 indicate which of subplants 576-586 can produce each chilled water resource 566-570. For example, plant resource diagram 550 indicates that chilled water resource 566 can only be produced by steam chiller subplant 576 and chiller subplant 582. Similarly, chilled water resource 568 can only be produced by steam chiller subplant 578 and chiller subplant 584, and chilled water resource 570 can only be produced by steam chiller subplant 580 and chiller subplant 586.

Plant resource diagram 550 is shown to include a hot water load 599 and several cold water loads 594-598. Loads 594-599 are examples of sinks 440 that consume resources. The line connecting hot water load 599 to steam resource 564 indicates that steam resource 564 can be used to satisfy hot water load 599. Similarly, the lines connecting chilled water resources 566-570 to cold water loads 594-598 indicate which of chilled water resources 566-570 can be used to satisfy each of cold water loads 594-598. For example, only chilled water resource 566 can be used to satisfy cold water load 594, only chilled water resource 568 can be used to satisfy cold water load 596, and only chilled water resource 570 can be used to satisfy cold water load 598. Asset allocator 402 can use the interconnections and limitations defined by plant resource diagram 550 to establish appropriate constraints on the optimization problem.

Central Plant Controller

Figure 6:
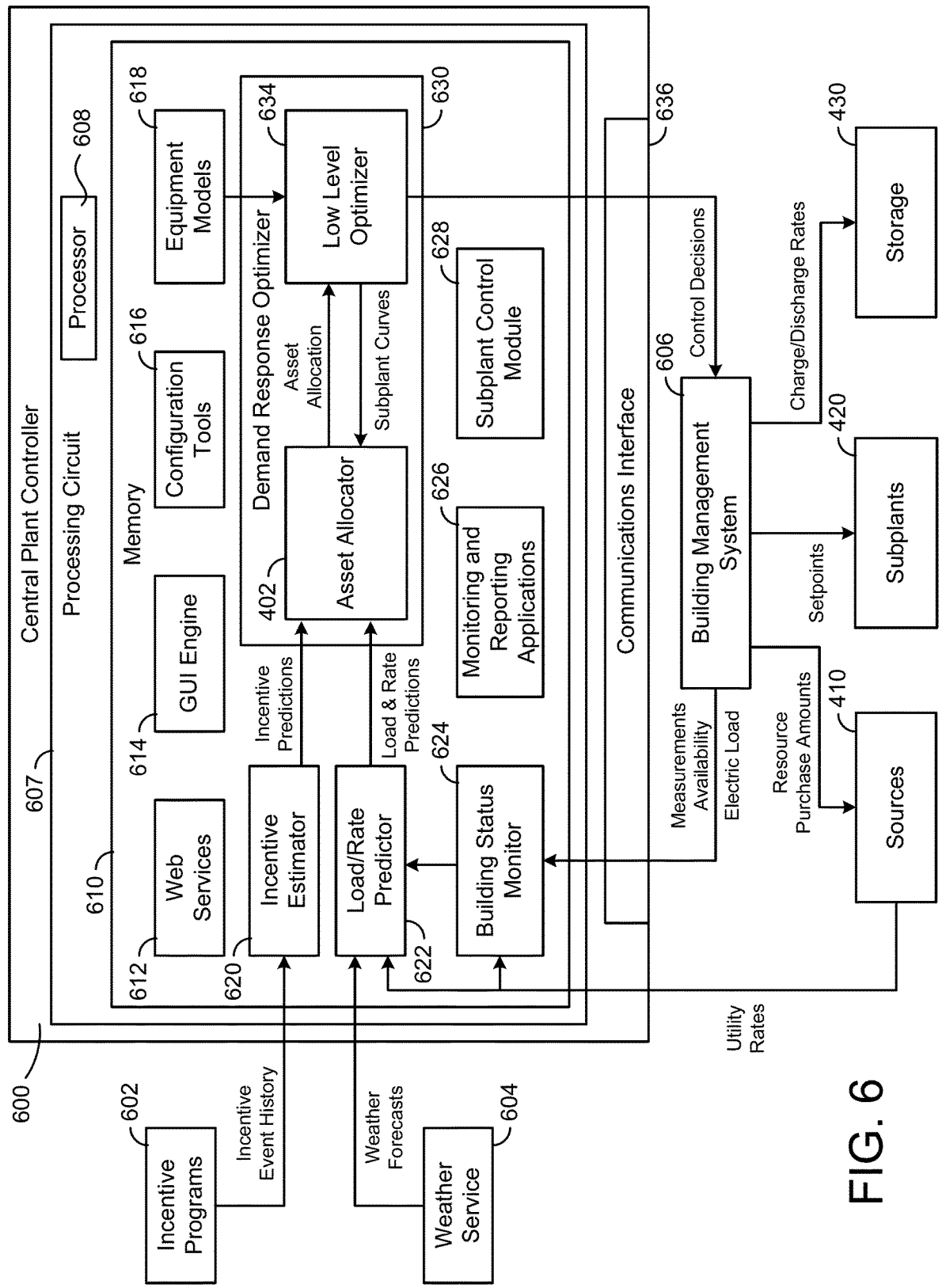
FIG. 6 is a block diagram of a central plant controller in which the asset allocator of FIG. 4 can be implemented, according to an exemplary embodiment.

Referring now to FIG. 6, a block diagram of a central plant controller 600 in which asset allocator 402 can be implemented is shown, according to an exemplary embodiment. In various embodiments, central plant controller 600 can be configured to monitor and control central plant 200, asset allocation system 400, and various components thereof (e.g., sources 410, subplants 420, storage 430, sinks 440, etc.). Central plant controller 600 is shown providing control decisions to a building management system (BMS) 606. The control decisions provided to BMS 606 may include resource purchase amounts for sources 410, setpoints for subplants 420, and/or charge/discharge rates for storage 430.

In some embodiments, BMS 606 is the same or similar to the BMS described with reference to FIG. 1. BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to central plant controller 600. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 420 and storage 430 to affect the monitored conditions within the building and to serve the thermal energy loads of the building.

BMS 606 may receive control signals from central plant controller 600 specifying on/off states, charge/discharge rates, and/or setpoints for the subplant equipment. BMS 606 may control the equipment (e.g., via actuators, power relays, etc.) in accordance with the control signals provided by central plant controller 600. For example, BMS 606 may operate the equipment using closed loop control to achieve the setpoints specified by central plant controller 600. In various embodiments, BMS 606 may be combined with central plant controller 600 or may be part of a separate building management system. According to an exemplary embodiment, BMS 606 is a METASYS® brand building management system, as sold by Johnson Controls, Inc.

Central plant controller 600 may monitor the status of the controlled building using information received from BMS 606. Central plant controller 600 may be configured to predict the thermal energy loads (e.g., heating loads, cooling loads, etc.) of the building for plurality of time steps in an optimization period (e.g., using weather forecasts from a weather service 604). Central plant controller 600 may also predict the revenue generation potential of incentive based demand response (IBDR) programs using an incentive event history (e.g., past clearing prices, mileage ratios, event probabilities, etc.) from incentive programs 602. Central plant controller 600 may generate control decisions that optimize the economic value of operating central plant 200 over the duration of the optimization period subject to constraints on the optimization process (e.g., energy balance constraints, load satisfaction constraints, etc.). The optimization process performed by central plant controller 600 is described in greater detail below.

In some embodiments, central plant controller 600 is integrated within a single computer (e.g., one server, one housing, etc.). In various other exemplary embodiments, central plant controller 600 can be distributed across multiple servers or computers (e.g., that can exist in distributed locations). In another exemplary embodiment, central plant controller 600 may integrated with a smart building manager that manages multiple building systems and/or combined with BMS 606.

Central plant controller 600 is shown to include a communications interface 636 and a processing circuit 607. Communications interface 636 may include wired or wireless interfaces (e.g., jacks, antennas, transmitters, receivers, transceivers, wire terminals, etc.) for conducting data communications with various systems, devices, or networks. For example, communications interface 636 may include an Ethernet card and port for sending and receiving data via an Ethernet-based communications network and/or a WiFi transceiver for communicating via a wireless communications network. Communications interface 636 may be configured to communicate via local area networks or wide area networks (e.g., the Internet, a building WAN, etc.) and may use a variety of communications protocols (e.g., BACnet, IP, LON, etc.).

Communications interface 636 may be a network interface configured to facilitate electronic data communications between central plant controller 600 and various external systems or devices (e.g., BMS 606, subplants 420, storage 430, sources 410, etc.). For example, central plant controller 600 may receive information from BMS 606 indicating one or more measured states of the controlled building (e.g., temperature, humidity, electric loads, etc.) and one or more states of subplants 420 and/or storage 430 (e.g., equipment status, power consumption, equipment availability, etc.). Communications interface 636 may receive inputs from BMS 606, subplants 420, and/or storage 430 and may provide operating parameters (e.g., on/off decisions, setpoints, etc.) to subplants 420 and storage 430 via BMS 606. The operating parameters may cause subplants 420 and storage 430 to activate, deactivate, or adjust a setpoint for various devices thereof.

Still referring to FIG. 6, processing circuit 607 is shown to include a processor 608 and memory 610. Processor 608 may be a general purpose or specific purpose processor, an application specific integrated circuit (ASIC), one or more field programmable gate arrays (FPGAs), a group of processing components, or other suitable processing components. Processor 608 may be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 may be communicably connected to processor 608 via processing circuit 607 and may include computer code for executing (e.g., by processor 608) one or more processes described herein.

Memory 610 is shown to include a building status monitor 624. Central plant controller 600 may receive data regarding the overall building or building space to be heated or cooled by system 400 via building status monitor 624. In an exemplary embodiment, building status monitor 624 may include a graphical user interface component configured to provide graphical user interfaces to a user for selecting building requirements (e.g., overall temperature parameters, selecting schedules for the building, selecting different temperature levels for different building zones, etc.).

Central plant controller 600 may determine on/off configurations and operating setpoints to satisfy the building requirements received from building status monitor 624. In some embodiments, building status monitor 624 receives, collects, stores, and/or transmits cooling load requirements, building temperature setpoints, occupancy data, weather data, energy data, schedule data, and other building parameters. In some embodiments, building status monitor 624 stores data regarding energy costs, such as pricing information available from sources 410 (energy charge, demand charge, etc.).

Still referring to FIG. 6, memory 610 is shown to include a load/rate predictor 622. Load/rate predictor 622 may be configured to predict the thermal energy loads ($\hat{l}_k$) of the building or campus for each time step k (e.g., k=1 . . . n) of an optimization period. Load/rate predictor 622 is shown receiving weather forecasts from a weather service 604. In some embodiments, load/rate predictor 622 predicts the thermal energy loads $\hat{l}_k$ as a function of the weather forecasts. In some embodiments, load/rate predictor 622 uses feedback from BMS 606 to predict loads $\hat{l}_k$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 622 receives a measured electric load and/or previous measured load data from BMS 606 (e.g., via building status monitor 624). Load/rate predictor 622 may predict loads $\hat{l}_k$ as a function of a given weather forecast ($\hat{\phi}_w$), a day type (day), the time of day (t), and previous measured load data ($Y_{k-1}$). Such a relationship is expressed in the following equation:

$$\hat{l}_k = f(\hat{\phi}_w, \text{day}, t | Y_{k-1})$$

In some embodiments, load/rate predictor 622 uses a deterministic plus stochastic model trained from historical load data to predict loads $\hat{l}_k$. Load/rate predictor 622 may use any of a variety of prediction methods to predict loads $\hat{l}_k$ (e.g., linear regression for the deterministic portion and an AR model for the stochastic portion). Load/rate predictor 622 may predict one or more different types of loads for the building or campus. For example, load/rate predictor 622 may predict a hot water load $\hat{l}_{Hot,k}$ and a cold water load $\hat{l}_{Cold,k}$ for each time step k within the prediction window. In some embodiments, load/rate predictor 622 makes load/rate predictions using the techniques described in U.S. patent application Ser. No. 14/717,593.

Load/rate predictor 622 is shown receiving utility rates from sources 410. Utility rates may indicate a cost or price per unit of a resource (e.g., electricity, natural gas, water, etc.) provided by sources 410 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from sources 410 or predicted utility rates estimated by load/rate predictor 622.

In some embodiments, the utility rates include demand charges for one or more resources provided by sources 410. A demand charge may define a separate cost imposed by sources 410 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 630 may be configured to account for demand charges in the high level optimization process performed by asset allocator 402. Sources 410 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 622 may store the predicted loads $\hat{l}_k$ and the utility rates in memory 610 and/or provide the predicted loads $\hat{l}_k$ and the utility rates to demand response optimizer 630.

Still referring to FIG. 6, memory 610 is shown to include an incentive estimator 620. Incentive estimator 620 may be configured to estimate the revenue generation potential of participating in various incentive-based demand response (IBDR) programs. In some embodiments, incentive estimator 620 receives an incentive event history from incentive programs 602. The incentive event history may include a history of past IBDR events from incentive programs 602. An IBDR event may include an invitation from incentive programs 602 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 620 may use the incentive event history to estimate IBDR event probabilities during the optimization period.

Incentive estimator 620 is shown providing incentive predictions to demand response optimizer 630. The incentive predictions may include the estimated IBDR probabilities, estimated participation requirements, an estimated amount of revenue from participating in the estimated IBDR events, and/or any other attributes of the predicted IBDR events. Demand response optimizer 630 may use the incentive predictions along with the predicted loads $\hat{l}_k$ and utility rates from load/rate predictor 622 to determine an optimal set of control decisions for each time step within the optimization period.

Still referring to FIG. 6, memory 610 is shown to include a demand response optimizer 630. Demand response optimizer 630 may perform a cascaded optimization process to optimize the performance of asset allocation system 400. For example, demand response optimizer 630 is shown to include asset allocator 402 and a low level optimizer 634. Asset allocator 402 may control an outer (e.g., subplant level) loop of the cascaded optimization. Asset allocator 402 may determine an optimal set of control decisions for each time step in the prediction window in order to optimize (e.g., maximize) the value of operating asset allocation system 400. Control decisions made by asset allocator 402 may include, for example, load setpoints for each of subplants 420, charge/discharge rates for each of storage 430, resource purchase amounts for each type of resource purchased from sources 410, and/or an amount of each resource sold to energy purchasers 504. In other words, the control decisions may define resource allocation at each time step. The control decisions made by asset allocator 402 are based on the statistical estimates of incentive event probabilities and revenue generation potential for various IBDR events as well as the load and rate predictions.

Low level optimizer 634 may control an inner (e.g., equipment level) loop of the cascaded optimization. Low level optimizer 634 may determine how to best run each subplant at the load setpoint determined by asset allocator 402. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 634 receives actual incentive events from incentive programs 602. Low level optimizer 634 may determine whether to participate in the incentive events based on the resource allocation set by asset allocator 402. For example, if insufficient resources have been allocated to a particular IBDR program by asset allocator 402 or if the allocated resources have already been used, low level optimizer 634 may determine that asset allocation system 400 will not participate in the IBDR program and may ignore the IBDR event. However, if the required resources have been allocated to the IBDR program and are available in storage 430, low level optimizer 634 may determine that system 400 will participate in the IBDR program in response to the IBDR event. The cascaded optimization process performed by demand response optimizer 630 is described in greater detail in U.S. patent application Ser. No. 15/247,885.

In some embodiments, low level optimizer 634 generates and provides subplant curves to asset allocator 402. Each subplant curve may indicate an amount of resource consumption by a particular subplant (e.g., electricity use measured in kW, water use measured in L/s, etc.) as a function of the subplant load. In some embodiments, low level optimizer 634 generates the subplant curves by running the low level optimization process for various combinations of subplant loads and weather conditions to generate multiple data points. Low level optimizer 634 may fit a curve to the data points to generate the subplant curves. In other embodiments, low level optimizer 634 provides the data points asset allocator 402 and asset allocator 402 generates the subplant curves using the data points. Asset allocator 402 may store the subplant curves in memory for use in the high level (i.e., asset allocation) optimization process.

Figure 13:
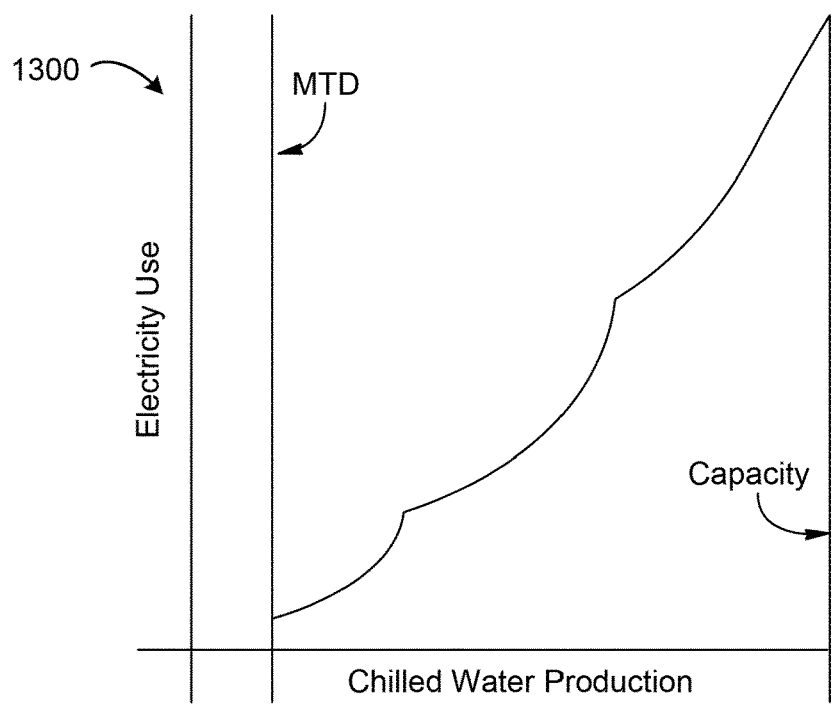
FIG. 13 is a graph of a subplant curve for a chiller subplant illustrating a relationship between chilled water production and electricity use, according to an exemplary embodiment.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 618. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load. An example of such a subplant curve is shown in FIG. 13.

Still referring to FIG. 6, memory 610 is shown to include a subplant control module 628. Subplant control module 628 may store historical data regarding past operating statuses, past operating setpoints, and instructions for calculating and/or implementing control parameters for subplants 420 and storage 430. Subplant control module 628 may also receive, store, and/or transmit data regarding the conditions of individual devices of the subplant equipment, such as operating efficiency, equipment degradation, a date since last service, a lifespan parameter, a condition grade, or other device-specific data. Subplant control module 628 may receive data from subplants 420, storage 430, and/or BMS 606 via communications interface 636. Subplant control module 628 may also receive and store on/off statuses and operating setpoints from low level optimizer 634.

Data and processing results from demand response optimizer 630, subplant control module 628, or other modules of central plant controller 600 may be accessed by (or pushed to) monitoring and reporting applications 626. Monitoring and reporting applications 626 may be configured to generate real time "system health" dashboards that can be viewed and navigated by a user (e.g., a system engineer). For example, monitoring and reporting applications 626 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 6, central plant controller 600 may include one or more GUI servers, web services 612, or GUI engines 614 to support monitoring and reporting applications 626. In various embodiments, applications 626, web services 612, and GUI engine 614 may be provided as separate components outside of central plant controller 600 (e.g., as part of a smart building manager). Central plant controller 600 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 600 may be configured to provide the results of any such processing to other databases, tables, XML files, or other data structures for further querying, calculation, or access by, for example, external monitoring and reporting applications.

Central plant controller 600 is shown to include configuration tools 616. Configuration tools 616 can allow a user to define (e.g., via graphical user interfaces, via prompt-driven "wizards," etc.) how central plant controller 600 should react to changing conditions in the energy storage subsystems. In an exemplary embodiment, configuration tools 616 allow a user to build and store condition-response scenarios that can cross multiple energy storage system devices, multiple building systems, and multiple enterprise control applications (e.g., work order management system applications, entity resource planning applications, etc.). For example, configuration tools 616 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 616 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Planning Tool

Figure 7:
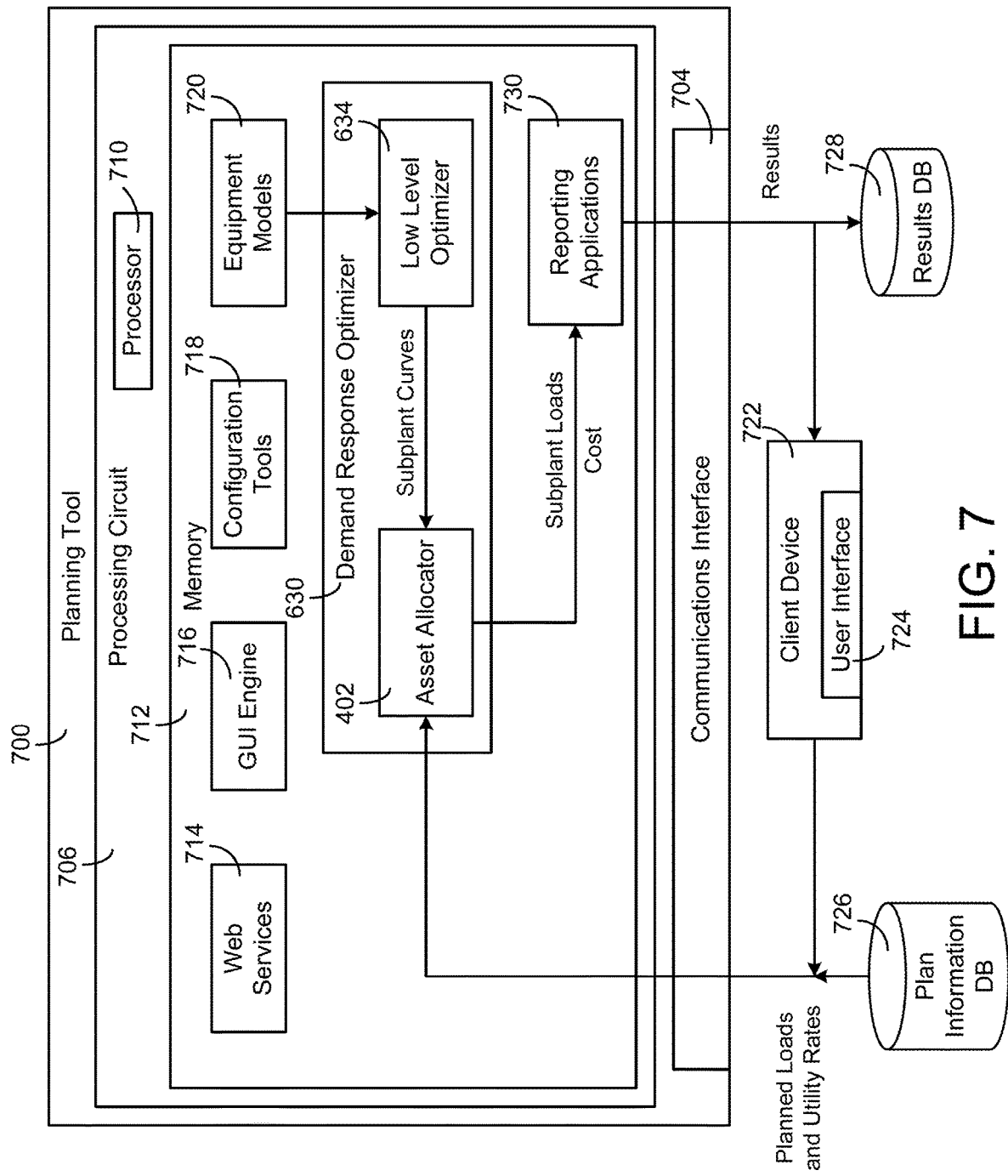
FIG. 7 is a block diagram of a planning tool in which the asset allocator of FIG. 4 can be implemented, according to an exemplary embodiment.

Referring now to FIG. 7, a block diagram of a planning tool 700 in which asset allocator 402 can be implemented is shown, according to an exemplary embodiment. Planning tool 700 may be configured to use demand response optimizer 630 to simulate the operation of a central plant over a predetermined time period (e.g., a day, a month, a week, a year, etc.) for planning, budgeting, and/or design considerations. When implemented in planning tool 700, demand response optimizer 630 may operate in a similar manner as described with reference to FIG. 6. For example, demand response optimizer 630 may use building loads and utility rates to determine an optimal resource allocation to minimize cost over a simulation period. However, planning tool 700 may not be responsible for real-time control of a building management system or central plant.

Planning tool 700 can be configured to determine the benefits of investing in a battery asset and the financial metrics associated with the investment. Such financial metrics can include, for example, the internal rate of return (IRR), net present value (NPV), and/or simple payback period (SPP). Planning tool 700 can also assist a user in determining the size of the battery which yields optimal financial metrics such as maximum NPV or a minimum SPP. In some embodiments, planning tool 700 allows a user to specify a battery size and automatically determines the benefits of the battery asset from participating in selected IBDR programs while performing PBDR. In some embodiments, planning tool 700 is configured to determine the battery size that minimizes SPP given the IBDR programs selected and the requirement of performing PBDR. In some embodiments, planning tool 700 is configured to determine the battery size that maximizes NPV given the IBDR programs selected and the requirement of performing PBDR.

In planning tool 700, asset allocator 402 may receive planned loads and utility rates for the entire simulation period. The planned loads and utility rates may be defined by input received from a user via a client device 722 (e.g., user-defined, user selected, etc.) and/or retrieved from a plan information database 726. Asset allocator 402 uses the planned loads and utility rates in conjunction with subplant curves from low level optimizer 634 to determine an optimal resource allocation (i.e., an optimal dispatch schedule) for a portion of the simulation period.

The portion of the simulation period over which asset allocator 402 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, asset allocator 402 requests all of the subplant curves used in the simulation from low level optimizer 634 at the beginning of the simulation. Since the planned loads and environmental conditions are known for the entire simulation period, asset allocator 402 may retrieve all of the relevant subplant curves at the beginning of the simulation. In some embodiments, low level optimizer 634 generates functions that map subplant production to equipment level production and resource use when the subplant curves are provided to asset allocator 402. These subplant to equipment functions may be used to calculate the individual equipment production and resource use (e.g., in a post-processing module) based on the results of the simulation.

Still referring to FIG. 7, planning tool 700 is shown to include a communications interface 704 and a processing circuit 706. Communications interface 704 may include wired or wireless interfaces (e.g., jacks, antennas, transmitters, receivers, transceivers, wire terminals, etc.) for conducting data communications with various systems, devices, or networks. For example, communications interface 704 may include an Ethernet card and port for sending and receiving data via an Ethernet-based communications network and/or a WiFi transceiver for communicating via a wireless communications network. Communications interface 704 may be configured to communicate via local area networks or wide area networks (e.g., the Internet, a building WAN, etc.) and may use a variety of communications protocols (e.g., BACnet, IP, LON, etc.).

Communications interface 704 may be a network interface configured to facilitate electronic data communications between planning tool 700 and various external systems or devices (e.g., client device 722, results database 728, plan information database 726, etc.). For example, planning tool 700 may receive planned loads and utility rates from client device 722 and/or plan information database 726 via communications interface 704. Planning tool 700 may use communications interface 704 to output results of the simulation to client device 722 and/or to store the results in results database 728.

Still referring to FIG. 7, processing circuit 706 is shown to include a processor 710 and memory 712. Processor 710 may be a general purpose or specific purpose processor, an application specific integrated circuit (ASIC), one or more field programmable gate arrays (FPGAs), a group of processing components, or other suitable processing components. Processor 710 may be configured to execute computer code or instructions stored in memory 712 or received from other computer readable media (e.g., CDROM, network storage, a remote server, etc.).

Memory 712 may include one or more devices (e.g., memory units, memory devices, storage devices, etc.) for storing data and/or computer code for completing and/or facilitating the various processes described in the present disclosure. Memory 712 may include random access memory (RAM), read-only memory (ROM), hard drive storage, temporary storage, non-volatile memory, flash memory, optical memory, or any other suitable memory for storing software objects and/or computer instructions. Memory 712 may include database components, object code components, script components, or any other type of information structure for supporting the various activities and information structures described in the present disclosure. Memory 712 may be communicably connected to processor 710 via processing circuit 706 and may include computer code for executing (e.g., by processor 710) one or more processes described herein.

Still referring to FIG. 7, memory 712 is shown to include a GUI engine 716, web services 714, and configuration tools 718. In an exemplary embodiment, GUI engine 716 includes a graphical user interface component configured to provide graphical user interfaces to a user for selecting or defining plan information for the simulation (e.g., planned loads, utility rates, environmental conditions, etc.). Web services 714 may allow a user to interact with planning tool 700 via a web portal and/or from a remote system or device (e.g., an enterprise control application).

Configuration tools 718 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 718 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 726) and adapt it or enable it for use in the simulation.

Still referring to FIG. 7, memory 712 is shown to include demand response optimizer 630. Demand response optimizer 630 may use the planned loads and utility rates to determine an optimal resource allocation over a prediction window. The operation of demand response optimizer 630 may be the same or similar as previously described with reference to FIG. 6. With each iteration of the optimization process, demand response optimizer 630 may shift the prediction window forward and apply the optimal resource allocation for the portion of the simulation period no longer in the prediction window. Demand response optimizer 630 may use the new plan information at the end of the prediction window to perform the next iteration of the optimization process. Demand response optimizer 630 may output the applied resource allocation to reporting applications 730 for presentation to a client device 722 (e.g., via user interface 724) or storage in results database 728.

Still referring to FIG. 7, memory 712 is shown to include reporting applications 730. Reporting applications 730 may receive the optimized resource allocations from demand response optimizer 630 and, in some embodiments, costs associated with the optimized resource allocations. Reporting applications 730 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation. An exemplary output that may be generated by reporting applications 730 is shown in FIG. 8.

Figure 8:
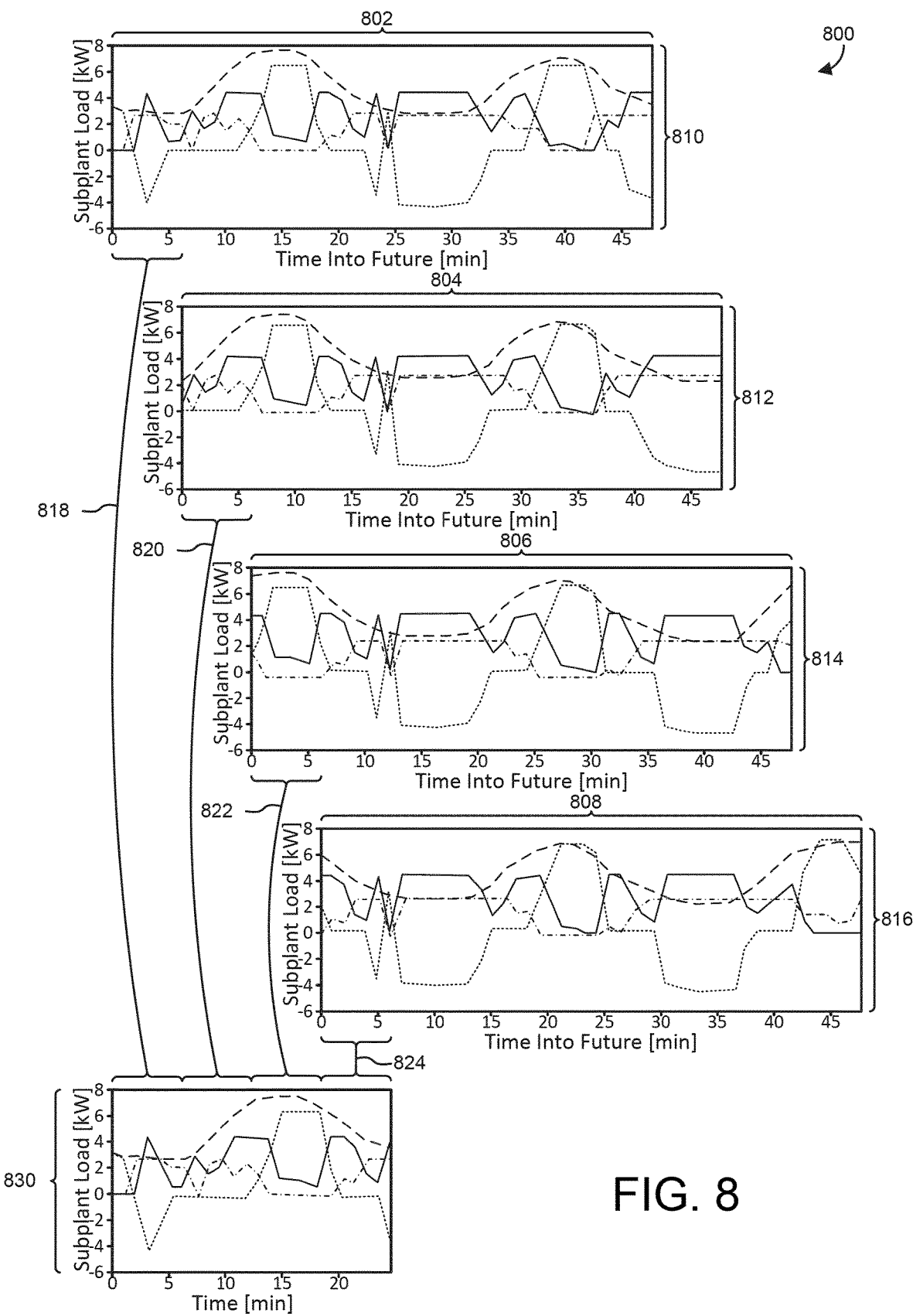
FIG. 8 is a flow diagram illustrating an optimization process which can be performed by the planning tool of FIG. 7, according to an exemplary embodiment.

Referring now to FIG. 8, several graphs 800 illustrating the operation of planning tool 700 are shown, according to an exemplary embodiment. With each iteration of the optimization process, planning tool 700 selects an optimization period (i.e., a portion of the simulation period) over which the optimization is performed. For example, planning tool 700 may select optimization period 802 for use in the first iteration. Once the optimal resource allocation 810 has been determined, planning tool 700 may select a portion 818 of resource allocation 810 to send to plant dispatch 830. Portion 818 may be the first b time steps of resource allocation 810. Planning tool 700 may shift the optimization period 802 forward in time, resulting in optimization period 804. The amount by which the prediction window is shifted may correspond to the duration of time steps b.

Planning tool 700 may repeat the optimization process for optimization period 804 to determine the optimal resource allocation 812. Planning tool 700 may select a portion 820 of resource allocation 812 to send to plant dispatch 830. Portion 820 may be the first b time steps of resource allocation 812. Planning tool 700 may then shift the prediction window forward in time, resulting in optimization period 806. This process may be repeated for each subsequent optimization period (e.g., optimization periods 806, 808, etc.) to generate updated resource allocations (e.g., resource allocations 814, 816, etc.) and to select portions of each resource allocation (e.g., portions 822, 824) to send to plant dispatch 830. Plant dispatch 830 includes the first b time steps 818-824 from each of optimization periods 802-808. Once the optimal resource allocation is compiled for the entire simulation period, the results may be sent to reporting applications 730, results database 728, and/or client device 722, as described with reference to FIG. 7.

Asset Allocator

Figure 9:
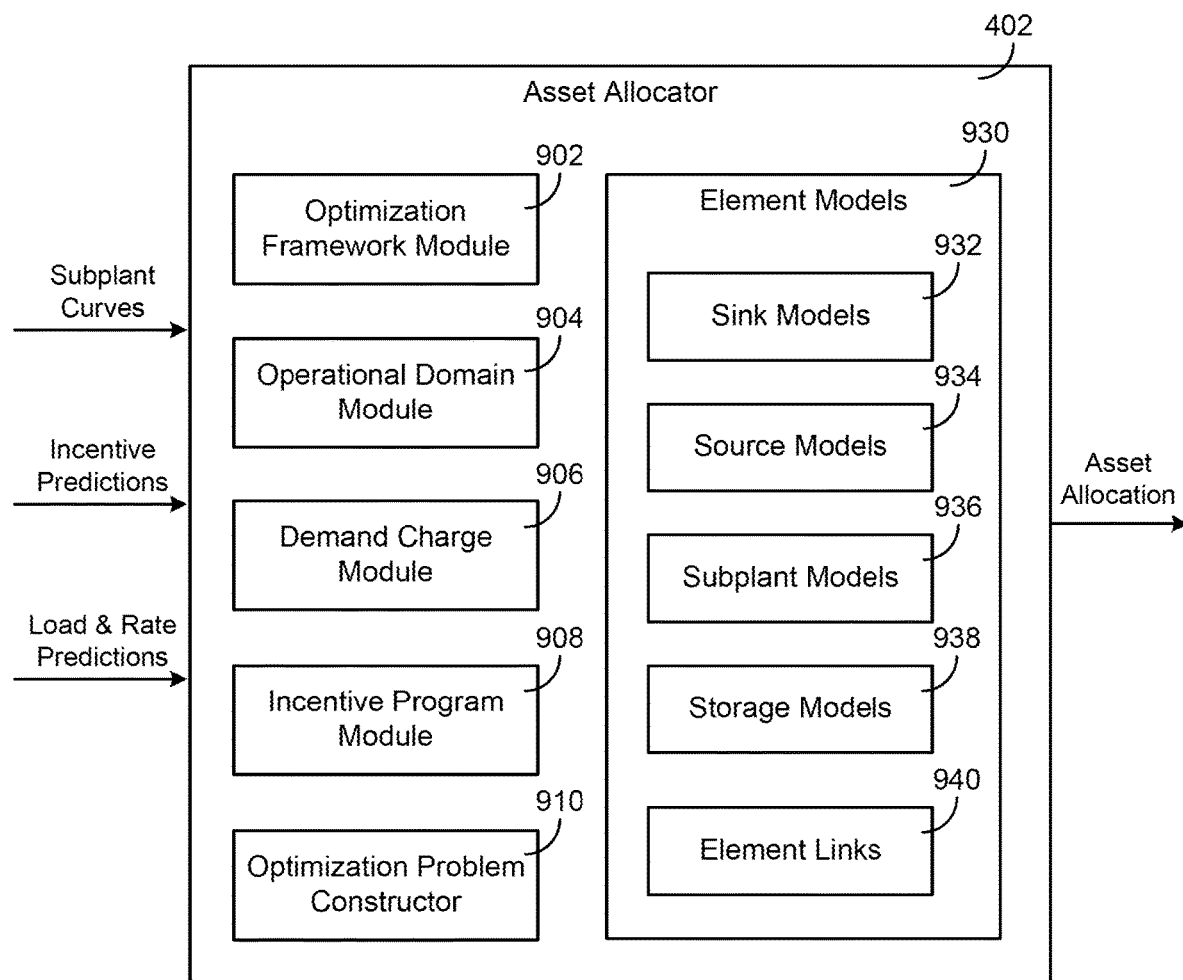
FIG. 9 is a block diagram illustrating the asset allocator of FIG. 4 in greater detail, according to an exemplary embodiment.

Referring now to FIG. 9, a block diagram illustrating asset allocator 402 in greater detail is shown, according to an exemplary embodiment. Asset allocator 402 may be configured to control the distribution, production, storage, and usage of resources in a central plant. As discussed above, asset allocator 402 can be configured to minimize the economic cost (or maximize the economic value) of operating a central plant over the duration of the optimization period. The economic cost may be defined by a cost function J(x) that expresses economic cost as a function of the control decisions made by asset allocator 402. The cost function J(x) may account for the cost of resources purchased from sources 410, as well as the revenue generated by selling resources to resource purchasers 441 or energy grid 442 or participating in incentive programs.

In some embodiments, asset allocator 402 performs an optimization process determine an optimal set of control decisions for each time step within an optimization period. The control decisions may include, for example, an optimal amount of each resource to purchase from sources 410, an optimal amount of each resource to produce or convert using subplants 420, an optimal amount of each resource to store or remove from storage 430, an optimal amount of each resource to sell to resources purchasers 441 or energy grid 442, and/or an optimal amount of each resource to provide to other sinks 440. In some embodiments, asset allocator 402 is configured to optimally dispatch all campus energy assets in order to meet the requested heating, cooling, and electrical loads of the campus for each time step within the optimization period.

Throughout this disclosure, asset allocator 402 is described as actively identifying or defining various items (e.g., sources 410, subplants 420, storage 430, sinks 440, operational domains, etc.). However, it should be understood that asset allocator 402 can also, or alternatively, receive such items as inputs. For example, the existence of such items can be defined by a user (e.g., via a user interface) or any other data source (e.g., another algorithm, an external system or process, etc.). Asset allocator 402 can be configured to identify which of these items have been defined or identified and can generate an appropriate cost function and optimization constraints based on the existence of these items. It should be understood that the acts of identifying or defining these items can include asset allocator 402 identifying, detecting, receiving, or otherwise obtaining a predefined item an input.

Optimization Framework

Asset allocator 402 is shown to include an optimization framework module 902. Optimization framework module 902 can be configured to define an optimization framework for the optimization problem solved by asset allocator 402. In some embodiments, optimization framework module 902 defines the optimization problem as a mixed integer linear program (MILP). The MILP framework provides several advantages over the linear programming framework used in previous systems. For example, the MILP framework can account for minimum turndowns on equipment, can ensure that the high level optimization problem computes a point on the subplant curve for heat recovery chillers, and can impose logical constraints on the optimization problem to compensate for poor mechanical design and/or design inefficiencies.

In some embodiments, the MILP created by optimization framework module 902 has the following form:

$$\min_{x,z} c_x^T x + c_z^T z$$

subject to the following constraints:

$$A_x x + A_z z \leq b$$

$$H_x x + H_z z = g$$

$$z = \text{integer}$$

where $x \in \mathbb{R}^{n_x}$ is a vector of the continuous decision variables, $z \in \mathbb{Z}^{n_z}$ is a vector of the integer decision variables, $c_x$ and $c_z$ are the respective cost vectors for the continuous decision variables and integer decision variables, $A_x$, $A_z$, and b are the matrices and vector that describe the inequality constraints, and $H_x$, $H_z$, and g are the matrices and vector that describe the equality constraints.

Optimization Problem Construction

Still referring to FIG. 9, asset allocator 402 is shown to include an optimization problem constructor 910. Optimization problem constructor 910 can be configured to construct the high level (i.e., asset allocation) optimization problem solved by asset allocator 402. In some embodiments, the high level optimization problem includes one or more of the elements of asset allocation system 400. For example, the optimization problem can include sinks 440, sources 410, subplants 420, and storage 430, as described with reference to FIG. 4. In some embodiments, the high level optimization problem includes airside units, which can be considered a type of energy storage in the mass of the building. The optimization problem may include site-specific constraints that can be added to compensate for mechanical design deficiencies.

In some embodiments, the optimization problem generated by optimization problem constructor 910 includes a set of links between sources 410, subplants 420, storage 430, sinks 440, or other elements of the optimization problem. For example, the high level optimization problem can be viewed as a directed graph, as shown in FIGS. 5A-5B. The nodes of the directed graph can include sources 410, subplants 420, storage 430, and sinks 440. The set of links can define the connections between the nodes, the cost of the connections between nodes (e.g., distribution costs), the efficiency of each connection, and the connections between site-specific constraints.

In some embodiments, the optimization problem generated by optimization problem constructor 910 includes an objective function. The objective function can include the sum of predicted utility usage costs over the horizon (i.e., the optimization period), the predicted demand charges, the total predicted incentive revenue over the prediction horizon, the sum of the predicted distribution costs, the sum of penalties on unmet and overmet loads over the prediction horizon, and/or the sum of the rate of change penalties over the prediction horizon (i.e., delta load penalties). All of these terms may add to the total cost, with the exception of the total predicted incentive revenue. The predicted incentive revenue may subtract from the total cost. For example, the objective function generated by optimization problem constructor 910 may have the following form:

$$J(x) = \sum_{k=1}^{h} (\text{Source Usage Cost})_k +$$
$$(\text{Total Demand Charges}) - (\text{Total Incentives}) +$$
$$\sum_{k=1}^{h} (\text{Distribution Cost})_k + \sum_{k=1}^{h} (\text{Unmet/Overmet Load Penalites})_k +$$
$$\sum_{k=1}^{h} (\text{Rate of Change Penalties})_k$$

where the index k denotes a time step in the optimization period and h is the total number of time steps in the optimization period.

In some embodiments, the optimization problem generated by optimization problem constructor 910 includes a set of constraints. The set of constraints can include resource balance constraints (e.g., hot water balance, chilled water balance, electricity balance, etc.), operational domain constraints for each of subplants 420, state of charge (SOC) and storage capacity constraints for each of storage 430, decision variable constraints (e.g., subplant capacity constraints, charge and discharge of storage constraints, and storage capacity constraints), demand/peak usage constraints, auxiliary constraints, and any site specific or commissioned constraints. In some embodiments, the operational domain constraints are generalized versions of the subplant curves. The operational domain constraints can be generated by operational domain module 904 (described in greater detail below). The decision variable constraints may be box constraints of the form $x_{lb} \leq x \leq x_{ub}$, where x is a decision variable and $x_{lb}$ and $x_{ub}$ are the lower and upper bound for the decision variable x.

The optimization problem generated by optimization problem constructor 910 can be considered a finite-horizon optimal control problem. The optimization problem may take the form:

minimize $J(x)$ subject to resource balances, operational domains for subplants 420 (e.g., subplant curves), constraints to predict the SOC of storage 430, storage capacity constraints, subplant/storage box constraints (e.g., capacity constraints and discharge/charge rate constraints), demand/peak usage constraints, auxiliary constraints for rate of change variables, auxiliary constraints for demand charges, and site specific constraints.

In some embodiments, optimization problem constructor 910 applies an inventory balance constraint to each resource. One side of the inventory balance constraint for a given resource may include the total amount of the resource purchased from all sources 410, the total amount of the resource produced by all of subplants 420, the total amount of the resource discharged from storage 430 (negative values indicate charging storage 430), and unmet load. The other side of the inventory balance for the resource may include the total amount of the resource requested/predicted (uncontrolled load), carryover from the previous time step, the total amount of the resource consumed by all subplants 420 and airside units, overmet load, and the total amount of the resource sold. For example, the inventory balance for a resource may have the form:

$$\sum_{i \in \{Sources\}} (\text{Purchased Resource})_i + \sum_{j \in \{Subplants\}} (\text{Produced Resource})_j +$$
$$\sum_{k \in \{Storage\}} (\text{Discharged Storage})_k + \text{Unmet Load} =$$
$$\text{Requested Load} + \text{Carryover} +$$
$$\sum_{j \in \{Subplants\}} (\text{Consumed Resource})_j \sum_{l \in \{Airside\ Units\}} (\text{Consumed Resource})_l +$$
$$\text{Overmet Load} + \text{Resource Sold}$$

Optimization problem constructor 910 may require this resource balance to be satisfied for each resource at each time step of the optimization period. Together the unmet and overmet load capture the accumulation of a resource. Negative accumulation (unmet load) are distinguished from positive accumulation (overmet load) because typically, overmet loads are not included in the resource balance. Even though unmet and overmet loads are listed separately, at most one of the two may be non-zero. The amount of carryover may be the amount of unmet/overmet load from the previous time step (described in greater detail below). The requested load may be determined by load/rate predictor 622 and provided as an input to the high level optimization problem.

Throughout this disclosure, the high level/asset allocator optimization problem or high level/asset allocator problem refers to the general optimization problem constructed by optimization problem constructor 910. A high level problem instance refers to a realization of the high level problem provided the input data and parameters. The high level optimization/asset allocation algorithm refers to the entire set of steps needed to solve a high level problem instance (i.e., encapsulates both the set of mathematical operations and the implementation or software design required to setup and solve a high level problem instance. Finally, a high level problem element or high level element refers to any of the elements of the high level problem including sinks 440, sources 410, subplants 420, storage 430, or airside unit.

Element Models

Still referring to FIG. 9, asset allocator 402 is shown to include element models 930. Element models 930 may store definitions and/or models for various elements of the high level optimization problem. For example, element models 930 are shown to include sink models 932, source models 934, subplant models 936, storage models 938, and element links 940. In some embodiments, element models 930 include data objects that define various attributes or properties of sinks 440, sources 410, subplants 420, and storage 430 (e.g., using object-oriented programming).

For example, source models 934 may define the type of resource provided by each of sources 410, a cost of each resource, demand charges associated with the consumption of the resource, a maximum rate at which the resource can be purchased from each of sources 410, and other attributes of sources 410. Similarly, subplant models 936 may define the input resources of each subplant 420, the output resources of each subplant 420, relationships between the input and output variables of each subplant 420 (i.e., the operational domain of each subplant 420), and optimization constraints associated with each of subplants 420. Each of element models 930 are described in greater detail below.

Sink Models

Element models 930 are shown to include sink models 932. Sink models 932 may store models for each of sinks 440. As described above, sinks 440 may include resource consumers or requested loads. Some examples are the campus thermal loads and campus electricity usage. The predicted consumption of a sink 440 over the optimization period can be supplied as an input to asset allocator 401 and/or computed by load/rate predictor 622. Sink models 932 may store the predicted consumption over the optimization period for each of sinks 440. Sink models 932 may also store any unmet/overmet load for each of sinks 440, carryover from the previous time steps, and any incentives earned by supplying each of sinks 440 (e.g., for sinks such as an energy purchasers or an energy grid).

Carryover can be defined as the amount of unmet or overmet load for a particular resource from the previous time step. In some embodiments, asset allocator 402 determines the carryover by adding the entire unmet load for a particular resource in one time step to the requested load for the resource at the next time step. However, calculating the carryover in this manner may not always be appropriate since the carryover may grow over time. As an example, consider an unmet chilled water load. If there are several time steps where the chilled water load is not met, the buildings supplied by the load will heat up. Due to this increase in building temperature, the amount of chilled water load required to decrease the building temperature to the set-point is not a linearly increasing function of the sum of the unmet load over the past time steps because the building temperature will begin approaching the ambient temperature.

In some embodiments, asset allocator 402 adds a forgetting factor to the carryover. For example, asset allocator 402 can calculate the carryover for each time step using the following equation:

$$\text{carryover}_{j+1} = \gamma_j \cdot \text{unmet/overmet}_j$$

where unmet/overmet$_j$ is the amount of unmet and/or overmet load at time step j, carryover$_{j+1}$ is the carryover added to the right-hand side of the inventory balance at the next time step j+1, and $\gamma_j \in [0,1]$ is the forgetting factor. Selecting $\gamma_j=0$ corresponds to case where no unmet/overmet load is carried over to the next time step, whereas selecting $\gamma_j=1$ corresponds to case where all unmet/overmet load is carried over to the next time step. An intermediate selection of $\gamma_j$ (i.e., $0 \leq \gamma_j \leq 1$) corresponds to the case where some, but not all, of the unmet/overmet load is carried over. For the case of a chilled water system, the choice of $\gamma_j$ may depend on the plant itself and can be determined using the amount of unmet load that actually stored in the water (temperature would increase above the setpoint) when an unmet load occurs.

Source Models

Still referring to FIG. 9, element models 930 are shown to include source models 934. Source models 934 may store models for each of sources 410. As described above, sources 410 may include utilities or markets where resources may be purchased. Source models 934 may store a price per unit of a resource purchased from each of sources 410 (e.g., $/kWh of electricity, $/liter of water, etc.). This cost can be included as a direct cost associated with resource usage in the cost function. In some embodiments, source models 934 store costs associated with demand charges and demand constraints, incentive programs (e.g., frequency response and economic demand response) and/or sell back programs for one or more of sources 410.

In some embodiments, the cost function J(x) includes a demand charge based on peak electrical usage during a demand charge period (e.g., during a month). This demand charge may be based on the maximum rate of electricity usage at any time in the demand charge period. There are several other types of demand charges besides the anytime monthly demand charge for electricity including, for example, time-of-day monthly and yearlong ratchets. Some or all of these demand charges can be added to the cost function depending on the particular types of demand charges imposed by sources 410. In some embodiments, demand charges are defined as follows:

$$wc \max_{i \in T_{demand}} \{x_i\}$$

where $x_i$ represents the resource purchase at time step i of the optimization period, c>0 is the demand charge rate, w is a (potentially time-varying) weight applied to the demand charge term to address any discrepancies between the optimization period and the time window over which the demand charge is applied, and $T_{demand} \subseteq \{1, \ldots, h\}$ is the subinterval of the optimization period to which the demand charge is applied. Source models 934 can store values for some or all of the parameters that define the demand charges and the demand charge periods.

In some embodiments, asset allocator 402 accounts for demand charges within a linear programming framework by introducing an auxiliary continuous variable. This technique is described in greater detail with reference to demand charge module 906. While this type of term may readily be cast into a linear programming framework, it can be difficult to determine the weighting coefficient w when the demand charge period is different from the optimization period. Nevertheless, through a judicious choice of the two adjustable parameters for demand charges (i.e., the weighting coefficient w and the initial value of the auxiliary demand variable), other types of demand charges may be included in the high level optimization problem.

In some embodiments, source models 934 store parameters of various incentive programs offered by sources 410. For example, the source definition 934 for an electric utility may define a capability clearing price, a performance clearing price, a regulation award, or other parameters that define the benefits (e.g., potential revenue) of participating in a frequency regulation program. In some embodiments, source models 934 define a decision variable in the optimization problem that accounts for the capacity of a battery reserved for frequency regulation. This variable effectively reduces the capacity of the battery that is available for priced-based demand response. Depending on the complexity of the decision, source models 934 may also define a decision variable that indicates whether to participate in the incentive program. In asset allocator 402, storage capacity may be reserved for participation in incentive programs. Low level optimizer 634 can then be used to control the reserved capacity that is charged/discharged for the incentive program (e.g., frequency response control).

In some embodiments, source models 934 store pricing information for the resources sold by sources 410. The pricing information can include time-varying pricing information, progressive or regressive resource prices (e.g., prices that depend on the amount of the resource purchased), or other types of pricing structures. Progressive and regressive resource prices may readily be incorporated into the optimization problem by leveraging the set of computational operations introduced by the operational domain. In the case of either a progressive rate that is a discontinuous function of the usage or for any regressive rate, additional binary variables can be introduced into the optimization problem to properly describe both of these rates. For progressive rates that are continuous functions of the usage, no binary variables are needed because one may apply a similar technique as that used for imposing demand charges.

Figure 10:
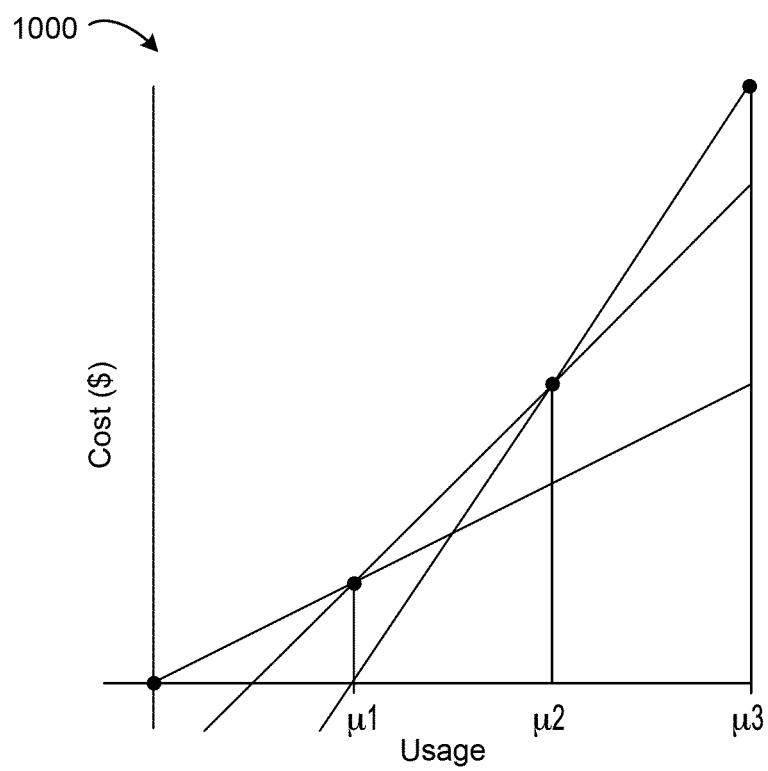
FIG. 10 is a graph of a progressive rate structure which can be imposed by some utilities, according to an exemplary embodiment.

Referring now to FIG. 10, a graph 1000 depicting a progressive rate structure for a resource is shown, according to an exemplary embodiment. The cost per unit of the resource purchased can be described by the following continuous function:

$$\text{Cost} = \begin{cases} p_1 u + b_1, & \text{if } u \in [0, u_1] \\ p_2 u + b_2, & \text{if } u \in [u_1, u_2] \\ p_3 u + b_3, & \text{if } u \in [u_2, u_3] \end{cases}$$

where $p_i$ is the price of the ith interval, $b_i$ is the offset of the ith interval, u is the amount of the resource purchased, and $p_i u_i + b_i = p_{i+1} u_i + b_i$ for i=1,2. Although the rate depicted in graph 1000 represents a cost, negative prices may be used to account for profits earned by selling back resources. Source models 934 can store values for some of all of these parameters in order to fully define the cost of resource purchases and/or the revenue generated from resource sales.

In the cost function J(x), the following term can be used to describe progressive rates:

$$\max_{i \in \{1,2,3\}} \{p_i u + b_i\}$$

Since the goal is to minimize cost, this term can be equivalently described in the optimization problem by introducing an auxiliary continuous variable C and the following constraints:

$C \geq 0$ $p_1 u + b_1 \leq C$ $p_2^u + b_2 \leq C$ $p_2^u + b_2 \leq C$ where C is the auxiliary variable that is equal to the cost of the resource. Source models 934 can define these constraints in order to enable progressive rate structures in the optimization problem.

In some embodiments, source models 934 stores definitions of any fixed costs associated with resource purchases from each of sources 410. These costs can be captured within the MILP framework. For example, let $v \in \{0,1\}$ represent whether a source 410 is being utilized (v=0 means the source 410 is not used and v=1 means the source 410 is used) and let $u \in [0, u_{max}]$ be the source usage where $u_{max}$ represents the maximum usage. If the maximum usage is not known, $u_{max}$ may be any arbitrarily large number that satisfies $u < u_{max}$. Then, the following two constraints ensure that the binary variable v is zero when u=1 and is one when u>0:

$u - u_{max} v \leq 0$ $u \geq 0$

Asset allocator 402 can add the term $c_{fixed} v$ to the cost function to account for fixed costs associated with each of sources 410, where $c_{fixed}$ is the fixed cost. Source models 934 can define these constraints and terms in order to account for fixed costs associated with sources 410.

Subplant Models

Referring again to FIG. 9, element models 930 are shown to include subplant models 936. Subplant models 936 may store models for each of subplants 420. As discussed above, subplants 420 are the main assets of a central plant. Subplants 420 can be configured to convert resource types, making it possible to balance requested loads from the building or campus using resources purchased from sources 410. This general definition allows for a diverse set of central plant configurations and equipment types as well as varying degrees of subplant modeling fidelity and resolution.

In some embodiments, subplant models 936 identify each of subplants 420 as well as the optimization variables associated with each subplant. The optimization variables of a subplant can include the resources consumed, the resources produced, intrinsic variables, and extrinsic variables. Intrinsic variables may be internal to the optimization formulation and can include any auxiliary variables used to formulate the optimization problem. Extrinsic variables may be variables that are shared among subplants (e.g., condenser water temperature).

In some embodiments, subplant models 936 describe the relationships between the optimization variables of each subplant. For example, subplant models 936 can include subplant curves that define the output resource production of a subplant as a function of one or more input resources provided to the subplant. In some embodiments, operational domains are used to describe the relationship between the subplant variables. Mathematically, an operational domain is a union of a collection of polytopes in an n-dimensional (real) space that describe the admissible set of variables of a high level element. Operational domains are described in greater detail below.

In some embodiments, subplant models 936 store subplant constraints for each of subplants 420. Subplant constraints may be written in the following general form:

$A_{x,j} x_j + A_{z,j} z_j \leq b_j$ $H_{x,j} x_j + H_{z,j} z_j = g_j$ $x_{lb,j} \leq x_j \leq x_{ub,j}$ $z_{lb,j} \leq z_j \leq z_{ub,j}$ $z_j = \text{integer}$ for all j where j is an index representing the jth subplant, $x_j$ denotes the continuous variables associated with the jth subplant (e.g., resource variables and auxiliary optimization variables), and $z_j$ denotes the integer variables associated with the jth subplant (e.g., auxiliary binary optimization variables). The vectors $x_{lb,j}$, $x_{ub,j}$, $z_{lb,j}$, and $z_{ub,j}$ represent the box (bound) constraints on the decision variables. The matrices $A_{x,j}$, $A_{z,j}$, $H_{x,j}$, and $H_{z,j}$ and the vectors $b_j$ and $g_j$ are associated with the inequality constraints and the equality constraints for the jth subplant.

In some embodiments, subplant models 936 store the input data used to generate the subplant constraints. Such input data may include sampled data points of the high level subplant curve/operational domain. For example, for chiller subplant 422, this data may include several points sampled from the subplant curve 1300 (shown in FIG. 13). When implemented as part of an online operational tool (shown in FIG. 6), the high level subplant operational domain can be sampled by querying low level optimizer 634 at several requested production amounts. When implemented as part of an offline planning tool (shown in FIG. 7), the sampled data may be user-specified efficiency and capacity data.

Storage Models

Referring again to FIG. 9, element models 930 are shown to include storage models 938. Storage models 938 may store models for each of storage 430. Storage models 938 can define the types of resources stored by each of storage 430, as well as storage constraints that limit the state-of-charge (e.g., maximum charge level) and/or the rates at which each storage 430 can be charged or discharged. In some embodiments, the current level or capacity of storage 430 is quantified by the state-of-charge (SOC), which can be denoted by $\phi$ where $\phi=0$ corresponds to empty and $\phi=1$ corresponds to full. To describe the SOC as a function of the charge rate or discharge rate, a dynamic model can be stored as part of storage models 938. The dynamic model may have the form:

$$\phi(k+1) = A\phi(k) + Bu(k)$$

where $\phi(k)$ is the predicted state of charge at time step k of the optimization period, $u(k)$ is the charge/discharge rate at time step k, and A and B are coefficients that account for dissipation of energy from storage 430. In some embodiments, A and B are time-varying coefficients. Accordingly, the dynamic model may have the form:

$$\phi(k+1) = A(k)\phi(k) + B(k)u(k)$$

where $A(k)$ and $B(k)$ are coefficients that vary as a function of the time step k.

Asset allocator 402 can be configured to add constraints based on the operational domain of storage 430. In some embodiments, the constraints link decision variables adjacent in time as defined by the dynamic model. For example, the constraints may link the decision variables $\phi(k+1)$ at time step k+1 to the decision variables $\phi(k)$ and $u(k)$ at time step k. In some embodiments, the constraints link the SOC of storage 430 to the charge/discharge rate. Some or all of these constraints may be defined by the dynamic model and may depend on the operational domain of storage 430.

In some embodiments, storage models 938 store optimization constraints for each of storage 430. Storage constraints may be written in the following general form:

$$A_{x,k}x_k + A_{z,k}z_k \leq b_k$$

$$H_{x,k}x_k + H_{z,k}z_k = g_k$$

$$x_{lb,k} \leq x_k \leq x_{ub,k}$$

$$z_{lb,k} \leq z_k \leq z_{ub,k}$$

$$z_k = \text{integer}$$

for all k where k is an index representing the kth storage device, $x_k$ denotes the continuous variables associated with the kth storage device (e.g., resource variables and auxiliary optimization variables), and $z_k$ denotes the integer variables associated with the kth storage device (e.g., auxiliary binary optimization variables). The vectors $x_{lb,k}$, $x_{ub,k}$, $z_{lb,k}$, and $z_{ub,k}$ represent the box (bound) constraints on the decision variables. The matrices $A_{x,k}$, $A_{z,k}$, $H_{x,k}$, and $H_{z,k}$ and the vectors $b_k$ and $g_k$ are associated with the inequality constraints and the equality constraints for the kth storage device.

The optimization constraints may ensure that the predicted SOC for each of storage 430 is maintained between a minimum SOC $Q_{min}$ and a maximum SOC $Q_{max}$. The optimization constraints may also ensure that the charge/discharge rate is maintained between a minimum charge rate $\dot{Q}_{min}$ and maximum charge rate $\dot{Q}_{max}$. In some embodiments, the optimization constraints include terminal constraints imposed on the SOC at the end of the optimization period. For example, the optimization constraints can ensure that one or more of storage 430 are full at the end of the optimization period (i.e., "tank forced full" constraints).

Figure 11:
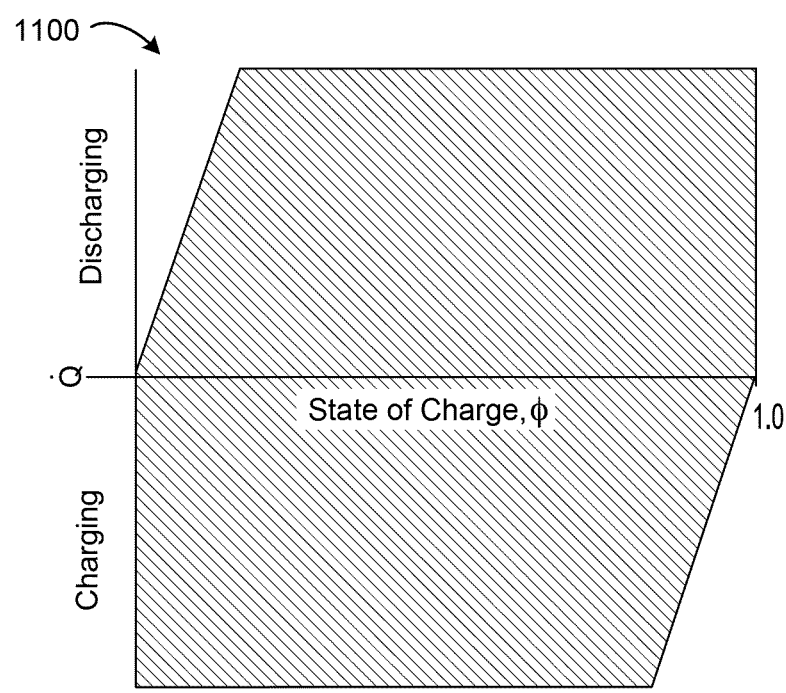
FIG. 11 is a graph of an operational domain for a storage device of a central plant, according to an exemplary embodiment.

In some embodiments, storage models 938 store mixed constraints for each of storage 430. Mixed constraints may be needed in the case that the operational domain of storage 430 is similar to that shown in FIG. 11. FIG. 11 is a graph 1100 of an example operational domain for a thermal energy storage tank or thermal energy storage subplant (e.g., TES subplants 431-432). Graph 1100 illustrates a scenario in which the discharge rate is limited to less than a maximum discharge rate at low SOCs, whereas the charge rate is limited to less than a maximum charge rate at high SOCs. In a thermal energy storage tank, the constraints on the discharge rate at low SOCs may be due to mixing between layers of the tank. For TES subplants 431-432 and the TES tanks that form TES subplants 431-432, the SOC represents the fraction of the current tank level or:

$$\phi = \frac{Q - Q_{min}}{Q_{max} - Q_{min}}$$

where Q is the current tank level, $Q_{min}$ is the minimum tank level, $Q_{max}$ is the maximum tank level, and $\phi \in [0,1]$ is the SOC. Since the maximum rate of discharge or charge may depend on the SOC at low or high SOC, SOC dependent bounds on the maximum rate of discharge or charge may be included.

In some embodiments, storage models 938 store SOC models for each of storage 430.

The SOC model for a thermal energy storage tank may be an integrator model given by:

$$\phi(k+1) = \phi(k) - \delta t_s \frac{\dot{Q}(k)}{Q_{max} - Q_{min}}$$

where $\dot{Q}(k)$ is the charge/discharge rate and $\delta t_s$. Positive values of $\dot{Q}(k)$ represent discharging, whereas negative values of $\dot{Q}(k)$ represent charging. The mixed constraints depicted in FIG. 11 can be accounted for as follows:

$$a_{mixed}\phi(k) + b_{mixed} \leq \dot{Q}(k)$$

$$0 \leq \phi(k) \leq 1$$

$$-\dot{Q}_{charge,max} \leq \dot{Q}(k) \leq \dot{Q}_{discharge,max}$$

where $a_{mixed}$ and $b_{mixed}$ are vectors of the same dimension that describe any mixed linear inequality constraints (e.g., constraints that depend on both the SOC and the discharge/charge rate). The second constraint (i.e., $0 \leq \phi(k) \leq 1$) is the constraint on the SOC. The last constraint limits the rate of charging and discharging within bound.

In some embodiments, storage models 938 include models that treat the air within the building and/or the building mass as a form of energy storage. However, one of the key differentiators between an airside mass and storage 430 is that additional care must be taken to ensure feasibility of the optimization problem (e.g., soft constraining of the state constraints). Nevertheless, airside optimization units share many common features and mathematical operations as storage 430. In some embodiments, a state-space representation of airside dynamics can be used to describe the predicted evolution of airside optimization units (e.g., building mass). Such a model may have the form:

$$x(k+1) = Ax(k) + Bu(k)$$

where $x(k)$ is the airside optimization unit state vector, $u(k)$ is the airside optimization unit input vector, and A and B are the system matrices. In general, an airside optimization unit or the control volume that the dynamic model describes may represent a region (e.g., multiple HVAC zones served by the same air handling unit) or an aggregate of several regions (e.g., an entire building).

Element Links

Still referring to FIG. 9, element models 930 are shown to include element links 940. In some embodiments, element links 940 define the connections between sources 410, subplants 420, storage 430, and sinks 440. These links 940 are shown as lines connecting various elements in plant resource diagrams 500 and 550. For example, element links 940 may define which of sources 410 provide resources to each of subplants 420, which subplants 420 are connected to which storage 430, and which subplants 420 and/or storage 430 provide resources to each of sinks 440. Element links 940 may contain the data and methods needed to create and solve an instance of the high level optimization problem.

In some embodiments, element links 940 link sources 410, subplants 420, storage 430, and sinks 440 (i.e., the high level problem elements) using a netlist of connections between high level problem elements. The information provided by element links 940 may allow multiple subplants 420, storage 430, sinks 440, and sources of the same type to be defined. Rather than assuming that all elements contribute to and draw from a common pool of each resource, element links 940 can be used to specify the particular connections between elements. Accordingly, multiple resources of the same type can be defined such that a first subset of subplants 420 produce a first resource of a given type (e.g., Chilled Water A), whereas a second subset of subplants 420 produce a second resource of the same type (e.g., Chilled Water B). Such a configuration is shown in FIG. 5B. Advantageously, element links 940 can be used to build constraints that reflect the actual physical connections between equipment in a central plant.

In some embodiments, element links 940 are used to account for the distribution costs of resources between elements of asset allocation system 400 (e.g., from sources 410 to subplants 420, from subplants 420 to sinks 440, etc.) and/or the distribution efficiency of each connection. In some cases it may be necessary to include costs for delivering the resource along a connection, or an efficiency of the transportation (amount or percentage of resources received on the other side of the connection). Accounting for distribution costs and/or distribution efficiency may affect the result of the optimization in some situations. For example, consider a first chiller subplant 420 that is highly efficient and can provide a chilled water resource to sinks 440, but it costs significantly more (e.g., due to pumping costs etc.) to transport the resource from the first chiller subplant 420 rather than from a second chiller subplant 420. In that scenario, asset allocator 402 may determine that the first chiller subplant 420 should be used only if necessary. Additionally, energy could be lost during transportation along a particular connection (e.g., chilled water temperature may increase over a long pipe). This could be described as an efficiency of the connection.

The resource balance constraint can be modified to account for distribution efficiency as follows:

$$\sum_{sources} \alpha_{source,resource} \text{purchase}_{resource,time} +$$
$$\sum_{subplants} \alpha_{subplant,resource} \text{produces}(x_{internal,time},$$
$$x_{external,time}, v_{uncontrolled,time}) - \sum_{subplants} \frac{1}{\alpha_{source,resource}}$$
$$\text{consumes}(x_{internal,time}, x_{external,time}, v_{uncontrolled,time}) +$$
$$\sum_{storages} \text{discharges}_{resource}(x_{internal,time}, x_{external,time}) -$$
$$\frac{1}{\alpha_{sink,resource}} \sum_{sinks} \text{requests}_{resource} =$$
$$0 \ \forall \text{ resources}, \forall \text{ time} \in \text{horizon}$$

where the $\alpha$ terms are loss factors with values between zero and one.

The cost function can be modified to account for transportation costs as follows:

$$J(x) = \sum_{sources} \sum_{horizon} \text{cost}(\text{purchase}_{resource,time}, \text{time}) +$$
$$\ldots + \sum_{connection} \lambda_{connection} \text{resource}_{connection}$$

where $\lambda_{connection}$ is the cost per unit resource transported along a particular connection and $\text{resource}_{connection}$ is the amount of the resource transported along the connection. Accordingly, the final term of the cost function accounts for transportation costs along each of the connections or links between elements in asset allocation system 400.

Demand Charges

Still referring to FIG. 9, asset allocator 402 is shown to include a demand charge module 906. Demand charge module 906 can be configured to modify the cost function $J(x)$ and the optimization constraints to account for one or more demand charges. As previously described, demand charges are costs imposed by sources 410 based on the peak consumption of a resource from sources 410 during various demand charge periods (i.e., the peak amount of the resource purchased from the utility during any time step of the applicable demand charge period). For example, an electric utility may define one or more demand charge periods and may impose a separate demand charge based on the peak electric consumption during each demand charge period. Electric energy storage can help reduce peak consumption by storing electricity in a battery when energy consumption is low and discharging the stored electricity from the battery when energy consumption is high, thereby reducing peak electricity purchased from the utility during any time step of the demand charge period.

In some instances, one or more of the resources purchased from 410 are subject to a demand charge or multiple demand charges. There are many types of potential demand charges as there are different types of energy rate structures. The most common energy rate structures are constant pricing, time of use (TOU), and real time pricing (RTP). Each demand charge may be associated with a demand charge period during which the demand charge is active. Demand charge periods can overlap partially or completely with each other and/or with the optimization period. Demand charge periods can include relatively long periods (e.g., monthly, seasonal, annual, etc.) or relatively short periods (e.g., days, hours, etc.). Each of these periods can be divided into several sub-periods including off-peak, partial-peak, and/or on-peak. Some demand charge periods are continuous (e.g., beginning Jan. 1, 2017 and ending Jan. 31, 2017), whereas other demand charge periods are non-continuous (e.g., from 11:00 AM-1:00 PM each day of the month).

Over a given optimization period, some demand charges may be active during some time steps that occur within the optimization period and inactive during other time steps that occur during the optimization period. Some demand charges may be active over all the time steps that occur within the optimization period. Some demand charges may apply to some time steps that occur during the optimization period and other time steps that occur outside the optimization period (e.g., before or after the optimization period). In some embodiments, the durations of the demand charge periods are significantly different from the duration of the optimization period.

Advantageously, demand charge module 906 may be configured to account for demand charges in the high level optimization process performed by asset allocator 402. In some embodiments, demand charge module 906 incorporates demand charges into the optimization problem and the cost function J(x) using demand charge masks and demand charge rate weighting factors. Each demand charge mask may correspond to a particular demand charge and may indicate the time steps during which the corresponding demand charge is active and/or the time steps during which the demand charge is inactive. Each rate weighting factor may also correspond to a particular demand charge and may scale the corresponding demand charge rate to the time scale of the optimization period.

The demand charge term of the cost function J(x) can be expressed as:

$$J(x) = \cdots \sum_{s \in sources} \sum_{q \in demands_s} w_{demand,s,q} r_{demand,s,q} \max_{i \in demand_{s,q}} (purchase_{s,i}) \cdots$$

where the max( ) function selects the maximum amount of the resource purchased from source s during any time step i that occurs during the optimization period. However, the demand charge period associated with demand charge q may not cover all of the time steps that occur during the optimization period. In order to apply the demand charge q to only the time steps during which the demand charge q is active, demand charge module 906 can add a demand charge mask to the demand charge term as shown in the following equation:

$$J(x) = \cdots \sum_{s \in sources} \sum_{q \in demands_s} w_{demand,s,q} r_{demand,s,q} \max_{i \in demand_{s,q}} (g_{s,q,i} purchase_{s,i}) \cdots$$

where $g_{s,q,i}$ is an element of the demand charge mask.

The demand charge mask may be a logical vector including an element $g_{s,q,i}$ for each time step i that occurs during the optimization period. Each element $g_{s,q,i}$ of the demand charge mask may include a binary value (e.g., a one or zero) that indicates whether the demand charge q for source s is active during the corresponding time step i of the optimization period. For example, the element $g_{s,q,i}$ may have a value of one (i.e., $g_{s,q,i}=1$) if demand charge q is active during time step i and a value of zero (i.e., $g_{s,q,i}=0$) if demand charge q is inactive during time step i. An example of a demand charge mask is shown in the following equation:

$$g_{s,q} = [0,0,0,1,1,1,1,0,0,0,1,1]^T$$

where $g_{s,q,1}$, $g_{s,q,2}$, $g_{s,q,3}$, $g_{s,q,8}$, $g_{s,q,9}$, and $g_{s,q,10}$ have values of zero, whereas $g_{s,q,4}$, $g_{s,q,5}$, $g_{s,q,6}$, $g_{s,q,7}$, $g_{s,q,11}$, and $g_{s,q,12}$ have values of one. This indicates that the demand charge q is inactive during time steps i=1, 2, 3, 8, 9, 10 (i.e., $g_{s,q,i}=0$ ∀i=1, 2, 3, 8, 9, 10) and active during time steps i=4, 5, 6, 7, 11, 12 (i.e., $g_{s,q,i}=1$ ∀i=4, 5, 6, 7, 11, 12). Accordingly, the term $g_{s,q,i} purchase_{s,i}$ within the max( ) function may have a value of zero for all time steps during which the demand charge q is inactive. This causes the max( ) function to select the maximum purchase from source s that occurs during only the time steps for which the demand charge q is active.

In some embodiments, demand charge module 906 calculates the weighting factor $w_{demand,s,q}$ for each demand charge q in the cost function J(x). The weighting factor $w_{demand,s,q}$ may be a ratio of the number of time steps the corresponding demand charge q is active during the optimization period to the number of time steps the corresponding demand charge q is active in the remaining demand charge period (if any) after the end of the optimization period. For example, demand charge module 906 can calculate the weighting factor $w_{demand,s,q}$ using the following equation:

$$w_{demand,s,q} = \frac{\sum_{i=k}^{k+h-1} g_{s,q,i}}{\sum_{i=k+h}^{period\_end} g_{s,q,i}}$$

where the numerator is the summation of the number of time steps the demand charge q is active in the optimization period (i.e., from time step k to time step k+h−1) and the denominator is the number of time steps the demand charge q is active in the portion of the demand charge period that occurs after the optimization period (i.e., from time step k+h to the end of the demand charge period).

The following example illustrates how demand charge module 906 can incorporate multiple demand charges into the cost function J(x). In this example, a single source of electricity (e.g., an electric grid) is considered with multiple demand charges applicable to the electricity source (i.e., q=1 . . . N, where N is the total number of demand charges). The system includes a battery asset which can be allocated over the optimization period by charging or discharging the battery during various time steps. Charging the battery increases the amount of electricity purchased from the electric grid, whereas discharging the battery decreases the amount of electricity purchased from the electric grid.

Demand charge module 906 can modify the cost function J(x) to account for the N demand charges as shown in the following equation:

$$J(x) = \cdots + w_{d_1} r_{d_1} \max_i \ (g_{1_i}(-P_{bat_i} + eLoad_i)) +$$
$$\cdots + w_{d_q} r_{d_q} \max_i \ (g_{q_i}(-P_{bat_i} + eLoad_i)) +$$
$$\cdots + w_{d_N} r_{d_N} \max_i \ (g_{N_i}(-P_{bat_i} + eLoad_i))$$

where the term $-P_{bat_i} + eLoad_i$ represents the total amount of electricity purchased from the electric grid during time step i (i.e., the total electric load $eLoad_i$ minus the power discharged from the battery $P_{bat_i}$). Each demand charge q=1 . . . N can be accounted for separately in the cost function j(x) by including a separate max( ) function for each of the N demand charges. The parameter $r_{d_q}$ indicates the demand charge rate associated with the qth demand charge (e.g., $/kW) and the weighting factor $w_{d_q}$ indicates the weight applied to the qth demand charge.

Demand charge module 906 can augment each max( ) function with an element $g_{q_i}$ of the demand charge mask for the corresponding demand charge. Each demand charge mask may be a logical vector of binary values which indicates whether the corresponding demand charge is active or inactive at each time step i of the optimization period. Accordingly, each max( ) function may select the maximum electricity purchase during only the time steps the corresponding demand charge is active. Each max( ) function can be multiplied by the corresponding demand charge rate $r_{d_q}$ and the corresponding demand charge weighting factor $w_{d_q}$ to determine the total demand charge resulting from the battery allocation $P_{bat}$ over the duration of the optimization period.

In some embodiments, demand charge module 906 linearizes the demand charge terms of the cost function (x) by introducing an auxiliary variable $d_q$ for each demand charge q. In the case of the previous example, this will result in N auxiliary variables $d_1$ . . . $d_N$ being introduced as decision variables in the cost function J(x). Demand charge module 906 can modify the cost function J(x) to include the linearized demand charge terms as shown in the following equation:

$$J(x) = \ldots + w_{d_1} r_{d_1} d_1 + \ldots + w_{d_q} r_{d_q} d_q + \ldots + w_{d_N} r_{d_N} d_N$$

Demand charge module 906 can impose the following constraints on the auxiliary demand charge variables $d_1$ . . . $d_N$ to ensure that each auxiliary demand charge variable represents the maximum amount of electricity purchased from the electric utility during the applicable demand charge period:

$$d_1 \geq g_{1_i}(-P_{bat_i} + eLoad_i) \quad \forall \ i = k \ldots k + h - 1, g_{1_i} \neq 0$$
$$d_1 \geq 0 \qquad \vdots$$
$$d_q \geq g_{q_i}(-P_{bat_i} + eLoad_i) \quad \forall \ i = k \ldots k + h - 1, g_{q_i} \neq 0$$
$$d_q \geq 0 \qquad \vdots$$
$$d_N \geq g_{N_i}(-P_{bat_i} + eLoad_i) \quad \forall \ i = k \ldots k + h - 1, g_{N_i} \neq 0$$
$$d_N \geq 0$$

In some embodiments, the number of constraints corresponding to each demand charge q is dependent on how many time steps the demand charge q is active during the optimization period. For example, the number of constraints for the demand charge q may be equal to the number of non-zero elements of the demand charge mask $g_q$. Furthermore, the value of the auxiliary demand charge variable $d_q$ at each iteration of the optimization may act as the lower bound of the value of the auxiliary demand charge variable $d_q$ at the following iteration.

Consider the following example of a multiple demand charge structure. In this example, an electric utility imposes three monthly demand charges. The first demand charge is an all-time monthly demand charge of 15.86 $/kWh which applies to all hours within the entire month. The second demand charge is an on-peak monthly demand charge of 1.56 $/kWh which applies each day from 12:00-18:00. The third demand charge is a partial-peak monthly demand charge of 0.53 $/kWh which applies each day from 9:00-12:00 and from 18:00-22:00.

For an optimization period of one day and a time step of one hour (i.e., i=1 . . . 24), demand charge module 906 may introduce three auxiliary demand charge variables. The first auxiliary demand charge variable $d_1$ corresponds to the all-time monthly demand charge; the second auxiliary demand charge variable $d_2$ corresponds to the on-peak monthly demand charge; and the third auxiliary demand charge variable $d_3$ corresponds to the partial-peak monthly demand charge. Demand charge module 906 can constrain each auxiliary demand charge variable to be greater than or equal to the maximum electricity purchase during the hours the corresponding demand charge is active, using the inequality constraints described above.

Demand charge module 906 can generate a demand charge mask $g_q$ for each of the three demand charges (i.e., q=1 . . . 3), where $g_q$ includes an element for each time step of the optimization period (i.e., $g_q = [g_1 \ldots g_{q_{24}}]$). The three demand charge masks can be defined as follows:

$$g_{1_i} = 1 \ \forall i = 1 \ldots 24$$

$$g_{2_i} = 1 \ \forall i = 12 \ldots 18$$

$$g_{3_i} = 1 \ \forall i = 9 \ldots 12, 18 \ldots 22$$

with all other elements of the demand charge masks equal to zero. In this example, it is evident that more than one demand charge constraint will be active during the hours which overlap with multiple demand charge periods. Also, the weight of each demand charge over the optimization period can vary based on the number of hours the demand charge is active, as previously described.

In some embodiments, demand charge module 906 considers several different demand charge structures when incorporating multiple demand charges into the cost function J(x) and optimization constraints. Demand charge structures can vary from one utility to another, or the utility may offer several demand charge options. In order to incorporate the multiple demand charges within the optimization framework, a generally-applicable framework can be defined as previously described. Demand charge module 906 can translate any demand charge structure into this framework. For example, demand charge module 906 can characterize each demand charge by rates, demand charge period start, demand charge period end, and active hours. Advantageously, this allows demand charge module 906 to incorporate multiple demand charges in a generally-applicable format.

The following is another example of how demand charge module 906 can incorporate multiple demand charges into the cost function J(x). Consider, for example, monthly demand charges with all-time, on-peak, partial-peak, and off-peak. In this case, there are four demand charge structures, where each demand charge is characterized by twelve monthly rates, twelve demand charge period start (e.g., beginning of each month), twelve demand charge period end (e.g., end of each month), and hoursActive. The hoursActive is a logical vector where the hours over a year where the demand charge is active are set to one. When running the optimization over a given horizon, demand charge module 906 can implement the applicable demand charges using the hoursActive mask, the relevant period, and the corresponding rate.

In the case of an annual demand charge, demand charge module 906 can set the demand charge period start and period end to the beginning and end of a year. For the annual demand charge, demand charge module 906 can apply a single annual rate. The hoursActive demand charge mask can represent the hours during which the demand charge is active. For an annual demand charge, if there is an all-time, on-peak, partial-peak, and/or off-peak, this translates into at most four annual demand charges with the same period start and end, but different hoursActive and different rates.

In the case of a seasonal demand charge (e.g., a demand charge for which the maximum peak is determined over the indicated season period), demand charge module 906 can represent the demand charge as an annual demand charge. Demand charge module 906 can set the demand charge period start and end to the beginning and end of a year. Demand charge module 906 can set the hoursActive to one during the hours which belong to the season and to zero otherwise. For a seasonal demand charge, if there is an All-time, on-peak, partial, and/or off-peak, this translates into at most four seasonal demand charges with the same period start and end, but different hoursActive and different rates.

In the case of the average of the maximum of current month and the average of the maxima of the eleven previous months, demand charge module 906 can translate the demand charge structure into a monthly demand charge and an annual demand charge. The rate of the monthly demand charge may be half of the given monthly rate and the annual rate may be the sum of given monthly rates divided by two. These and other features of demand charge module 906 are described in greater detail in U.S. patent application Ser. No. 15/405,236 filed Jan. 12, 2017, the entire disclosure of which is incorporated by reference herein.

Incentive Programs

Referring again to FIG. 9, asset allocator 402 is shown to include an incentive program module 908. Incentive program module 908 may modify the optimization problem to account for revenue from participating in an incentive-based demand response (IBDR) program. IBDR programs may include any type of incentive-based program that provides revenue in exchange for resources (e.g., electric power) or a reduction in a demand for such resources. For example, asset allocation system 400 may provide electric power to an energy grid or an independent service operator as part of a frequency response program (e.g., PJM frequency response) or a synchronized reserve market. In a frequency response program, a participant contracts with an electrical supplier to maintain reserve power capacity that can be supplied or removed from an energy grid by tracking a supplied signal. The participant is paid by the amount of power capacity required to maintain in reserve. In other types of IBDR programs, asset allocation system 400 may reduce its demand for resources from a utility as part of a load shedding program. It is contemplated that asset allocation system 400 may participate in any number and/or type of IBDR programs.

In some embodiments, incentive program module 908 modifies the cost function J(x) to include revenue generated from participating in an economic load demand response (ELDR) program. ELDR is a type of IBDR program and similar to frequency regulation. In ELDR, the objective is to maximize the revenue generated by the program, while using the battery to participate in other programs and to perform demand management and energy cost reduction. To account for ELDR program participation, incentive program module 908 can modify the cost function J(x) to include the following term:

$$\min_{b_i, P_{bat_i}} \left( -\sum_{i=k}^{k+h-1} b_i r_{ELDR_i}(adjCBL_i - (eLoad_i - P_{bat_i})) \right)$$

where $b_i$ is a binary decision variable indicating whether to participate in the ELDR program during time step i, $r_{ELDR_i}$ is the ELDR incentive rate at which participation is compensated, and $adjCBL_i$ is the symmetric additive adjustment (SAA) on the baseline load. The previous expression can be rewritten as:

$$\min_{b_i, P_{bat_i}} \left( -\sum_{i=k}^{k+h-1} b_i r_{ELDR_i} \left( \sum_{l=1}^{4} \frac{e_{li}}{4} + \sum_{p=m-4}^{m-2} \frac{1}{3}\left(eLoad_p - P_{bat_p} - \sum_{l=1}^{4}\frac{e_{lp}}{4}\right) - (eLoad_i - P_{bat_i}) \right) \right)$$

where $e_{li}$ and $e_{lp}$ are the electric loads at the lth hour of the operating day.

In some embodiments, incentive program module 908 handles the integration of ELDR into the optimization problem as a bilinear problem with two multiplicative decision variables. In order to linearize the cost function J(x) and customize the ELDR problem to the optimization framework, several assumptions may be made. For example, incentive program module 908 can assume that ELDR participation is only in the real-time market, balancing operating reserve charges and make whole payments are ignored, day-ahead prices are used over the horizon, real-time prices are used in calculating the total revenue from ELDR after the decisions are made by the optimization algorithm, and the decision to participate in ELDR is made in advance and passed to the optimization algorithm based on which the battery asset is allocated.

In some embodiments, incentive program module 908 calculates the participation vector $b_i$ as follows:

$$b_i = \begin{cases} 1 & \forall i/r_{DA_i} \geq NBT_i \text{ and } i \in S \\ 0 & \text{otherwise} \end{cases}$$

where $r_{DA_i}$ is the hourly day-ahead price at the ith hour, $NBT_i$ is the net benefits test value corresponding to the month to which the corresponding hour belongs, and S is the set of nonevent days. Nonevent days can be determined for the year by choosing to participate every x number of days with the highest day-ahead prices out of y number of days for a given day type. This approach may ensure that there are nonevent days in the 45 days prior to a given event day when calculating the CBL for the event day.

Given these assumptions and the approach taken by incentive program module 908 to determine when to participate in ELDR, incentive program module 908 can adjust the cost function J(x) as follows:

$$J(x) = -\sum_{i=k}^{k+h-1} r_{e_i} P_{bat_i} - \sum_{i=k}^{k+h-1} r_{FR_i} P_{FR_i} +$$

$$\sum_{i=k}^{k+h-1} r_{s_i} s_i + w_d r_d d - \sum_{i=k}^{k+h-1} b_i r_{DA_i} \left( \sum_{p=m-4}^{m-2} -\frac{1}{3} P_{bat_p} + P_{bat_i} \right)$$

where $b_i$ and m are known over a given horizon. The resulting term corresponding to ELDR shows that the rates at the ith participation hour are doubled and those corresponding to the SAA are lowered. This means it is expected that high level optimizer 632 will tend to charge the battery during the SAA hours and discharge the battery during the participation hours. Notably, even though a given hour is set to be an ELDR participation hour, high level optimizer 632 may not decide to allocate any of the battery asset during that hour. This is due to the fact that it may be more beneficial at that instant to participate in another incentive program or to perform demand management.

To build the high level optimization problem, optimization problem constructor 910 may query the number of decision variables and constraints that each subplant 420, source 410, storage 430, and site specific constraint adds to the problem. In some embodiments, optimization problem constructor 910 creates optimization variable objects for each variable of the high level problem to help manage the flow of data. After the variable objects are created, optimization problem constructor 910 may pre-allocate the optimization matrices and vectors for the problem. Element links 940 can then be used to fill in the optimization matrices and vectors by querying each component. The constraints associated with each subplant 420 can be filled into the larger problem-wide optimization matrix and vector. Storage constraints can be added, along with demand constraints, demand charges, load balance constraints, and site-specific constraints.

Extrinsic Variables

In some embodiments, asset allocator 402 is configured to optimize the use of extrinsic variables. Extrinsic variables can include controlled or uncontrolled variables that affect multiple subplants 420 (e.g., condenser water temperature, external conditions such as outside air temperature, etc.). In some embodiments, extrinsic variables affect the operational domain of multiple subplants 420. There are many methods that can be used to optimize the use of extrinsic variables. For example, consider a chiller subplant connected to a cooling tower subplant. The cooling tower subplant provides cooling for condenser water provided as an input to the chiller. Several scenarios outlining the use of extrinsic variables in this example are described below.

In a first scenario, both the chiller subplant and the tower subplant have operational domains that are not dependent on the condenser water temperatures. In this scenario, the condenser water temperature can be ignored (e.g., excluded from the set of optimization variables) since the neither of the operational domains are a function of the condenser water temperature.

In a second scenario, the chiller subplant has an operational domain that varies with the entering condenser water temperature. However, the cooling tower subplant has an operational domain that is not a function of the condenser water temperature. For example, the cooling tower subplant may have an operational domain that defines a relationship between fan power and water usage, independent from its leaving condenser water temperature or ambient air wet bulb temperature. In this case, the operational domain of the chiller subplant can be sliced (e.g., a cross section of the operational domain can be taken) at the condenser water temperature indicated at each point in the optimization period.

In a third scenario, the cooling tower subplant has an operational domain that depends on its leaving condenser water temperature. Both the entering condenser water temperature of the chiller subplant and the leaving condenser water temperature of the cooling tower subplant can be specified so the operational domain will be sliced at those particular values. In both the second scenario and the third scenario, asset allocator 402 may produce variables for the condenser water temperature. In the third scenario, asset allocator 402 may produce the variables for both the tower subplant and the chiller subplant. However, these variables will not become decision variables because they are simply specified directly In a fourth scenario, the condenser water temperature affects the operational domains of both the cooling tower subplant and the chiller subplant. Because the condenser water temperature is not specified, it may become an optimization variable that can be optimized by asset allocator 402. In this scenario, the optimization variable is produced when the first subplant (i.e., either the chiller subplant or the cooling tower subplant) reports its optimization size. When the second subplant is queried, no additional variable is produced. Instead, asset allocator 402 may recognize the shared optimization variable as the same variable from the connection netlist.

When asset allocator 402 asks for constraints from the individual subplants 420, subplants 420 may send those constraints using local indexing. Asset allocator 402 may then disperse these constraints by making new rows in the optimization matrix, but also distributing the column to the correct columns based on its own indexing for the entire optimization problem. In this way, extrinsic variables such as condenser water temperature can be incorporated into the optimization problem in an efficient and optimal manner.

Commissioned Constraints

Some constraints may arise due to mechanical problems after the energy facility has been built. These constraints are site specific and may not be incorporated into the main code for any of the subplants or the high level problem itself. Instead, constraints may be added without software update on site during the commissioning phase of the project. Furthermore, if these additional constraints are known prior to the plant build they could be added to the design tool run. Commissioned constraints can be held by asset allocator 402 and can be added constraints to any of the ports or connections of subplants 420. Constraints can be added for the consumption, production, or extrinsic variables of a subplant.

As an example implementation, two new complex type internals can be added to the problem. These internals can store an array of constraint objects that include a dictionary to describe inequality and equality constraints, times during which the constraints are active, and the elements of the horizon the constraints affect. In some embodiments, the dictionaries have keys containing strings such as (subplantUserName).(portInternalName) and values that represent the linear portion of the constraint for that element of the constraint matrix. A special "port name" could exist to reference whether the subplant is running. A special key can be used to specify the constant part of the constraint or the right hand side. A single dictionary can describe a single linear constraint.

Operational Domains

Figure 12:
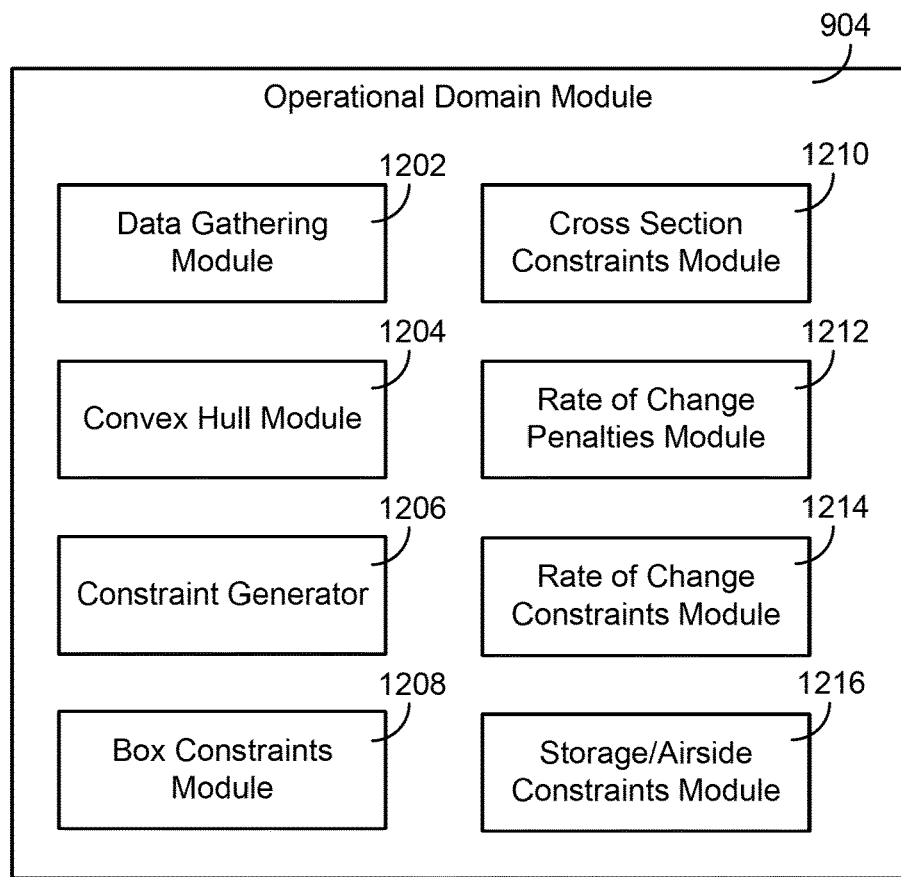
FIG. 12 is a block diagram illustrating the operational domain module of FIG. 9 in greater detail, according to an exemplary embodiment.

Referring now to FIGS. 9 and 12, asset allocator 402 is shown to include an operational domain module 904. Operational domain module 904 can be configured to generate and store operational domains for various elements of the high level optimization problem. For example, operational domain module 904 can create and store operational domains for one or more of sources 410, subplants 420, storage 430, and/or sinks 440. The operational domains for subplants 420 may describe the relationship between the resources, intrinsic variables, and extrinsic variables, and constraints for the rate of change variables (delta load variables). The operational domains for sources 410 may include the constraints necessary to impose any progressive/regressive rates (other than demand charges). The operational domain for storage 430 may include the bounds on the state of charge, bounds on the rate of charge/discharge, and any mixed constraints.

In some embodiments, the operational domain is the fundamental building block used by asset allocator 402 to describe the models (e.g., optimization constraints) of each high level element. The operational domain may describe the admissible values of variables (e.g., the inputs and the outputs of the model) as well as the relationships between variables.

Mathematically, the operational domain is a union of a collection of polytopes in an n-dimensional real space. Thus, the variables must take values in one of the polytopes of the operational domain. The operational domains generated by operational domain module 904 can be used to define and impose constraints on the high level optimization problem.

Referring particularly to FIG. 12, a block diagram illustrating operational domain module 904 in greater detail is shown, according to an exemplary embodiment. Operational domain module 904 can be configured to construct an operational domain for one or more elements of asset allocation system 400. In some embodiments, operational domain module 904 converts sampled data points into a collection of convex regions making up the operational domain and then generates constraints based on the vertices of the convex regions. Being able to convert sampled data points into constraints gives asset allocator 402 much generality. This conversion methodology is referred to as the constraint generation process. The constraint generation process is illustrated through a simple chiller subplant example, described in greater detail below.

FIG. 13 illustrates a subplant curve 1300 for a chiller subplant. Subplant curve 1300 is an example of a typical chiller subplant curve relating the electricity usage of the chiller subplant with the chilled water production of the chiller subplant. Although only two variables are shown in subplant curve 1300, it should be understood that the constraint generation process also applies to high dimensional problems. For example, the constraint generation process can be extended to the case that the condenser water return temperature is included in the chiller subplant operational domain. When the condenser water return temperature is included, the electricity usage of the chiller subplant can be defined as a function of both the chilled water production and the condenser water return temperature. This results in a three-dimensional operational domain. The constraint generation process described here applies to two-dimensional problems as well as higher dimensional problems.

Figure 14:
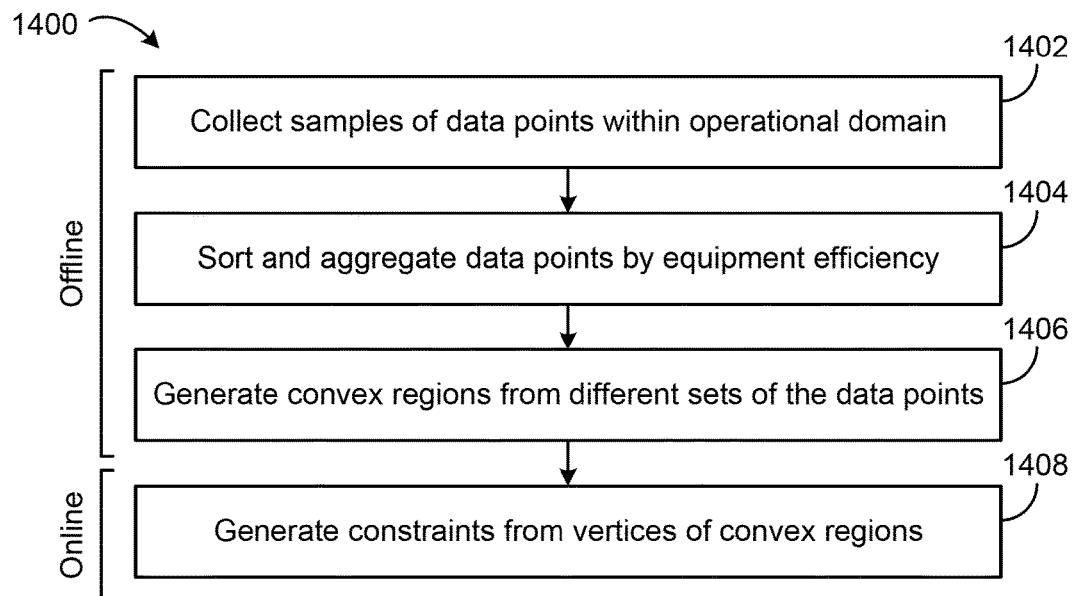
FIG. 14 is a flowchart of a process for generating optimization constraints based on samples of data points associated with an operational domain of a subplant, according to an exemplary embodiment.

Referring now to FIGS. 12 and 14, the components and functions of operational domain module 904 are described. FIG. 14 is a flowchart outlining the constraint generation process 1400 performed by operational domain module 904. Process 1400 is shown to include collecting samples of data points within the operational domain (step 1402). In some embodiments, step 1402 is performed by a data gathering module 1202 of operational domain module 904. Step 1402 can include sampling the operational domain (e.g., the high level subplant curve). For the operational tool (i.e., central plant controller 600), the data sampling may be performed by successively calling low level optimizer 634. For the planning tool 700, the data may be supplied by the user and asset allocator 402 may automatically construct the associated constraints.

In some embodiments, process 1400 includes sorting and aggregating data points by equipment efficiency (step 1404). Step 1404 can be performed when process 1400 is performed by planning tool 700. If the user specifies efficiency and capacity data on the equipment level (e.g., provides data for each chiller of the subplant), step 1404 can be performed to organize and aggregate the data by equipment efficiency.

Figure 15A:
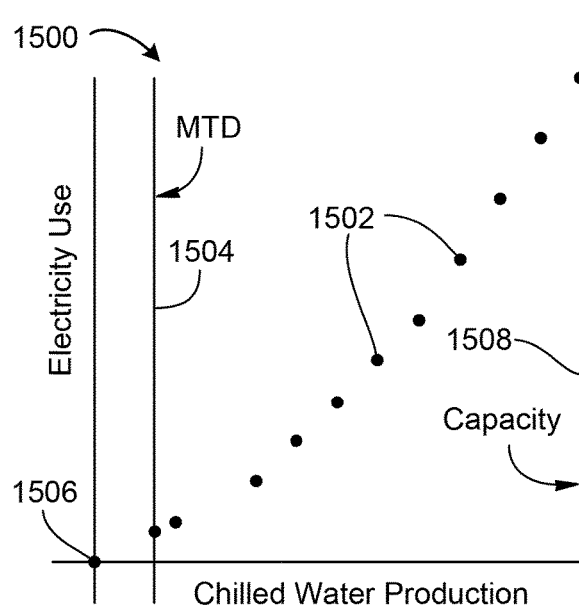
FIG. 15A is a graph illustrating a result of sampling the operational domain defined by the subplant curve of FIG. 13, according to an exemplary embodiment.

The result of steps 1402-1404 is shown in FIG. 15A. FIG. 15A is a plot 1500 of several data points 1502 collected in step 1402. Data points 1502 can be partitioned into two sets of points by a minimum turndown (MTD) threshold 1504. The first set of points includes a single point 1506 representing the performance of the chiller subplant when the chiller subplant is completely off (i.e., zero production and zero resource consumption). The second set of data points includes the points 1502 between the MTD threshold 1504 and the maximum capacity 1508 of the chiller subplant.

Process 1400 is shown to include generating convex regions from different sets of the data points (step 1406). In some embodiments, step 1406 is performed by a convex hull module 1204 of operational domain module 904. A set X is a "convex set" if for all points (x, y) in set X and for all $\theta \in [0,1]$, the point described by the linear combination $(1-\theta)x+\theta y$ also belongs in set X. A "convex hull" of a set of points is the smallest convex set that contains X. Convex hull module 1204 can be configured to generate convex regions from the sampled data by applying an n-dimensional convex hull algorithm to the data. In some embodiments, convex hull module 1204 uses the convex hull algorithm of Matlab (i.e., "convhulln"), which executes an n-dimensional convex hull algorithm. Convex hull module 1204 can identify the output of the convex hull algorithm as the vertices of the convex hull.

Figure 15B:
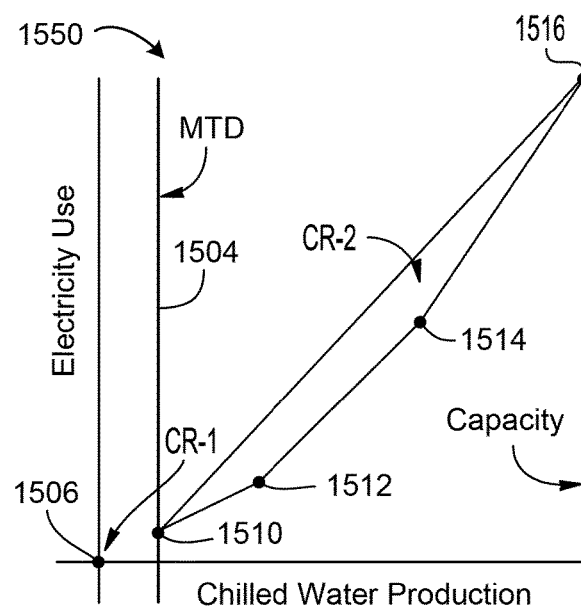
FIG. 15B is a graph illustrating a result of applying a convex hull algorithm to the sampled data points shown in FIG. 15A, according to an exemplary embodiment.

The result of step 1406 applied to the chiller subplant example is shown in FIG. 15B. FIG. 15B is a plot 1550 of two convex regions CR-1 and CR-2. Point 1506 is the output of the convex hull algorithm applied to the first set of points. Since only a single point 1506 exists in the first set, the first convex region CR-1 is the single point 1506. The points 1510, 1512, 1514, and 1516 are the output of the convex hull algorithm applied to the second set of points between the MTD threshold 1504 and the maximum capacity 1508. Points 1510-1516 define the vertices of the second convex region CR-2.

Figure 16:
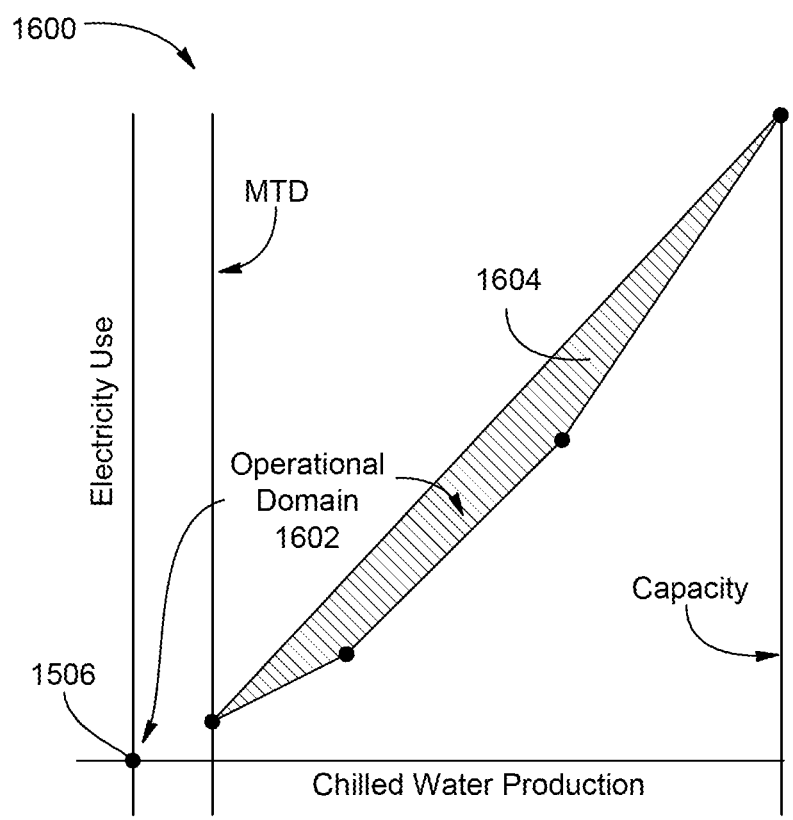
FIG. 16 is a graph of an operational domain for a chiller subplant which can be generated based on the sampled data points shown in FIG. 15A, according to an exemplary embodiment.

Process 1400 is shown to include generating constraints from vertices of the convex regions (step 1408). In some embodiments, step 1408 is performed by a constraint generator 1206 of operational domain module 904. The result of step 1408 applied to the chiller subplant example is shown in FIG. 16. FIG. 16 is a plot 1600 of the operational domain 1602 for the chiller subplant. Operational domain 1602 includes the set of points contained within both convex regions CR-1 and CR-2 shown in plot 1550. These points include the origin point 1506 as well as all of the points within area 1604.

Constraint generator 1206 can be configured to convert the operational domain 1602 and/or the set of vertices that define the operational domain 1602 into a set of constraints. Many methods exists to convert the vertices of the convex regions into optimization constraints. These methodologies produce different optimization formulations or different problem structures, but the solutions to these different formulations are equivalent. All methods effectively ensure that the computed variables (inputs and outputs) are within one of the convex regions of the operational domain. Nevertheless, the time required to solve the different formulations may vary significantly. The methodology described below has demonstrated better execution times in feasibility studies over other formulations.

MILP Formulation

In some embodiments, constraint generator 1206 uses a mixed integer linear programming (MILP) formulation to generate the optimization constraints. A few definitions are needed to present the MILP formulation. A subset P of $\mathbb{R}^d$ is called a convex polyhedron if it is the set of solutions to a finite system of linear inequalities (i.e., P={x: $a_j^T x \leq b_j$, j={1 ... m}). Note that this definition also allows for linear equalities because an equality may be written as two inequalities. For example, $c_j x = d_j$ is equivalent to $[c, -c_j]^T x \leq [d_j, -d_j]^T$. A convex polytope is a bounded convex polyhedron. Because the capacity of any subplant is bounded, constraint generator 1206 may exclusively work with convex polytopes.

In some embodiments, the MILP formulation used by constraint generator 1206 to define the operational domain is the logarithmic disaggregated convex combination model (DLog). The advantage of the DLog model is that only a logarithmic number of binary variables with the number of convex regions need to be introduced into the optimization problem as opposed to a linear number of binary variables. Reducing the number of binary variables introduced into the problem is advantageous as the resulting problem is typically computationally easier to solve.

Constraint generator 1206 can use the DLog model to capture which convex region is active through a binary numbering of the convex regions. Each binary variable represents a digit in the binary numbering. For example, if an operational domain consists of four convex regions, the convex regions can be numbered zero through three, or in binary numbering 00 to 11. Two binary variables can used in the formulation: $y_1 \in \{0,1\}$ and $Y_2 \in \{0,1\}$ where the first variable $y_1$ represents the first digit of the binary numbering and the second variable $Y_2$ represents the second digit of the binary numbering. If $y_1=0$ and $y_2=0$, the zeroth convex region is active. Similarly, $y_1=1$ and $y_2=0$, the second convex region is active. In the DLog model, a point in any convex region is represented by a convex combination of the vertices of the polytope that describes the convex region.

In some embodiments, constraint generator 1206 formulates the DLog model as follows: let $\mathcal{P}$ be the set of polytopes that describes the operational domain (i.e., $\mathcal{P}$ represents the collection of convex regions that make up the operational domain). Let $P_i \in \mathcal{P}$ (i=1, ..., $n_{CR}$) be the ith polytope which describes the ith convex region of the operational domain. Let $V(P_i)$ be the vertices of the ith polytope, and let $V(\mathcal{P}) := \cup_{P \in \mathcal{P}} V(P)$ be the vertices of all polytopes. In this formulation, an auxiliary continuous variable can be introduced for each vertex of each polytope of the operational domain, which is denoted by $\lambda_{P_i,v_j}$ where the subscripts denote that the continuous variable is for the jth vertex of the ith polytope. For this formulation, $\lceil \log_2 |\mathcal{P}| \rceil$ binary variables are needed where the function $\lceil \cdot \rceil$ denotes the ceiling function (i.e., $\lceil x \rceil$ is the smallest integer not less than x. Constraint generator 1206 can define an injective function B: $\mathcal{P} \{0,1\}^{\lceil \log_2 |\mathcal{P}| \rceil}$. The injective function may be interpreted as the binary numbering of the convex regions.

In some embodiments, the DLog formulation is given by:

$$\Sigma_{P \in \mathcal{P}} \Sigma_{v \in V(P)} \lambda_{P,v} v = x$$

$$\lambda_{P,v} \geq 0, \forall P \in \mathcal{P}, v \in V(P)$$

$$\Sigma_{P \in \mathcal{P}} \Sigma_{v \in V(P)} \lambda_{P,v} = 1$$

$$\Sigma_{P \in \mathcal{P}^+(B,l)} \Sigma_{v \in V(P)} \lambda_{P,v} \leq y_l, \forall l \in L(P)$$

$$\Sigma_{P \in \mathcal{P}^0(B,l)} \Sigma_{v \in V(P)} \lambda_{P,v} \leq (1-y_l), \forall l \in L(P)$$

$$y_l \in \{0,1\}, \forall l \in L(P)$$

where $\mathcal{P}^+(B, 1) := \{P \in \mathcal{P} : B(P)_l = 1\}$, $\mathcal{P}^0(B, 1) := \{P \in \mathcal{P} : B(P)_l = 0\}$, and $L(\mathcal{P}) := \{1, \ldots, \log_2 |\mathcal{P}|\}$. If there are shared vertices between the convex regions, a fewer number of continuous variables may need to be introduced.

To understand the injective function and the sets $\mathcal{P}^+(B, 1)$ and $\mathcal{P}^0(B, 1)$, consider again the operational domain consisting of four convex regions. Again, binary numbering can be used to number the sets from 00 to 11, and two binary variables can be used to represent each digit of the binary set numbering. Then, the injective function maps any convex region, which is a polytope, to a unique set of binary variables. Thus, $B(P_0)=[0,0]^T$, $B(P_1)=[0,1]^T$, $B(P_2)=[1,0]^T$, and $B(P_3)=[1,1]^T$. Also, for example, the sets $\mathcal{P}^+(B, 0):=\{P \in \mathcal{P}: B(P)_0=1\}=P_2 \cup P_3$ and $\mathcal{P}^0(B, 0):=(\{P \in \mathcal{P}: B(P)_0=0\}=P \mathcal{P} \cup P_1$.

Box Constraints

Still referring to FIG. 12, operational domain module 904 is shown to include a box constraints module 1208. Box constraints module 1208 can be configured to adjust the operational domain for a subplant 420 in the event that a device of the subplant 420 is unavailable or will be unavailable (e.g., device offline, device removed for repairs or testing, etc.). Reconstructing the operational domain by resampling the resulting high level operational domain with low level optimizer 634 can be used as an alternative to the adjustment performed by box constraints module 1208. However, reconstructing the operational domain in this manner may be time consuming. The adjustment performed by box constraints module 1208 may be less time consuming and may allow operational domains to be updated quickly when devices are unavailable. Also, owing to computational restrictions, it may be useful to use a higher fidelity subplant model for the first part of the prediction horizon. Reducing the model fidelity effectively means merging multiple convex regions.

In some embodiments, box constraints module 1208 is configured to update the operational domain by updating the convex regions with additional box constraints. Generating the appropriate box constraints may include two primary steps: (1) determining the admissible operational interval(s)

of the independent variable (e.g., the production of the subplant) and (2) generating box constraints that limit the independent variable to the admissible operational interval(s). Both of these steps are described in detail below.

In some embodiments, box constraints module 1208 determines the admissible operational interval (e.g., the subplant production) using an algorithm that constructs the union of intervals. Box constraints module 1208 may compute two convolutions. For example, let lb and ub be vectors with elements corresponding to the lower and upper bound of the independent variables of each available device within the subplant. Box constraints module 1208 can compute two convolutions to compute all possible combinations of lower and upper bounds with all the combinations of available devices on and off. The two convolutions can be defined as follows:

$$lb_{all,combos}^T = [0 \; \mathbb{1}] * [0 \, lb_T]$$

$$ub_{all,combos}^T = [0 \; \mathbb{1}] * [0 \, ub_T]$$

where $lb_{all,combos}$ and $ub_{all,combos}$ are vectors containing the elements with the lower and upper bounds with all combinations of the available devices on and off, $\mathbb{1}$ is a vector with all ones of the same dimension as lb and ub, and the operator * represents the convolution operator. Note that each element of $lb_{all,combos}$ and $ub_{all,combos}$ are subintervals of admissible operating ranges. In some embodiments, box constraints module 1208 computes the overall admissible operating range by computing the union of the subintervals.

To compute the union of the subintervals, box constraints module 1208 can define the vector v as follows:

$$v := [lb_{all,combos}^T, ub_{all,combos}^T]^T$$

and may sort the vector v from smallest to largest:

$$[t,p] = \text{sort}(v)$$

where t is a vector with sorted elements of v, p is a vector with the index position in v of each element in t. If $p_i \leq n$ where n is the dimension of $lb_{all,combos}$ and $ub_{all,combos}$, the ith element of t is a lower bound. However, if $p_i > n$, the ith element of t is an upper bound. Box constraints module 1208 may construct the union of the sub intervals by initializing a counter at zero and looping through each element of p starting with the first element. If the element corresponds to a lower bound, box constraints module 1208 may add one to the counter. However, if the element corresponds to an upper bound, box constraints module 1208 may subtract one from the counter. Once the counter is set to zero, box constraints module 1208 may determine that the end of the subinterval is reached. An example of this process is illustrated graphically in FIGS. 17A-17B.

Figure 17A:
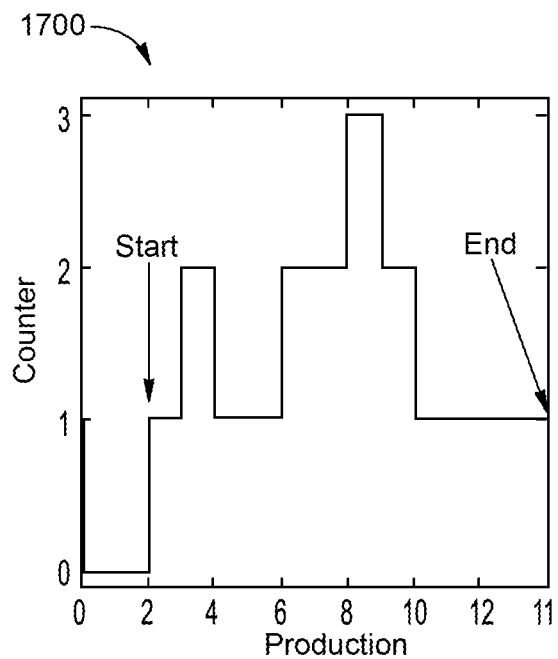
FIG. 17A is a graph illustrating a technique for identifying intervals of an operational domain for a subplant, which can be performed by the operational domain module of FIG. 12, according to an exemplary embodiment.
Figure 17B:
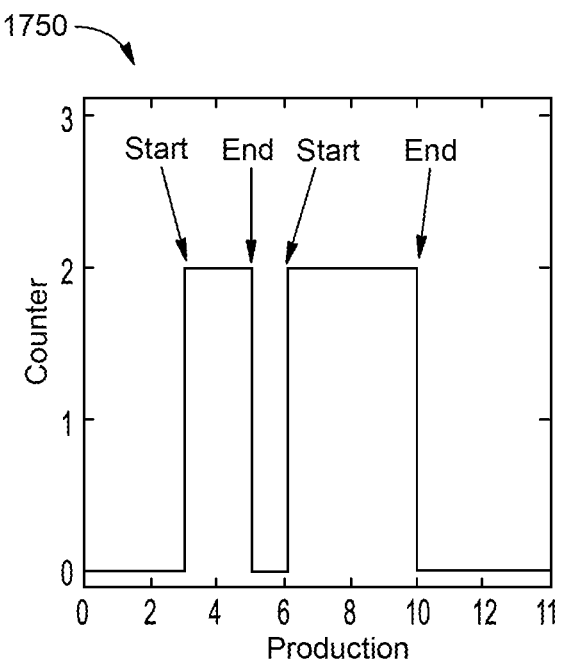
FIG. 17B is another graph illustrating the technique for identifying intervals of an operational domain for a subplant, which can be performed by the operational domain module of FIG. 12, according to an exemplary embodiment.

Referring now to FIGS. 17A-17B, a pair of graphs 1700 and 1750 illustrating the operational domain update procedure performed by box constraints module 1208 is shown, according to an exemplary embodiment. In this example, consider a subplant consisting of three devices where the independent variable is the production of the subplant. Let the first two devices have a minimum and maximum production of 3.0 and 5.0 units, respectively, and the third device has a minimum and maximum production of 2.0 and 4.0 units, respectively. The minimum production may be considered to be the minimum turndown of the device and the maximum production may be considered to be the device capacity. With all the devices available, the results of the two convolutions are:

$$lb_{all,combos}^T = [0.0, 2.0, 3.0, 5.0, 6.0, 8.0]$$

$$ub_{all,combos}^T = [0.0, 4.0, 5.0, 9.0, 10.0, 14.0]$$

The result of applying the counter algorithm to these convolutions with all the devices available is shown graphically in FIG. 17A. The start of an interval occurs when the counter becomes greater than 0 and the end of an interval occurs when the counter becomes 0. Thus, from FIG. 17A, the admissible production range of the subplant when all the devices are available is either 0 units if the subplant is off or any production from 2.0 to 14.0 units. In other words, the convex regions in the operational domain are {0} and another region including the interval from 2.0 to 14.0 units.

If one of the first two devices becomes unavailable, the subplant includes one device having a minimum and maximum production of 3.0 and 5.0 units, respectively, and another device having a minimum and maximum production of 2.0 and 4.0 units, respectively. Accordingly, the admissible production range of the subplant is from 2.0 to 9.0 units. This means that the second convex region needs to be updated so that it only contains the interval from 2.0 to 9.0 units.

If the third device becomes unavailable, the subplant includes two devices, both of which have a minimum and maximum production of 3.0 and 5.0 units, respectively. Therefore, the admissible range of production for the subplant is from 3.0 to 5.0 units and from 6.0 to 10.0 units. This result can be obtained using the convolution technique and counter method. For example, when the third device becomes unavailable, the two convolutions are (omitting repeated values):

$$lb_{all,combos}^T = [0.0, 3.0, 6.0]$$

$$ub_{all,combos}^T = [0.0, 5.0, 10.0]$$

The result of applying the counter algorithm to these convolutions with the third device unavailable is shown graphically in FIG. 17B. The start of an interval occurs when the counter becomes greater than 0 and the end of an interval occurs when the counter becomes 0. From FIG. 17B, the new admissible production range is from 3.0 to 5.0 units and from 6.0 to 10.0 units. Thus, if the third device is unavailable, there are three convex regions: {0}, the interval from 3.0 to 5.0 units, and the interval from 6.0 to 10.0 units. This means that the second convex region of the operational domain with all devices available needs to be split into two regions.

Once the admissible range of the independent variable (e.g., subplant production) has been determined, box constraints module 1208 can generate box constraints to ensure that the independent variable is maintained within the admissible range. Box constraints module 1208 can identify any convex regions of the original operational domain that have ranges of the independent variables outside the new admissible range. If any such convex ranges are identified, box constraints module 1208 can update the constraints that define these convex regions such that the resulting operational domain is inside the new admissible range for the independent variable. The later step can be accomplished by adding additional box constraints to the convex regions, which may be written in the general form $x_{lb} \leq x \leq x_{ub}$ where x is an optimization variable and $x_{lb}$ and $x_{ub}$ are the lower and upper bound, respectively, for the optimization variable x.

Figure 18A:
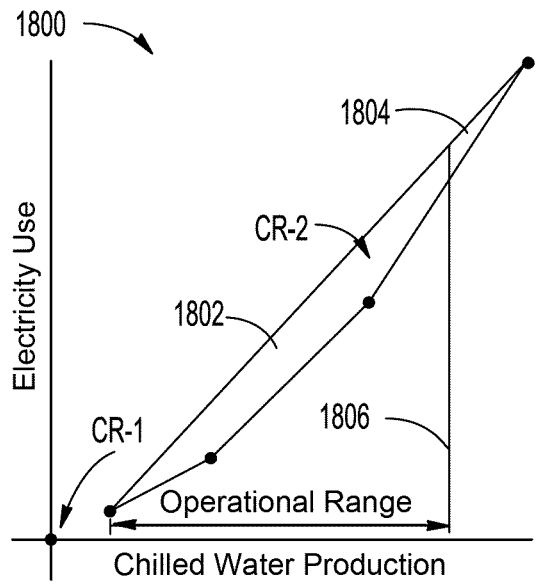
FIG. 18A is a graph of an operational domain for a chiller subplant with a portion that extends beyond the operational range of the subplant, according to an exemplary embodiment.
Figure 18B:
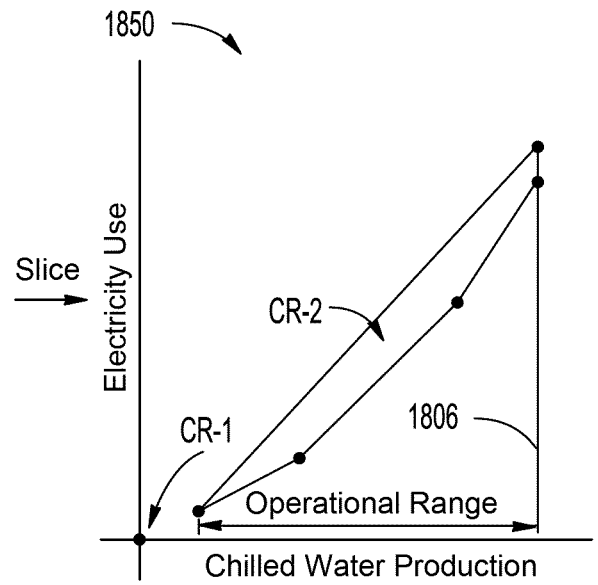
FIG. 18B is a graph of the operational domain shown in FIG. 18A after the operational domain has been sliced to remove the portion that extends beyond the operational range, according to an exemplary embodiment.

In some embodiments, box constraints module 1208 removes an end portion of a convex region from the operational domain. This is referred to as slicing the convex region and is shown graphically in FIGS. 18A-18B. For example, FIG. 18A is a graph 1800 of an operational domain which includes a convex region CR-2. A first part 1802 of the convex region CR-2 is within the operational range determined by box constraints module 1208. However, a second part 1804 of the convex region CR-2 is outside the operational range determined by box constraints module 1208. Box constraints module 1208 can remove the second part 1804 from the convex region CR-2 by imposing a box constraint that limits the independent variable (i.e., chilled water production) within the operational range. The slicing operation results in the modified convex region CR-2 shown in graph 1850.

Figure 19A:
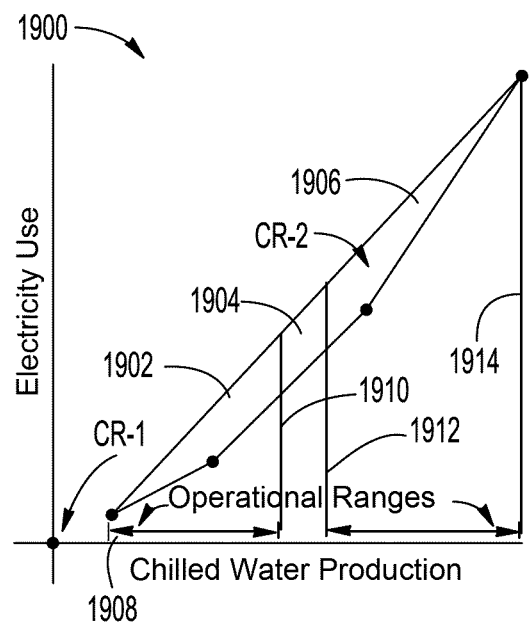
FIG. 19A is a graph of an operational domain for a chiller subplant with a middle portion that lies between two disjoined operational ranges of the subplant, according to an exemplary embodiment.
Figure 19B:
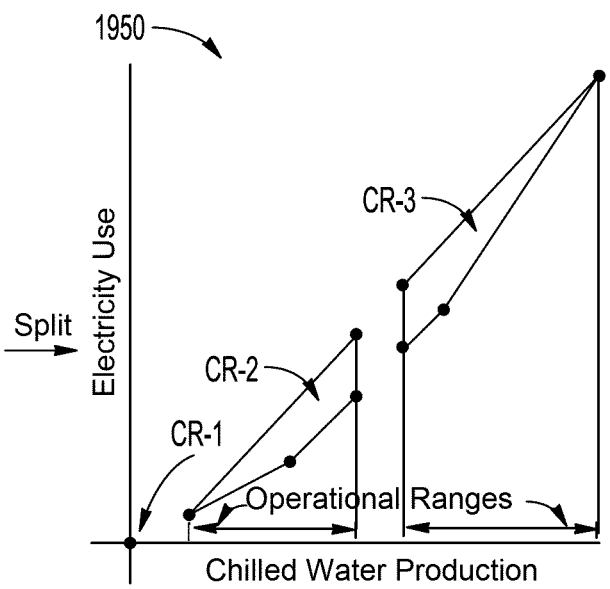
FIG. 19B is a graph of the operational domain shown in FIG. 19A after the operational domain has been split to remove the portion that lies between the two disjoined operational ranges, according to an exemplary embodiment.
Figure 20A:
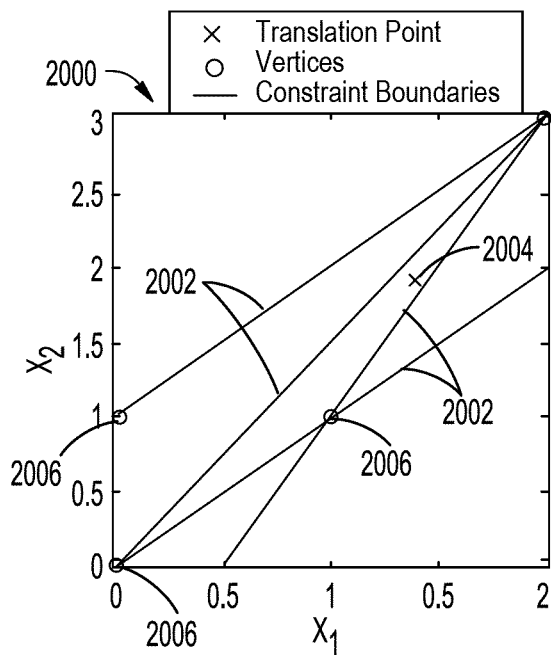
FIGS. 20A-20D are graphs illustrating a technique which can be used by the operational domain module of FIG. 12 to detect and remove redundant constraints, according to an exemplary embodiment.
Figure 20B:
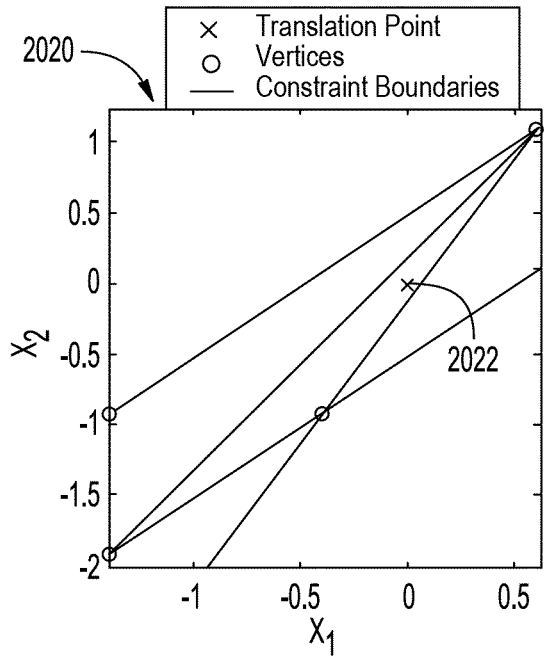
Figure 20C:
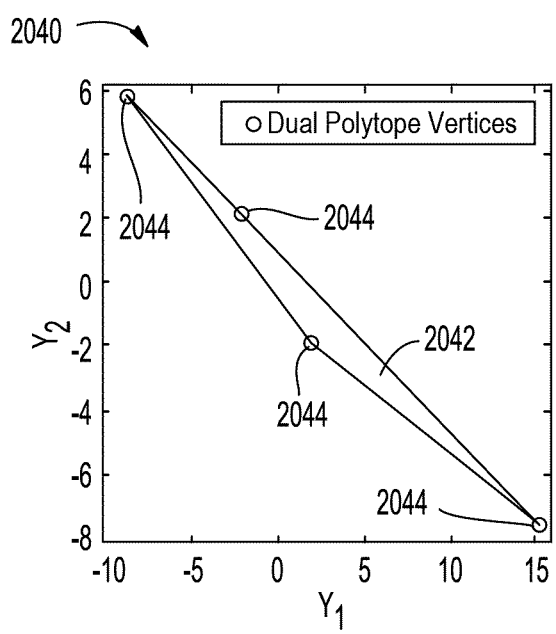
Figure 20D:
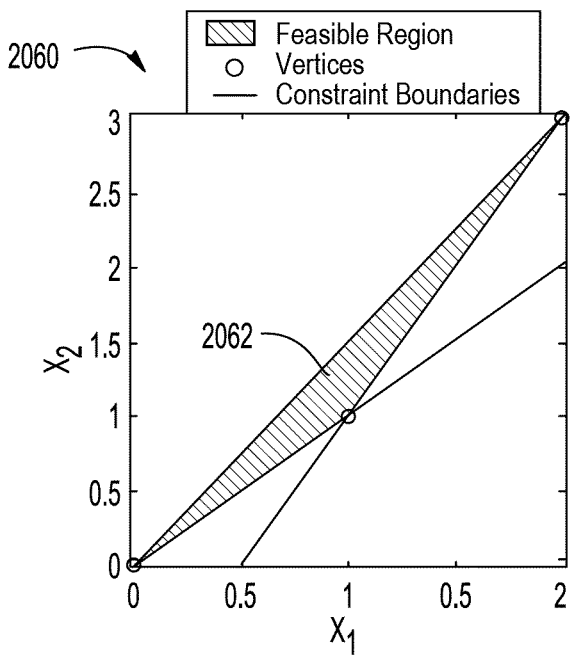

In some embodiments, box constraints module 1208 removes a middle portion of a convex region from the operational domain. This is referred to as splitting the convex region and is shown graphically in FIGS. 19A-19B. For example, FIG. 19A is a graph 1900 of an operational domain which includes a convex region CR-2. A first part 1902 of the convex region CR-2 is within the operational range between lower bound 1908 and upper bound 1910. Similarly, a third part 1906 of the convex region CR-2 is within the operational range between lower bound 1912 and upper bound 1914. However, a second part 1904 of the convex region CR-2 is outside the split operational range. Box constraints module 1208 can remove the second part 1904 from the convex region CR-2 by imposing two box constraints that limit the independent variable (i.e., chilled water production) within the operational ranges. The splitting operation results two smaller convex regions CR-2 and CR-3 shown in graph 1950.

In some embodiments, box constraints module 1208 removes a convex region entirely. This operation can be performed when a convex region lies entirely outside the admissible operating range. Removing an entire convex region can be accomplished by imposing a box constraint that limits the independent variable within the admissible operating range. In some embodiments, box constraints module 1208 merges two or more separate convex regions. The merging operation effectively reduces the model fidelity (described in greater detail below).

Box constraints module 1208 can automatically update the operational domain in response to a determination that one or more devices of the subplant are offline or otherwise unavailable for use. In some embodiments, a flag is set in the operational tool when a device becomes unavailable. Box constraints module 1208 can detect such an event and can queue the generation of an updated operational domain by querying the resulting high level subplant operational domain. In other words, the high level subplant operational domain for the subplant resulting from the collection of devices that remain available can be sampled and the operational domain can be constructed as described in process 1400. The generation of the updated operational domain may occur outside of the high level optimization algorithm in another computer process. Once the constraint generation process is complete, the operational domain data can be put into the data model and used in the optimization problem instead of the fast update method performed by box constraints module 1208.

Cross Section Constraints

Still referring to FIG. 12, operational domain module 904 is shown to include a cross section constraints module 1210. Cross section constraints module 1210 can be configured to modify the constraints on the high level optimization when one or more optimization variables are treated as fixed parameters. When the high level subplant operational domain includes additional parameters, the data sampled from the high level operational domain is of higher dimension than what is used in the optimization. For example, the chiller subplant operational domain may be three dimensional to include the electricity usage as a function of the chilled water production and the condenser water temperature. However, in the optimization problem, the condenser water temperature may be treated as a parameter.

The constraint generation process (described above) may be used with the higher dimensional sampled data of the subplant operational domain. This results in the following constraints being generated:

$$A_{x,j}x_j + A_{z,j}z_j + A_{y,j}y_j \leq b_j$$

$$H_{x,j}x_j + H_{z,j}z_j + H_{y,j}y_j = g_j$$

$$x_{lb,j} \leq x_j \leq x_{ub,j}$$

$$z_{lb,j} \leq z_j \leq z_{ub,j}$$

$$z_j = \text{integer}$$

where $x_j$ is a vector consisting of the continuous decision variables, $z_j$ is a vector consisting of the discrete decision variables, $y_j$ is a vector consisting of all the parameters, and $H_{y,j}$ and $A_{y,j}$ are the constraint matrices associated with the parameters. Cross section constraints module 1210 can be configured to modify the constraints such that the operational domain is limited to a cross section of the original operational domain. The cross section may include all of the points that have the same fixed value for the parameters.

In some embodiments, cross section constraints module 1210 retains the parameters in vector $y_j$ as decision variables in the optimization problem, bus uses equality constraints to ensure that they are set to their actual values. The resulting constraints used in the optimization problem are given by:

$$A_{x,j}x_j + A_{z,j}z_j + A_{y,j}y_j \leq b_j$$

$$H_{x,j}x_j + H_{z,j}z_j + H_{y,j}y_j = g_j$$

$$x_{lb,j} \leq x_j \leq x_{ub,j}$$

$$z_{lb,j} \leq z_j \leq z_{ub,j}$$

$$y_j = p$$

$$z_j = \text{integer}$$

where p is a vector of fixed values (e.g., measured or estimated parameter values).

In other embodiments, cross section constraints module 1210 substitutes values for the parameters before setting up and solving the optimization problem. This method reduces the dimension of the constraints and the optimization problem, which may be computationally desirable. Assuming that the parameters are either measured or estimated quantities (e.g., in the case of the condenser water temperature, the temperature may be measured), the parameter values may be substituted into the constraints. The resulting constraints used in the optimization problem are given by:

$$A_{x,j}x_j + A_{z,j}z_j \leq \bar{b}_j$$

$$H_{x,j}x_j + H_{z,j}z_j = \bar{g}_j$$

$$x_{lb,j} \leq x_j \leq x_{ub,j}$$

$$z_{lb,j} \leq z_j \leq z_{ub,j}$$

$$z_j = \text{integer}$$

where $\bar{b}_j = b_j - A_{y,j}p$ and $\bar{g}_j = g_j - H_{y,j}p$

In some embodiments, cross section constraints module 1210 is configured to detect and remove redundant constraints. It is possible that there are redundant constraints after taking a cross section of the constraints. Being computationally mindful, it is desirable to automatically detect and remove redundant constraints. Cross section constraints module 1210 can detect redundant constraints by computing the vertices of the corresponding dual polytope and computing the convex hull of the dual polytope vertices. Cross section constraints module 1210 can identify any vertices contained in the interior of the convex hull as redundant constraints.

The following example illustrates the automatic detection and removal of redundant constraints by cross section constraints module 1210. Consider a polytope described by the inequality constraints Ax≤b. In this example, only an individual polytope or convex region of the operational domain is considered, whereas the previous set of constraints describe the entire operational domain. Cross section constraints module 1210 can be configured to identify any point c that lies strictly on the interior of the polytope (i.e., such that Ac≤b). These points can be identified by least squares or computing the analytic center of the polytope. Cross section constraints module 1210 can then shift the polytope such that the origin is contained in the interior of the polytope. The shifted coordinates for the polytope can be defined as $\bar{x}=x-c$. After shifting the polytope, cross section constraints module 1210 can compute the vertices of the dual polytope. If the polytope is defined as the set P={x: Ax≤b}, then the dual polytope is the set P*={y: $y^T x \leq 1$, ∀x∈P}. Cross section constraints module 1210 can then compute the convex hull of the dual polytope vertices. If a vertex of the dual polytope is not a vertex of the convex hull, cross section constraints module 1210 can identify the corresponding constraint as redundant and may remove the redundant constraint.

Referring now to FIGS. 20A-20D, several graphs 2000, 2020, 2040, and 2060 illustrating the redundant constraint detection and removal process are shown, according to an exemplary embodiment. Graph 2000 is shown to include the boundaries 2002 of several constraints computed after taking the cross section of higher dimensional constraints. The constraints bounded by boundaries 2002 are represented by the following inequalities:

$$x_1 - x_2 \leq -1$$

$$2x_1 - x_2 \leq 1$$

$$-3/2 x_1 + x_2 \leq 0$$

$$-x_1 + x_2 \leq 0$$

The operational domain is represented by a polytope with vertices 2006. Point 2004 can be identified as a point that lies strictly on the interior of the polytope.

Graph 2020 shows the result of shifting the polytope such that the origin is contained in the interior of the polytope. The polytope is shifted to a new coordinate system (i.e., $\bar{x}_1$ and $\bar{x}_2$) with the origin 2022 (i.e., $\bar{x}_1=0$ and $\bar{x}_2=0$) located within the polytope. Graph 2040 shows the result of computing the vertices 2044 of the dual polytope 2042, which may be defined by the set P*={y: $y^T x \leq 1$, ∀x∈P}. Graph 2060 shows the result of computing the convex hull of the dual polytope vertices 2044 and removing any constraints that correspond to vertices 2044 of the dual polytope but not to vertices of the convex hull. In this example, the constraint $x_1 - x_2 \leq -1$ is removed, resulting in the feasible region 2062.

Figure 21A:
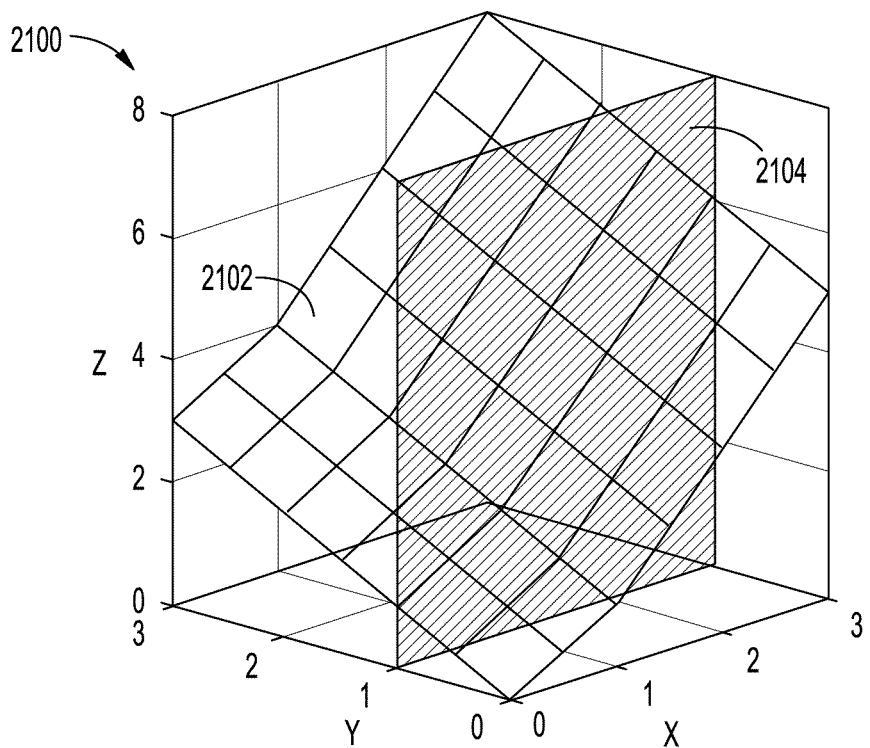
FIG. 21A is a graph of a three-dimensional operational domain with a cross-section defined by a fixed parameter, according to an exemplary embodiment.
Figure 21B:
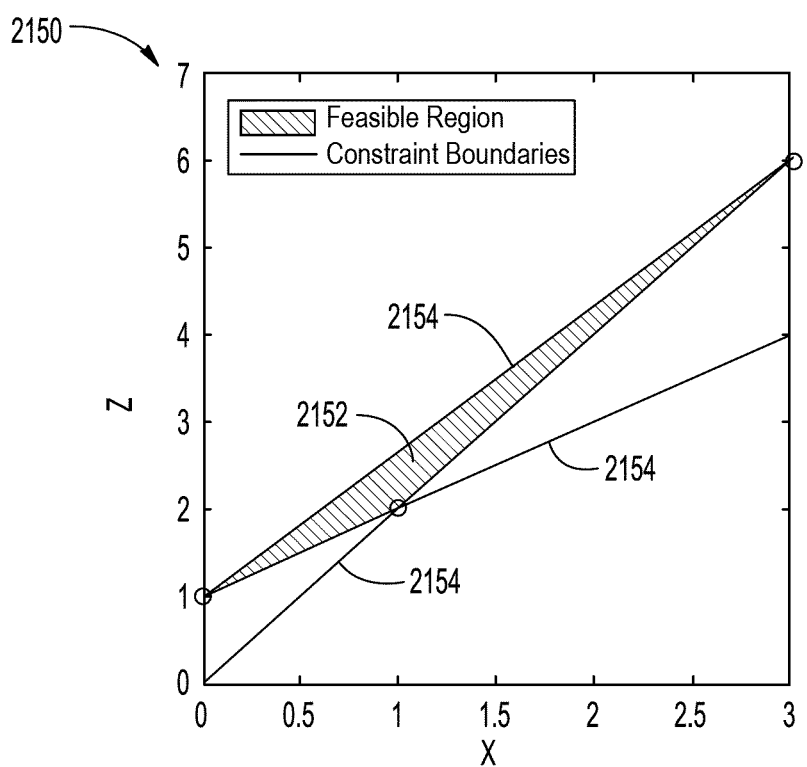
FIG. 21B is a graph of a two-dimensional operational domain which can be generated based on the cross-section shown in the graph of FIG. 21A, according to an exemplary embodiment.

Referring now to FIGS. 21A-21B, graphs 2100 and 2150 illustrating the cross section constraint generation process performed by cross section constraints module 1210 is shown, according to an exemplary embodiment. Graph 2100 is a three-dimensional graph having an x-axis, a y-axis, and a z-axis. Each of the variables x, y, and z may be treated as optimization variables in a high level optimization problem. Graph 2100 is shown to include a three-dimensional surface 2100 defined by the following equations:

$$z = \begin{cases} x+y, & \text{if } x \in [0, 1] \\ 2x+y-1, & \text{if } x \in [1, 2] \end{cases}$$

for x∈[0,2] and y∈[0,3], where x is the subplant production, y is a parameter, and z is the amount of resources consumed.

A three-dimensional subplant operational domain is bounded surface 2102. The three-dimensional operational domain is described by the following set of constraints:

$$-\frac{5}{3x} - y + z \leq 0$$

$$-y \leq 0$$

$$y \leq 3$$

$$x + y - z \leq 0$$

$$2x + y - z \leq 1$$

The cross section constraint generation process can be applied to the three dimensional operational domain. When variable y is treated as a fixed parameter (i.e., y=1), the three-dimensional operational domain can be limited to the cross section 2104 along the plane y=1. Cross section constraints module 1210 can generate the following cross section constraints to represent the two-dimensional cross section of the original three-dimensional operational domain:

$$-\frac{5}{3x} + z \leq 1$$

$$x - z \leq -1$$

$$2x - z \leq 0$$

which are represented by boundaries 2154 in graph 2150. The resulting two-dimensional operational domain is shown as feasible region 2152 in graph 2150.

Rate of Change Penalties

Referring again to FIG. 12, operational domain module 904 is shown to include a rate of change penalties module 1212. Rate of change penalties module 1212 can be configured to modify the high level optimization problem to add rate of change penalties for one or more of the decision variables. Large changes in decision variable values between consecutive time steps may result in a solution that may not be physically implementable. Rate of change penalties prevent computing solutions with large changes in the decision variables between consecutive time steps. In some embodiments, the rate of change penalties have the form:

$$c_{\Delta x, k} |x_k| = c_{\Delta x, k} |x_k - x_{k-1}|$$

where $x_k$ denotes the value of the decision variable x at time step k, $x_{k-1}$ denotes the variable value at time step k−1, and $c_{\Delta x,k}$ is the penalty weight for the rate of change of the variable at the kth time step.

In some embodiments, rate of change penalties module 1212 introduces an auxiliary variable $\Delta x_k$ for k∈{1, . . . , h}, which represents the rate of change of the decision variable x. This may allow asset allocator 402 to solve the high level optimization with the rate of change penalty using linear programming. Rate of change penalties module 1212 may add the following constraints to the optimization problem to ensure that the auxiliary variable is equal to the rate of change of x at each time step in the optimization period:

$$x_{k-1}-x_k \leq \Delta x_k$$

$$x_k-x_{k-1} \leq \Delta x_k$$

$$\Delta x_k \geq 0$$

for all k∈{1, . . . , h}, where h is the number of time steps in the optimization period.

The inequality constraints associated with the rate of change penalties may have the following structure:

$$\begin{bmatrix} \ddots & \vdots & \vdots & \vdots & \vdots & \vdots & \vdots & \vdots & \iddots \\ \cdots & -1 & 0 & 0 & \cdots & -1 & 0 & 0 & \cdots \\ \cdots & 1 & 0 & 0 & \cdots & -1 & 0 & 0 & \cdots \\ \cdots & 1 & -1 & 0 & \cdots & 0 & -1 & 0 & \cdots \\ \cdots & -1 & 1 & 0 & \cdots & 0 & -1 & 0 & \cdots \\ \cdots & 0 & 1 & -1 & \cdots & 0 & 0 & -1 & \cdots \\ \cdots & 0 & -1 & 1 & \cdots & 0 & 0 & -1 & \cdots \\ \iddots & \vdots & \vdots & \vdots & \vdots & \vdots & \vdots & \vdots & \ddots \end{bmatrix} \begin{bmatrix} \vdots \\ x_1 \\ x_2 \\ x_3 \\ \vdots \\ \Delta x_1 \\ \Delta x_2 \\ \Delta x_3 \\ \vdots \end{bmatrix} \leq \begin{bmatrix} \vdots \\ -x_0 \\ x_0 \\ 0 \\ 0 \\ 0 \\ 0 \\ \vdots \end{bmatrix}$$

Rate of Change Constraints

Still referring to FIG. 12, operational domain module 904 is shown to include a rate of change constraints module 1214. A more strict method that prevents large changes in decision variable values between consecutive time steps is to impose (hard) rate of change constraints. For example, the following constraint can be used to constrain the rate of change $\Delta x_k$ between upper bounds $\Delta x_{ub,k}$ and lower bounds $\Delta x_{lb,k}$ $$\Delta x_{lb,k} \leq \Delta x_k \leq \Delta x_{ub,k}$$

where $\Delta x_k = x_k - x_{k-1}$, $\Delta x_{lb,k} < 0$, and $\Delta x_{ub,k} > 0$.

The inequality constraints associated with these rate of change constraints are given by the following structure:

$$\begin{bmatrix} \ddots & \vdots & \vdots & \vdots & \vdots & \vdots & \iddots \\ \cdots & -1 & 0 & 0 & \cdots & 0 & \cdots \\ \cdots & 1 & 0 & 0 & \cdots & 0 & \cdots \\ \cdots & 1 & -1 & 0 & \cdots & 0 & \cdots \\ \cdots & -1 & 1 & 0 & \cdots & 0 & \cdots \\ \cdots & 0 & 1 & -1 & \cdots & 0 & \cdots \\ \cdots & 0 & -1 & 1 & \cdots & 0 & \cdots \\ \cdots & \vdots & \vdots & \vdots & \ddots & \vdots & \cdots \\ \cdots & 0 & 0 & 0 & \cdots & 1 & \cdots \\ \cdots & 0 & 0 & 0 & \cdots & -1 & \cdots \\ \iddots & \vdots & \vdots & \vdots & \vdots & \vdots & \ddots \end{bmatrix} \begin{bmatrix} \vdots \\ x_1 \\ x_2 \\ x_3 \\ \vdots \\ \vdots \\ x_h \\ \vdots \end{bmatrix} \leq \begin{bmatrix} \vdots \\ -\Delta x_{lb,k} - x_0 \\ \Delta x_{ub,k} + x_0 \\ -\Delta x_{lb,k} \\ \Delta x_{ub,k} \\ -\Delta x_{lb,k} \\ \Delta x_{ub,k} \\ \vdots \end{bmatrix}$$

Storage/Airside Constraints

Still referring to FIG. 12, operational domain module 904 is shown to include a storage/airside constraints module 1216. Storage/airside constraints module 1216 can be configured to modify the high level optimization problem to account for energy storage in the air or mass of the building. To predict the state of charge of such storage a dynamic model can be solved. Storage/airside constraints module 1216 can use a single shooting method or a multiple shooting method to embed the solution of a dynamic model within the optimization problem. Both the single shooting method and the multiple shooting method are described in detail below.

In the single shooting method, consider a general discrete-time linear dynamic model of the form:

$$x_{k+1} = Ax_k + Bu_k$$

where $x_k$ denotes the state (e.g., state of charge) at time k and $u_k$ denotes the input at time k. In general, both the state $x_k$ and input $u_k$ may be vectors. To solve the dynamic model over h time steps, storage/airside constraints module 1216 may identify the initial condition and an input trajectory/sequence. In an optimal control framework, the input trajectory can be determined by the optimization solver. Without loss of generality, the time interval over which the dynamic model is solved is taken to be the interval [0, h]. The initial condition is denoted by $x_0$.

The state $x_k$ and input $u_k$ can be constrained by the following box constraints:

$$x_{lb,k} \leq x_k \leq x_{ub,k}$$

$$u_{lb,k} \leq u_k \leq u_{ub,k}$$

for all k, where $x_{lb,k}$ is the lower bound on the state $x_k$, $x_{ub,k}$ is the upper bound on the state $x_k$, $u_{lb,k}$ is the lower bound on the input $u_k$, and $u_{ub,k}$ is the upper bound on the input $u_k$. In some embodiments, the bounds may be time-dependent.

In the single shooting method, only the input sequence may be included as a decision variable because the state $x_k$ at any given time step is a function of the initial condition $x_0$ and the input trajectory. This strategy has less decision variables in the optimization problem than the second method, which is presented below. The inequality constraints associated with the upper bound on the state $x_k$ may have the following structure:

$$\begin{bmatrix} \ddots & \vdots & \vdots & \vdots & \vdots & \vdots & \iddots \\ \cdots & B & 0 & 0 & \cdots & 0 & \cdots \\ \cdots & AB & B & 0 & \cdots & 0 & \cdots \\ \cdots & A^2B & AB & B & \cdots & 0 & \cdots \\ \cdots & \vdots & \vdots & \vdots & \ddots & \vdots & \cdots \\ \cdots & A^{h-1}B & A^{h-2}B & A^{h-3}B & \cdots & B & \cdots \\ \iddots & \vdots & \vdots & \vdots & \vdots & \vdots & \ddots \end{bmatrix} \begin{bmatrix} \vdots \\ u_0 \\ u_1 \\ u_2 \\ \vdots \\ u_{h-1} \\ \vdots \end{bmatrix} \leq \begin{bmatrix} \vdots \\ x_{ub,1} - Ax_0 \\ x_{ub,2} - A^2x_0 \\ x_{ub,3} - A^3x_0 \\ \vdots \\ x_{ub,h} - A^hx_0 \\ \vdots \end{bmatrix}$$

Similarly, the inequality constraints associated with the lower bound on the state $x_k$ may have the following structure:

$$\begin{bmatrix} \ddots & \vdots & \vdots & \vdots & \vdots & \vdots & \ddots \\ \cdots & -B & 0 & 0 & \cdots & 0 & \cdots \\ \cdots & -AB & -B & 0 & \cdots & 0 & \cdots \\ \cdots & -A^2B & -AB & -B & \cdots & 0 & \cdots \\ \cdots & \vdots & \vdots & \vdots & \ddots & \vdots & \cdots \\ \cdots & -A^{h-1}B & -A^{h-2}B & -A^{h-3}B & \cdots & -B & \cdots \\ \ddots & \vdots & \vdots & \vdots & \vdots & \vdots & \ddots \end{bmatrix} \begin{bmatrix} \vdots \\ u_0 \\ u_1 \\ u_2 \\ \vdots \\ u_{h-1} \\ \vdots \end{bmatrix} \leq \begin{bmatrix} \vdots \\ Ax_0 - x_{lb,1} \\ A^2x_0 - x_{lb,2} \\ A^3x_0 - x_{lb,3} \\ \vdots \\ A^hx_0 - x_{lb,h} \\ \vdots \end{bmatrix}$$

In some embodiments, more general constraints or mixed constraints may also be considered. These constraints may have the following form:

$$A_{ineq,x}x(k) + A_{ineq,u}u(k) \leq b_{ineq}$$

The inequality constraint structure associated with the single shooting strategy and the mixed constraints may have the form:

$$\begin{bmatrix} \ddots & \vdots & \vdots & \vdots & \vdots & \vdots & \ddots \\ \cdots & A_{ineq,u} & 0 & 0 & \cdots & 0 & \cdots \\ \cdots & A_{ineq,x}B + A_{ineq,u} & 0 & 0 & \cdots & 0 & \cdots \\ \cdots & A_{ineq,x}AB & A_{ineq,x}B + A_{ineq,u} & 0 & \cdots & 0 & \cdots \\ \cdots & A_{ineq,x}A^2B & A_{ineq,x}AB & A_{ineq,x}B + A_{ineq,u} & \cdots & 0 & \cdots \\ \cdots & \vdots & \vdots & \vdots & \ddots & \vdots & \cdots \\ \cdots & A_{ineq,x}A^{h-2}B & A_{ineq,x}A^{h-3}B & A_{ineq,x}A^{h-4}B & \cdots & A_{ineq,x}B + A_{ineq,u} & \cdots \\ \ddots & \vdots & \vdots & \vdots & \vdots & \vdots & \ddots \end{bmatrix} \begin{bmatrix} \vdots \\ u_0 \\ u_1 \\ u_2 \\ \vdots \\ u_{h-1} \\ \vdots \end{bmatrix} \leq \begin{bmatrix} \vdots \\ b_{ineq} - A_{ineq,x}x(0) \\ b_{ineq} - A_{ineq,x}Ax(0) \\ b_{ineq} - A_{ineq,x}A^2x(0) \\ \vdots \\ b_{ineq} - A_{ineq,x}A^{h-1}x(0) \\ \vdots \end{bmatrix}$$

In the multiple shooting method, storage/airside constraints module 1216 may include the state sequence as a decision variable in the optimization problem. This results in an optimization problem with more decision variables than the single shooting method. However, the multiple shooting method typically has more desirable numerical properties, resulting in an easier problem to solve even though the resulting optimization problem has more decision variables than that of the single shooting method.

To ensure that the state and input trajectories (sequences) satisfy the model of $x_{k+1} = Ax_k + Bu_k$, the following equality constraints can be used:

$$\begin{bmatrix} \ddots & \vdots & \vdots & \vdots & \vdots & \vdots & \vdots & \vdots & \vdots & \vdots & \ddots \\ \cdots & -I & 0 & \cdots & 0 & 0 & B & 0 & 0 & \cdots & 0 & \cdots \\ \cdots & A & -I & \cdots & 0 & 0 & 0 & B & 0 & \cdots & 0 & \cdots \\ \cdots & 0 & A & \cdots & 0 & 0 & 0 & 0 & B & \cdots & 0 & \cdots \\ \cdots & \vdots & \vdots & \ddots & -I & 0 & \vdots & \vdots & \ddots & \vdots & \cdots \\ \cdots & 0 & 0 & \cdots & A & -I & 0 & 0 & 0 & \cdots & B & \cdots \\ \ddots & \vdots & \vdots & \cdots & \vdots & \vdots & \vdots & \vdots & \vdots & \vdots & \ddots \end{bmatrix} \begin{bmatrix} \vdots \\ x_1 \\ \vdots \\ x_{h-1} \\ x_h \\ u_1 \\ \vdots \\ u_{h-1} \\ \vdots \end{bmatrix} \leq \begin{bmatrix} \vdots \\ -Ax_0 \\ 0 \\ 0 \\ \vdots \\ 0 \\ \vdots \end{bmatrix}$$

where I is an identity matrix of the same dimension as A. The bound constraints on the state $x_k$ and inputs $u_k$ can readily be included since the vector of decision variables may include both the state $x_k$ and inputs $u_k$.

Mixed constraints of the form $A_{ineq,x}x(k) + A_{ineq,u}u(k) \leq b_{ineq}$ can also be used in the multiple shooting method. These mixed constraints result in the following structure:

$$\begin{bmatrix} \ddots & \vdots & \vdots & \vdots & \vdots & \vdots & \vdots & \vdots & \ddots \\ \cdots & 0 & \cdots & 0 & 0 & A_{ineq,u} & 0 & \cdots & 0 & \cdots \\ \cdots & A_{ineq,x} & \cdots & 0 & 0 & 0 & A_{ineq,u} & \cdots & 0 & \cdots \\ \cdots & \vdots & \ddots & \vdots & \vdots & \vdots & \vdots & \ddots & 0 & \cdots \\ \cdots & 0 & \cdots & A_{ineq,x} & 0 & 0 & 0 & \cdots & A_{ineq,u} & \cdots \\ \ddots & \vdots & \cdots & \vdots & \vdots & \vdots & \vdots & \vdots & \vdots & \ddots \end{bmatrix} \begin{bmatrix} \vdots \\ x_1 \\ \vdots \\ x_{h-1} \\ x_h \\ u_1 \\ \vdots \\ u_{h-1} \\ \vdots \end{bmatrix} \leq \begin{bmatrix} \vdots \\ b_{ineq} - A_{ineq,x}x(0) \\ b_{ineq} \\ \vdots \\ b_{ineq} \\ \vdots \end{bmatrix}$$

Energy Provider Level Demand Optimization

Referring now to FIGS. 22-36, asset allocation can be performed from an energy provider perspective to determine optimal asset allocation and save resources and costs, and to provide consumers with information regarding benefits of purchasing an electrical storage device or solar electrical energy generation devices, according to some embodiments. In some embodiments, the energy provider has control over various control variables of one or more customers (e.g., control over thermostat setpoints, equipment operation, etc.), and can adjust an operation of the customer's equipment or setpoints to save resources and costs for the energy provider as well as the customers.

Power Transmission Grid

Figure 22:
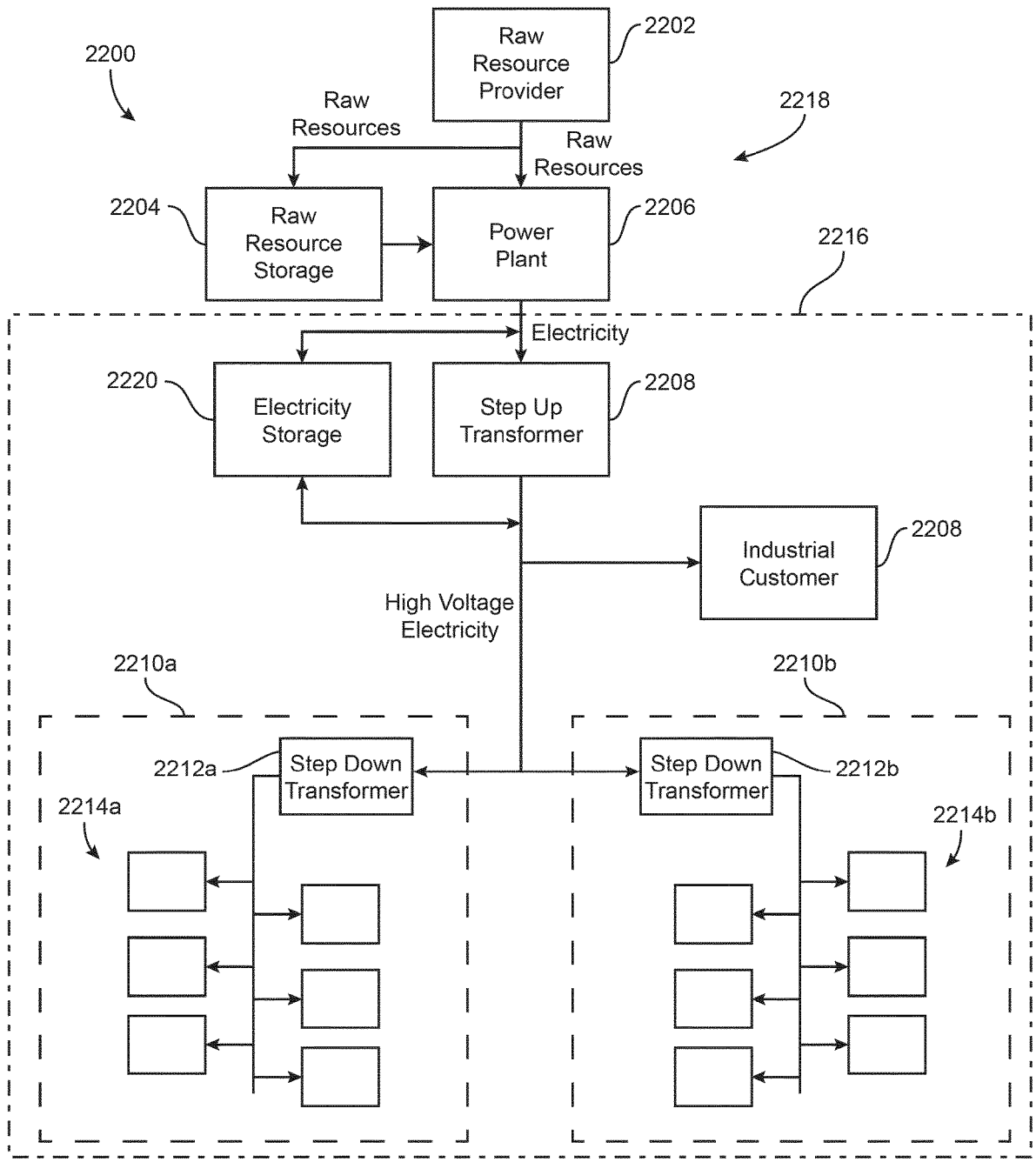
FIG. 22 is a block diagram of a power grid, according to some embodiments.

Referring now to FIG. 22, a power distribution system 2200 is shown, according to some embodiments. Power distribution system 2200 is shown to include energy production system 2218 and energy distribution grid 2216, according to some embodiments. In some embodiments, energy production system 2218 includes power plant 2206 which receives raw resources from raw resource provider 2202. Power plant 2206 may be any power plant that receives raw resources and produces another resource such as electricity. In some embodiments, power plant 2206 is any of or a combination of a fossil fuel power plant, a coal power plant, a natural gas power plant, a hydroelectric power plant, a solar thermal power plant, a nuclear power plant, a geothermal power plant, a wind power plant, a solar power plant, etc. In some embodiments, power plant 2206 is a single power plant or is a collection of various power plants. In some embodiments, power plant 2206 functions as a subplant and is treated as such in asset allocation system 400. For example, power plant 2206 consumes some amount of resource (e.g., coal) to produce some amount of other resource (e.g., kW of electricity), and is treated as a subplant by asset allocator 402, according to some embodiments.

Referring still to FIG. 22, power plant 2206 is shown receiving raw resources from raw resource provider 2202. In some embodiments, raw resource provider 2202 is a source in asset allocation system 400. Raw resource provider 2202 may be any of a coal provider, a natural gas provider, a nuclear materials provider, etc., which provides power plant 2206 with the raw resources necessary to produce electricity. In some embodiments, power plant 2206 purchases raw resources from raw resource provider 2202 at a cost (e.g., $/ton).

In some embodiments, energy production system 2218 includes raw resource storage 2204. Raw resource storage 2204 may be used by power plant 2206 to store raw resources for later use. For example, power plant 2206 may use raw resources from raw resource storage 2204 to meet demand loads of energy distribution grid 2216. In some embodiments, raw resource storage 2204 represents a single or a collection of storage devices. Raw resource storage 2204 is considered a storage device in asset allocation system 400, according to some embodiments. Raw resource storage 2204 may be a warehouse or a storage facility.

Power plant 2206 produces electricity and supplies the electricity to energy distribution grid 2216, according to some embodiments. Energy distribution grid 2216 includes step up transformer 2208 and electricity storage device 2220, according to some embodiments. Step up transformer 2208 receives electricity from power plant 2206 and increases the voltage before transferring the increased voltage power to various consumers. In some embodiments, step up transformer 2208 increases the voltage for transmission to the customers/consumers. In some embodiments, step up transformer 2208 receives electricity from electricity storage device 2220. In some embodiments, electricity storage device 2220 stores electricity produced by power plant 2206. In some embodiments, electricity storage device 2220 stores electricity after it has been stepped up and provides the stepped up power for transmission to the consumers/ customers at a later time. Electricity storage device 2220 may be any of or a combination of a compressed air energy storage device, a liquid air storage device, a battery, an electric vehicle, a flywheel, a hydrogen electrolysis storage device, a pumped water storage device (e.g., hydroelectricity), a superconducting magnetic energy storage device, a thermal energy storage device, etc., or any other storage device which may be used to store electrical energy, according to some embodiments. In some embodiments, electrical energy losses are associated with storing (e.g., filling) electricity storage device 2220 and using (e.g., electricity being discharged from) electricity in electricity storage device 2220. For example, in some embodiments, the electricity stored in electricity storage device 2220 must be converted to another form of energy before it can be stored, and converted back into electrical energy before it can be used. Converting electrical energy to another form of energy and vice versa may result in electrical energy losses, according to some embodiments. Additionally, the energy stored in electricity storage device 2220 may degrade over time.

Electricity storage device 2220 is modeled as a storage device in asset allocation system 400, according to some embodiments. In some embodiments, constraints are applied to the storage device in asset allocation system 400 which account for losses associated with inputting and outputting electricity to electricity storage device 2220. In some embodiments, the constraints relate the losses to the amount of electrical power input and output to/from electricity storage device 2220 and have the form:

$$P_{loss} = f_{input}(P_{input})$$

$$P_{loss} = f_{output}(P_{output})$$

where $f_{input}$ is a function (e.g., exponential, polynomial, linear, etc.), which relates the power/energy loss to power/ energy input to electricity storage device 2220 and $f_{output}$ is a function (e.g., exponential, polynomial, linear, etc.), which relates the power/energy loss to power/energy output from electricity storage device 2220. In some embodiments, a constraint is applied to the energy stored in electricity storage device 2220 which relates the energy/power loss to time and energy/power stored in electricity storage device 2220 and has the form:

$$P_{loss} = f_{loss}(P_{stored}, t)$$

where $f_{loss}$ is a function (e.g., exponential, polynomial, linear, etc.). In some embodiments, if the energy is stored for a minimal amount of time, the losses associated with degradation are negligible.

Figure 24:
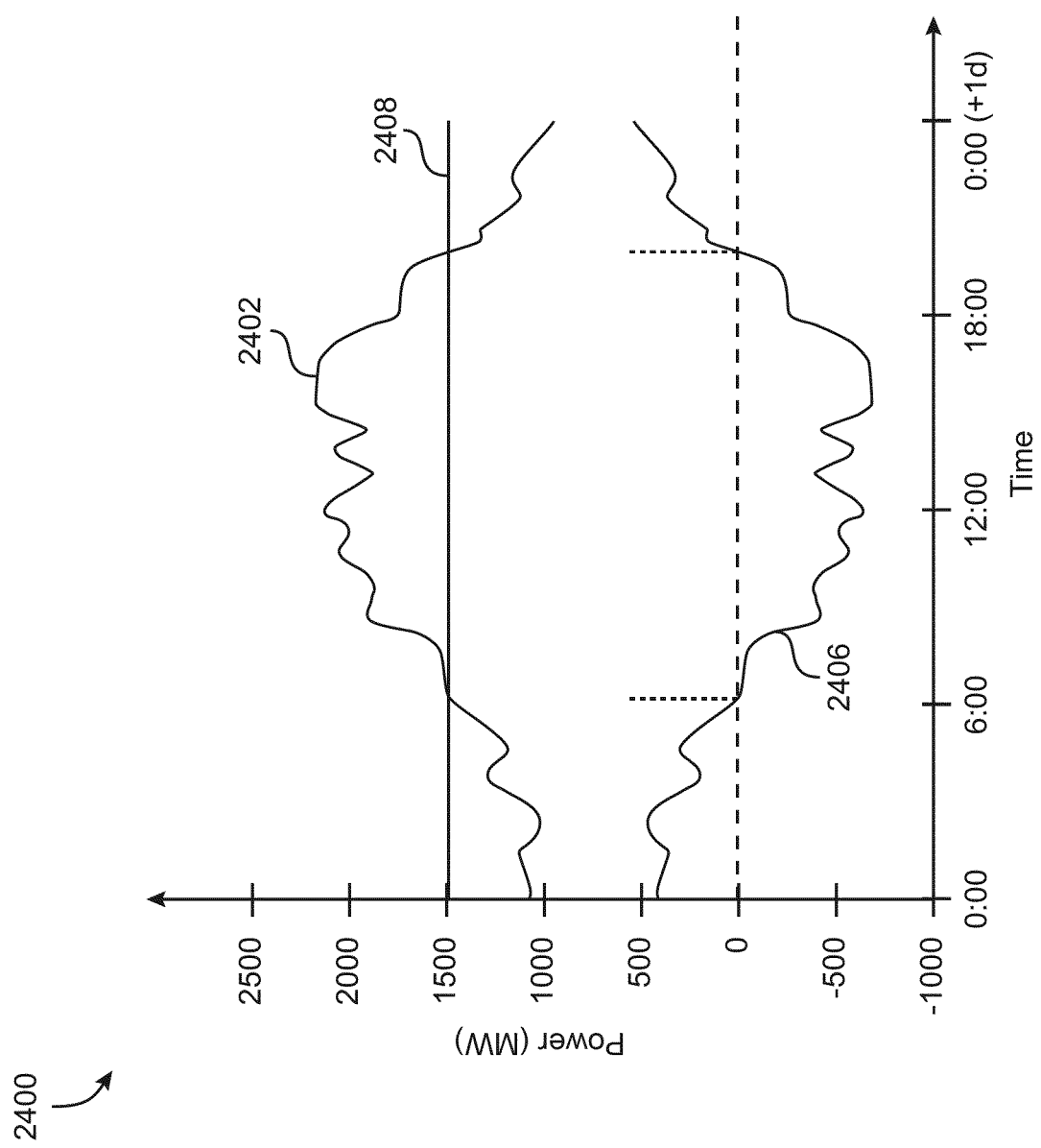
FIG. 24 is a graph of power consumed by customers and produced by a power plant, according to some embodiments.

Storing electricity in electricity storage device 2220 advantageously allows power plant 2206 to operate at a more steady value and still meet the demand of the various customers as shown in FIG. 24, according to some embodiments. As shown in FIG. 24, graph 2400 illustrates power consumed/produced (Y-axis) with respect to time (X-axis) over the course of a day, according to some embodiments. Series 2402 illustrates power consumed by customers over the course of a day as well as power produced by power plant 2206 without energy storage, according to some embodiments. As shown, if power plant 2206 does not include energy storage and the customers do not have energy storage, power plant 2206 operates to produce the amount of power required by the customers at all times throughout the day (series 2402), according to some embodiments. Series 2408 illustrates power produced by power plant 2206 over the course of a day with energy storage, according to some embodiments.

As shown in FIG. 24, if power plant 2206 does not include electricity storage device 2220, the power output of power plant 2206 increases (i.e., peaks) and decreases with the load required by customers in order to provide the required amount of electrical power, according to some embodiments. However, if power plant 2206 uses electricity storage device 2220, power plant 2206 can operate at a constant power production (e.g., 1500 MW) and power can be discharged from electricity storage device 2220 to meet the demand from the customers. As shown in FIG. 24, electricity storage device 2220 is charged and discharged throughout the day, according to some embodiments. Electricity storage device 2220 is shown charging approximately between 0:00 hours and 6:00 hours, discharging between 6:00 hours and 20:00 hours, approximately, and charging between 20:00 hours and 0:00 hours, according to some embodiments.

Referring again to FIG. 22, industrial customer 2208 is shown consuming high voltage electricity, according to some embodiments. Industrial customer 2208 may be any of a factory, a refinement facility, etc., or any other customer which consumes electrical energy at a high voltage, according to some embodiments. Neighborhoods 2210a and 2210b are also shown consuming high voltage electricity, according to some embodiments. Step down transformers 2212a and 2212b receive the high voltage electricity from step up transformer 2208, step down (e.g., decrease) the voltage of the high voltage electricity and supply a lower voltage electricity to houses 2214a and 2214b of neighborhoods 2210a and 2210b, according to some embodiments. In some embodiments, step up transformer 2208 and step down transformers 2212a and 2212b are modeled as subplants in asset allocation system 400, consuming electricity and outputting lower or higher electricity. In some embodiments, energy losses are associated with transforming the electricity from a lower voltage to a higher voltage and vice versa. In some embodiments, a constraint is applied to step up transformer 2208 which illustrates the relationship between the power provided by power plant 2206 and the power output by step up transformer 2208:

$$P_{high\ voltage} = \eta_{step\ up} * P_{power\ plant}$$

where $P_{high\ voltage}$ is the high voltage power output from step up transformer 2208, $\eta_{step\ up}$ is the efficiency of step up transformer 2208 (e.g., 0.9, 0.95, etc.), and $P_{power\ plant}$ is the power provided to step up transformer 2208 from power plant 2206. Likewise, a constraint:

$$P_{low\ voltage} = \eta_{step\ down} * P_{high\ voltage}$$

may be applied to step down transformer 2212a and 2212b, where $P_{high\ voltage}$ is the high voltage power output from step up transformer 2208, $\eta_{step\ down}$ is the efficiency of step down transformers 2212a and 2212b (e.g., 0.9, 0.95, etc.), and $P_{low\ voltage}$ is the power output from step down transformers 2212a and 2212b, according to some embodiments.

In some embodiments, each of houses 2214a and 2214b are individually considered consumers. In some embodiments, neighborhoods 2210a and 2210b are each considered consumers. Houses 2214a and 2214b, neighborhoods 2210a and 2210b, and industrial customer(s) 2208 are considered sinks in asset allocation system 400, which consume resources (e.g., electricity) and determine a load which power plant 2206 must meet, according to some embodiments. For example, a cumulative amount of electricity which the various customers consume may be considered a load which power plant 2206 must meet. In some embodiments, step down transformers 2212a and 2212b include a meter which monitors an amount of electricity consumed by neighborhoods 2210a and 2210b, respectively. In some embodiments, the monitored electrical energy consumption is provided to power plant 2206 or an energy provider which controls power plant 2206, or asset allocator 402.

Data Collection

Figure 23:
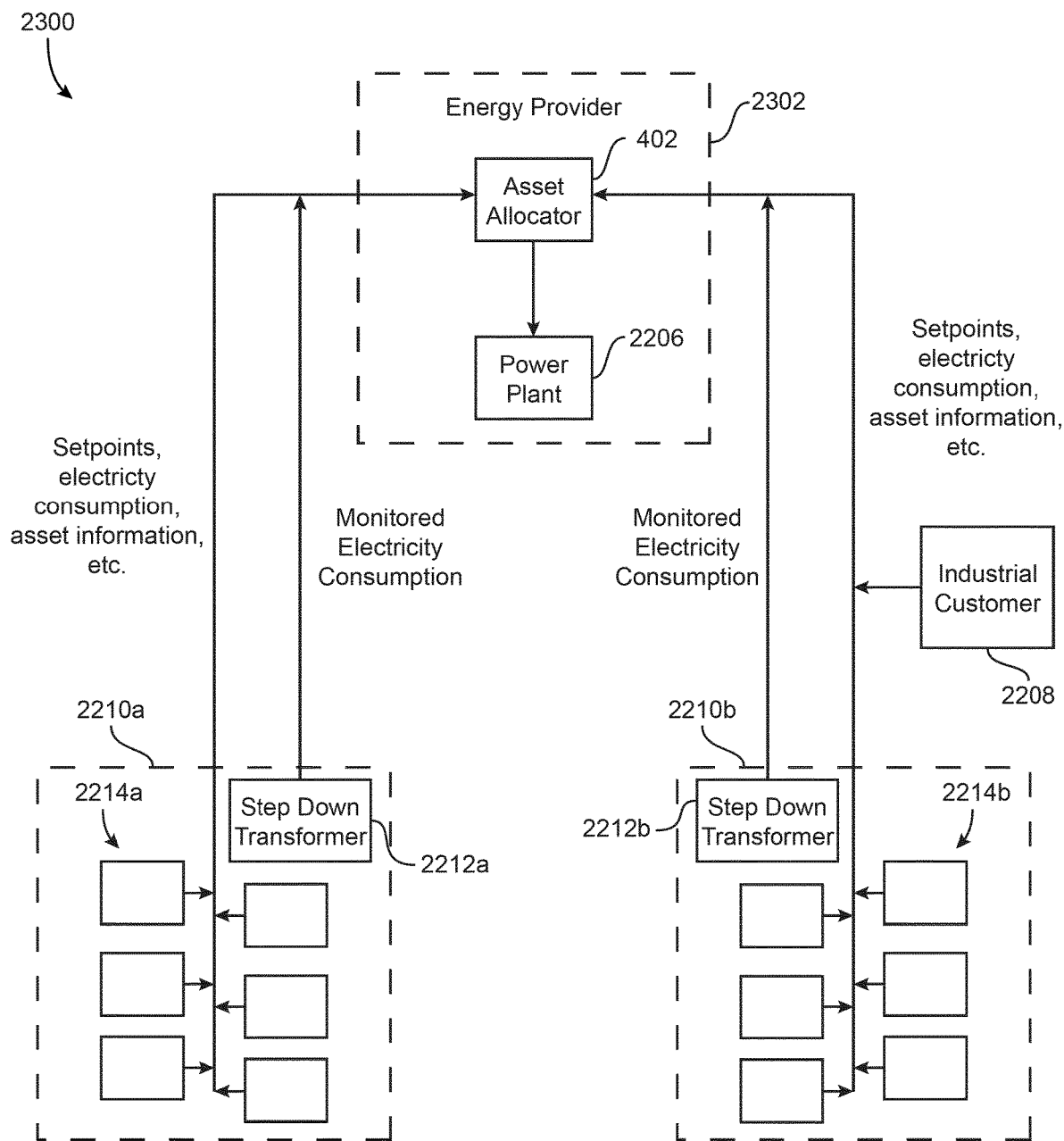
FIG. 23 is a block diagram of the power grid of FIG. 22, according to some embodiments.

Referring now to FIG. 23, a diagram of a data system 2300 is shown, according to some embodiments. Various customers may voluntarily provide energy provider 2302 with information regarding setpoints (e.g., thermostat setpoints), equipment present, equipment performance, energy consumption, etc. In some embodiments, energy provider 2302 receives the information from the customers (e.g., neighborhood 2210a and 2210b, industrial customer(s) 2208, etc.), and uses the information in the asset allocation. For example, asset allocator 402 may receive the information from the customers and use the information to determine optimal asset allocation. In some embodiments, asset allocator 402 uses the information to determine energy/cost savings which customers or entire neighborhoods could achieve if the neighborhoods or individual houses used an energy storage device or an energy generation device such as a solar field. In some embodiments, various customer models can be determined using the collected information.

In some embodiments, houses or customers which provide asset allocator 402 and energy provider 2302 with information are customers which utilize a thermostat communicably connected with asset allocator 402. For example, if the customers use a thermostat such as GLAS Smart Thermostat as produced by Johnson Controls, the GLAS thermostat may wirelessly provide asset allocator 402 with information regarding scheduling, energy consumption, equipment setpoints, etc. In some embodiments, the customers must activate information transmission before the information is transmitted to asset allocator 402 of energy provider 2302. In some embodiments, the customers must allow the energy provider to adjust setpoints before the setpoints of the building equipment can be adjusted. An example of a thermostat which can be used to monitor and provide asset allocator 402 with various energy usage information and equipment setpoint values is described in U.S. patent application Ser. No. 16/146,659 filed Sep. 28, 2018, the entire disclosure of which is incorporated by reference herein.

In some embodiments, even if not all the customers of a neighborhood, or if none of the customers of the neighborhood have a thermostat or monitoring device which communicably connects to asset allocator 402, asset allocation can still be performed based on information of energy consumption of various neighborhoods, according to some embodiments. For example, asset allocator 402 can still determine optimal asset allocation for the various neighborhoods (e.g., neighborhood 2210 and 2210b) and can determine benefits from entire neighborhoods purchasing an electricity storage device. In some embodiments, step down transformers 2212a and 2212b provide asset allocator 402 with information regarding energy consumption of neighborhood 2210a and 2210b, respectively.

In some embodiments, asset allocator 402 (and/or a controller which an asset allocator is implemented on such as energy provider controller 3300), are configured to determine customer models based on the collected/received information. In some embodiments, a heating/cooling model for each customer is determined. In some embodiments, the heating/cooling model for each customer has the form:

$$Q_{HVAC} = f_{customer}(E_{consumed})$$

where $Q_{HVAC}$ is an amount of heating/cooling of a customer, $E_{consumed}$ is the amount of energy (e.g., electricity, power, etc.) consumed by the customer to produce $Q_{HVAC}$, and $f_{customer}$ is a function relating $E_{consumed}$ to $Q_{HVAC}$. In some embodiments, $f_{customer}$ is determined using energy consumption data and the amount of heating/cooling produced from the consumed energy. In some embodiments, $f_{customer}$ is determined similarly to the subplant curves, using any of the techniques/functionality described in greater detail above with reference to FIG. 6. For example, $f_{customer}$ may be determined using a regression technique or based on various devices of the customer.

In some embodiments, a thermal model is also determined based on collected information. In some embodiments, the thermal model facilitates predicting temperatures of customers (e.g., temperature of a building customer) as a function of the amount of heating/cooling provided and outdoor air temperature. In some embodiments, the thermal model has the form:

$$T_{zone} = f_{thermal}(Q_{HVAC}, T_{OA})$$

where $T_{zone}$ is a temperature of a building/customer (e.g., a temperature of a particular room/zone in a building), $Q_{HVAC}$ is the amount of heating/cooling provided to the building/customer (e.g., the amount of heating/cooling provided to the particular room/zone of the building), $T_{OA}$ is outdoor air temperature, and $f_{thermal}$ is a function relating $Q_{HVAC}$ and $T_{OA}$ to $T_{zone}$. In some embodiments, $f_{thermal}$ is determined similarly to $f_{customer}$. In some embodiments, $f_{thermal}$ is determined by performing a regression to the collected information. In some embodiments, $f_{thermal}$ is determined based on various devices, systems, etc., of the customer/building.

In some embodiments, $f_{customer}$ and $f_{thermal}$ are used to determine constraints for energy provider controller 3300 (see FIG. 33) to ensure that the electrical profiles and/or setpoints do not result in a building/customer temperature which is uncomfortable. In some embodiments, $f_{customer}$ and $f_{thermal}$ are combined to yield the equation $T_{zone}=f_{thermal}(f_{customer}(E_{consumed}), T_{OA})$. In some embodiments, customers may indicate a minimum and maximum temperature which is acceptable. In some embodiments, for example if a customer determines that $T_{zone,min}=69°$ F. and $T_{zone,max}=72°$ F., energy provider controller 3300 may only determine $E_{consumed}$ amounts which do not cause $T_{zone}$ to exceed $T_{zone,max}$ or go below $T_{zone,min}$. In some embodiments, using $f_{customer}$ or $f_{thermal}$, or a combination of both, various constraints may be applied such that $T_{zone}$ is always within an acceptable range.

Asset Allocation System

Figure 25:
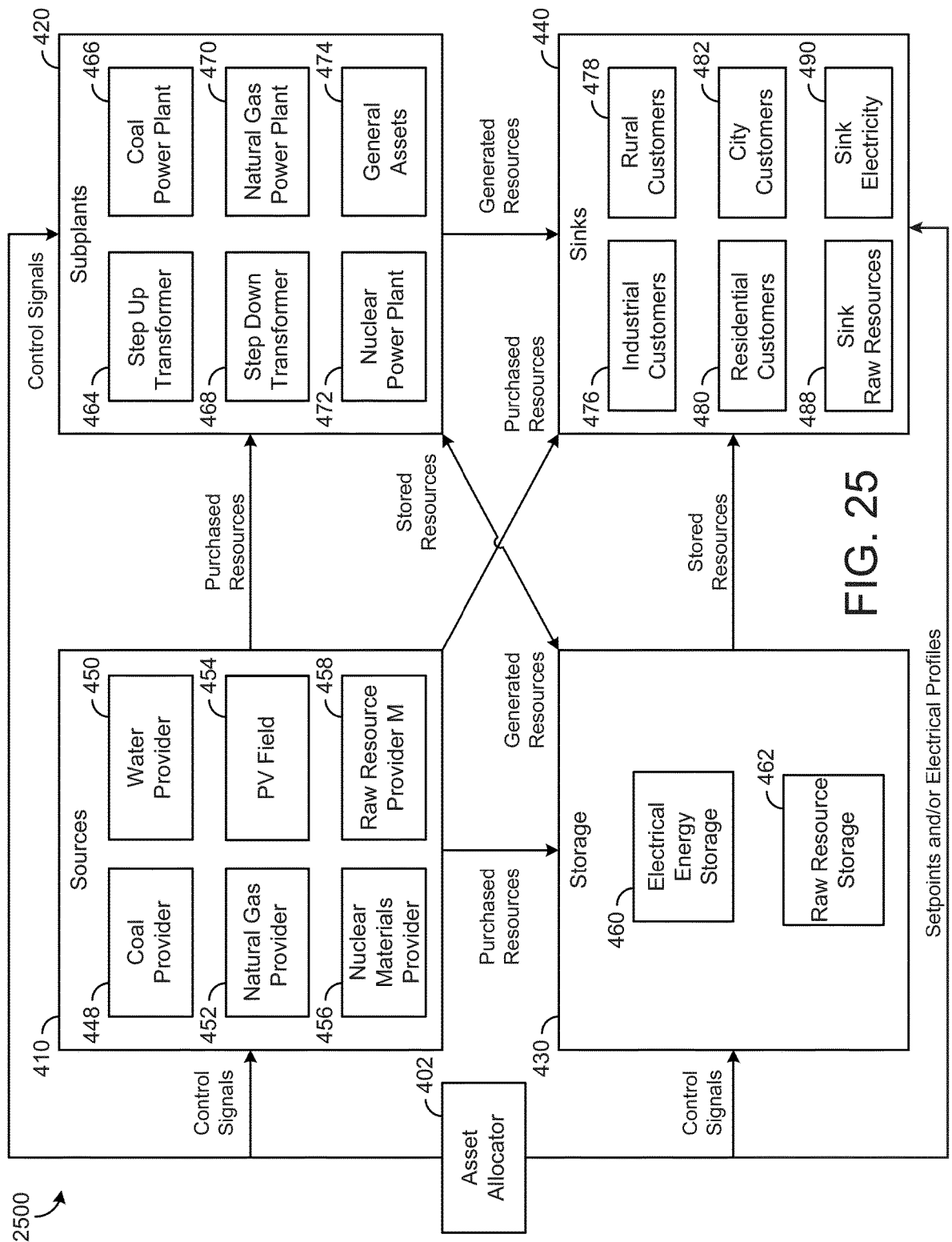
FIG. 25 is a block diagram of an asset allocation system including sources, subplants, storage, sinks, and an asset allocator configured to optimize the allocation of these assets, according to an exemplary embodiment.

Referring now to FIG. 25, an asset allocation system 2500 is shown, according to some embodiments. In some embodiments, asset allocation system 2500 as shown in FIG. 25 functions the same as asset allocation system 400 shown in FIG. 4. However, asset allocation system 2500 includes different assets, according to some embodiments.

Sources 410 are shown to include coal provider 448, water provider 450, natural gas provider 452, PV field 454, nuclear materials provider 456, and raw resource provider N 458, where N is the total number of sources 410, according to some embodiments. In some embodiments, sources 410 are any resources which may be purchased from a raw resource provider or generated without a required resource input (e.g., PV field 454). Sources 410 are shown providing purchased or produced resources to subplants 420 for conversion, or to storage 430 for storage, or to sinks 440 for consumption, according to some embodiments. Sources 410 may include any other resource provider which provides resources to subplants 420 for production. In some embodiments, the sources 410 depend on the type of subplants in subplants 420. For example, if subplants 420 include an oil consuming power plant, sources 410 include one or more oil providers, according to some embodiments.

Referring still to FIG. 25, asset allocation system 2500 is shown to include subplants 420, according to some embodiments. In some embodiments, subplants 420 includes step up transformer 464 (e.g., step up transformer 2208), coal power plant 466, step down transformer 468 (e.g., step down transformers 2212a and 2212b), natural gas power plant 470, nuclear power plant 472, and general assets 474. It should be noted that subplants 420 may include any number or variety of power plants, and is not limited to the power plants shown in FIG. 25. In some embodiments, subplants 420 receive the purchased or stored resources (e.g., coal, natural gas, oil, etc.), from sources 410 and/or storage 430, and generate resources which are provided to sinks 440.

Referring still to FIG. 25, sinks 440 are shown to include industrial customers 476, rural customers 478, residential customers 480, city customers 482, raw resource sinks 488, and electricity sinks 490, according to some embodiments. In some embodiments, customers 476-482 consume electrical resources as produced by subplants 420 or provided by storage 430. Raw resource sink 488 consumes resources which are wasted during electricity production by subplants 420 due to inefficiency of subplants 420, according to some embodiments. Electricity sink 490 consumes electrical resource which is/are wasted during either conversion of electrical energy to another resource for storage, storage of electrical energy in storage 430 over some amount of time, electrical energy consumed by step up transformers 464 or step down transformers 468 (e.g., due to the efficiency of step up transformers 464 and/or step down transformers 468), and electrical energy losses during the transmission of electricity along power lines, according to some embodiments. Sinks 440 consume resources from either subplants 420, storage 430, or a combination of both, according to some embodiments.

Referring still to FIG. 25, storage 430 is shown to include electrical energy storage 460 and raw resources storage 462, according to some embodiments. In some embodiments, electrical energy storage 460 is any of the above mentioned storage devices, configured to convert electricity to another resource to store the electrical energy, and output the stored resource as electrical power when requested by asset allocator 402. Raw resource storage 462 represents storage facilities (e.g., warehouses, tanks, barns, silos, etc.), which raw resources may be stored in., according to some embodiments. In some embodiments, raw resources purchased from sources 410 (e.g., coal) are stored in raw resource storage 462 and provided to subplants 420 at a later time for electrical energy production.

Asset allocator 402 is configured to perform asset allocation as described in greater detail above to determine optimal resource distribution/allocation, according to some embodiments. Asset allocator 402 determines control signals of when to discharge or charge electrical energy storage 460, how to operate subplants 420, when and how much raw resource to purchase from sources 410, and, in some cases, setpoints as well as electrical profiles for the customer sinks (e.g., residential customers, industrial customers, commercial customers, etc.) to follow, according to some embodiments.

Daily Profiles and Setpoint Adjustments

Figure 26:
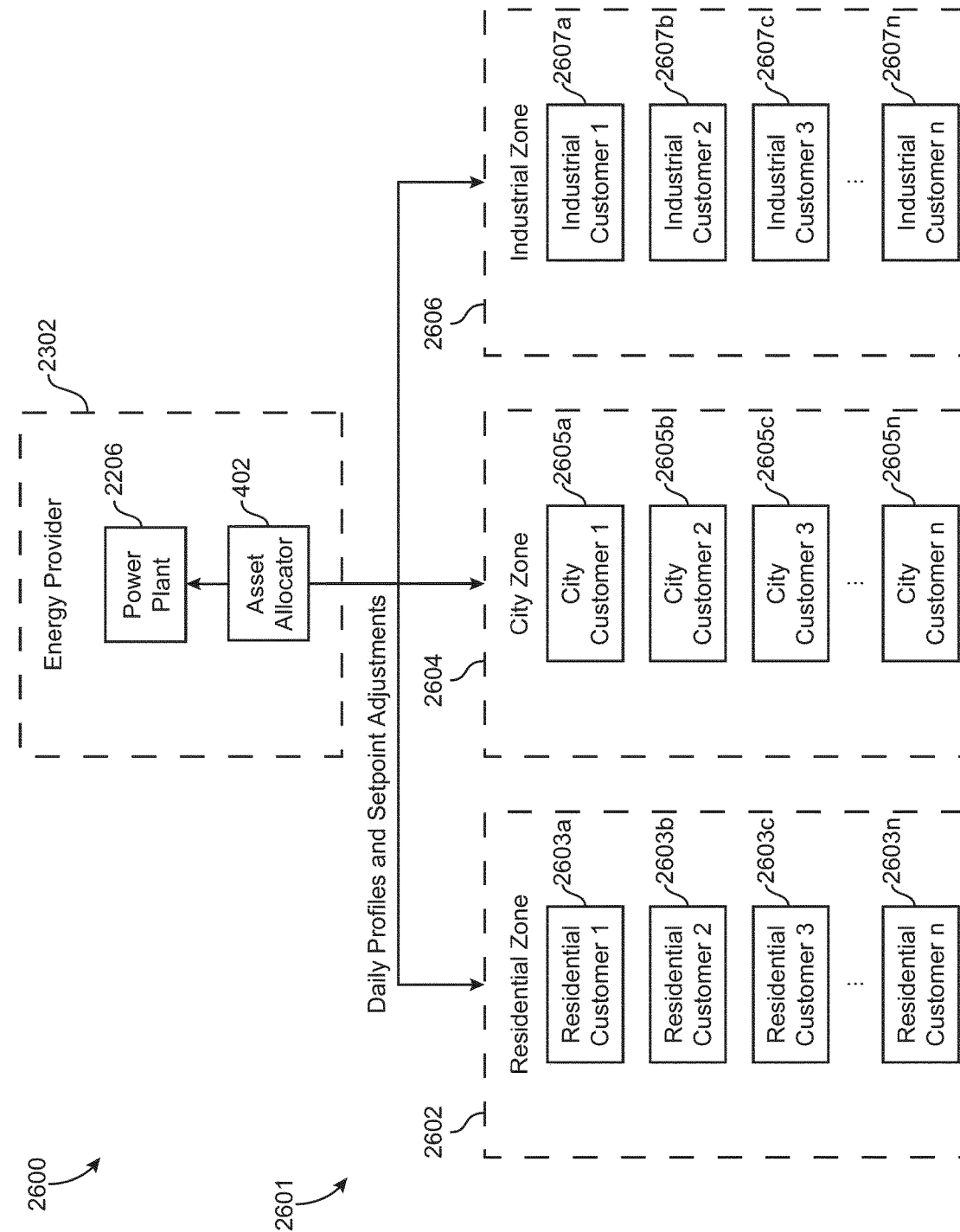
FIG. 26 is a block diagram of an energy provider supplying one or more zones with daily profiles and setpoints adjustments, according to some embodiments.

Referring now to FIG. 26, a block diagram of system 2600 is shown, according to some embodiments. System 2600 shows the communications system between various zones and asset allocator 402 of energy provider 2302, according to some embodiments. System 2600 is shown to include energy provider 2302 and general assets 2601, including a residential zone 2602, a city zone 2604, and an industrial/commercial zone 2606, according to some embodiments. In some embodiments, asset allocator 402 groups various customers into general assets (e.g., residential zone 2602, city zone 2604, industrial zone 2606). In some embodiments, asset allocator 402 groups the various customers into general assets based on a type of customer (e.g., industrial, residential, commercial, city, suburb, rural, etc.). For example, asset allocator 402 may identify certain customers as residential customers, and may define a general asset based on the identified type of customer. In some embodiments, asset allocator 402 defines the general assets based on an average amount of energy consumed per year, based on historical data. For example, if a certain customer regularly consumes a large quantity of electrical energy yearly, indicating that the customer is a commercial or industrial customer, asset allocator 402 may identify that customer as a commercial customer and include that customer in a commercial/industrial general asset.

In some embodiments, asset allocator 402 defines general assets based on geographic location of the customers. For example, asset allocator 402 may define a particular block as a general asset, or a particular neighborhood as a general asset, or a particular region, city, town, etc., as a general asset. In some embodiments, asset allocator 402 defines general assets based on the customers which receive electrical energy from a particular step down transformer. For example, neighborhoods typically have a step down transformer which reduces the voltage received from a power plant so it can be provided to residential customers, according to some embodiments. In some embodiments, all of the residential customers which receive electrical energy from a particular step down transformers are defined by asset allocator 402 as a general asset.

In some embodiments, general assets are defined based on the voltage at which the customers consume electrical energy. For example, customers which consume electrical energy at or above a voltage of 110 kV may be considered "high voltage" customers, and customers which consume electrical energy below 110 kV may be considered "low voltage" customers, according to some embodiments. In some embodiments, more than two groups are defined based on voltage consumption level. In some embodiments, general assets are defined within each of these groups based on any of the methods discussed hereinabove (e.g., geographic location, type of customer, energy consumption, common step down transformer, etc.).

In some embodiments, asset allocator 402 performs asset allocation to determine an electrical profile for each of the general assets to follow. For example, as shown in FIG. 26, general assets are defined based on type of customer, according to some embodiments. General assets 2601 include residential zone 2602, city zone 2604, and industrial zone 2606, according to some embodiments. Each of these general assets receives a unique electrical profile, as determined by asset allocator 402, according to some embodiments. Residential zone 2602 is shown to include residential customers 2603a-2603n, city zone 2604 is shown to include city customers 2605a-2605n, and industrial zone 2606 is shown to include industrial customers 2607a-2607n, according to some embodiments. In some embodiments, the electrical profile provided by asset allocator 402 to each of these general assets is any of an electrical profile for a day, several days, a week, several weeks, a month, etc.

In some embodiments, asset allocator 402 provides customers within each general asset with setpoints (e.g., thermostat setpoints, equipment setpoints, etc.) to achieve the electrical profile. In some embodiments, asset allocator 402 only provides the customers with the setpoints if the customers have opted to allow energy provider 2302 the ability to manipulate their building/house setpoints. In some embodiments, in order to determine the setpoints for each customer to achieve the electrical profile as determined by asset allocator 402, a low level optimization of each general asset is performed. In some embodiments, the electrical profile is determined by performing a high level optimization, and the setpoints are determined by performing a low level optimization for each of the general assets, using the electrical profiles determined by the high level optimization as constraints, similar to the high level optimization and low level optimization previously described.

Figure 27:
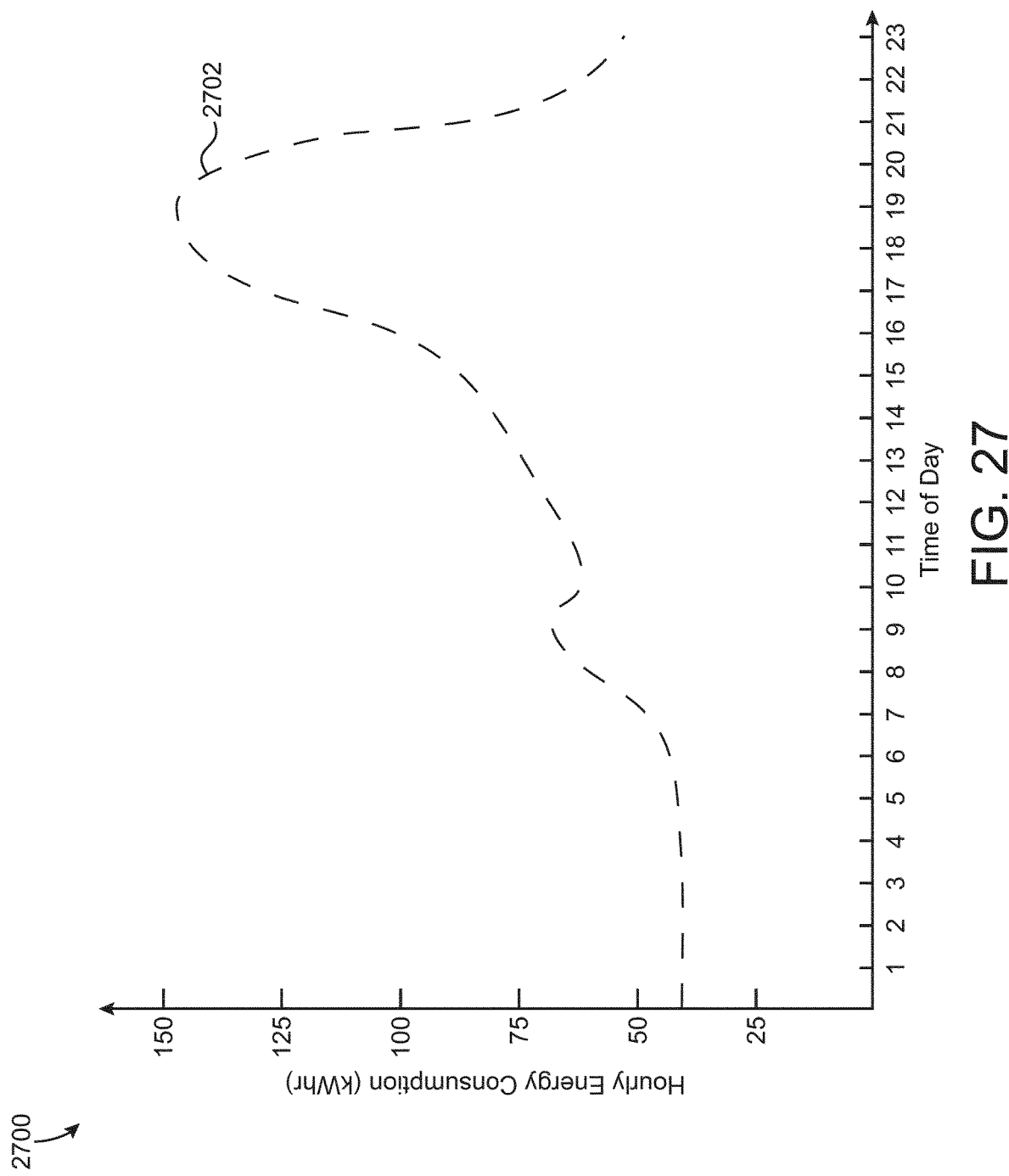
FIG. 27 is a graph illustrating a daily profile provided to a customer, according to some embodiments.

Referring now to FIG. 27, a graph 2700 illustrating an electrical profile provided to a general asset is shown, according to some embodiments. Graph 2700 includes series 2702 which shows the trend in hourly energy consumption over a day, according to some embodiments. In some embodiments, graph 2700 illustrates an electrical profile for a week, a month, etc., or any other period of time. The Y axis of graph 2700 represents hourly energy consumption of the general asset, and the X axis of graph 2700 represents the time of day, according to some embodiments. As shown in FIG. 27, a peak load occurs at approximately hour 19 of the day, according to some embodiments. In some embodiments, graph 2700 illustrates the electrical profile determined by asset allocator 402 for a weekday. In some embodiments, graph 2700 is different (e.g., series 2702 has a different overall shape, a different peak time, multiple peak times, etc.) based on the day of the week. In some embodiments, asset allocator 402 determines setpoint adjustments for assets defined within the general asset to achieve the overall power consumption of the general asset according to graph 2700. In some embodiments, asset allocator 402 determines hourly setpoints for each asset in the general asset.

General Assets

Referring now to FIGS. 28A-31, general assets used by asset allocator 402 are shown in greater detail, according to some embodiments. In some embodiments, general assets are defined according to any of the methods described in greater detail above with reference to FIG. 26. In some embodiments, general assets are defined arbitrarily.

In some embodiments, solving certain higher-complexity optimization problems requires excessive time or processing power. For example, some systems may have a large quantity or sources, sinks, subplants, etc., and it may be unfeasible for asset allocator 402 to optimize asset allocation. Additionally, the optimization problem may become unfeasible if the processing abilities of processor 608 (or any other processor which asset allocator 402 is used by) do not meet the necessary requirements to perform the optimization problem.

In some embodiments, the various assets (e.g., sources, sinks, storage, subplants, etc.), are grouped into general assets. The general assets may then be treated as overall assets, and asset allocator 402 may determine optimal resource allocation based on the overall assets. In some embodiments, general assets combine subplant, storage, and load (i.e., sink) asset types. In some embodiments, general assets combine the modeling of subplants and general storage while also allowing internal loads. In some embodiments, as with other types of assets, the general assets are defined based on the resources it uses and its model inputs. In some embodiments, the resources which the general assets use include inputs to the general asset, outputs from the general asset, and internal resources exchange between the subplant model, storage model, and loads.

Figure 28A:
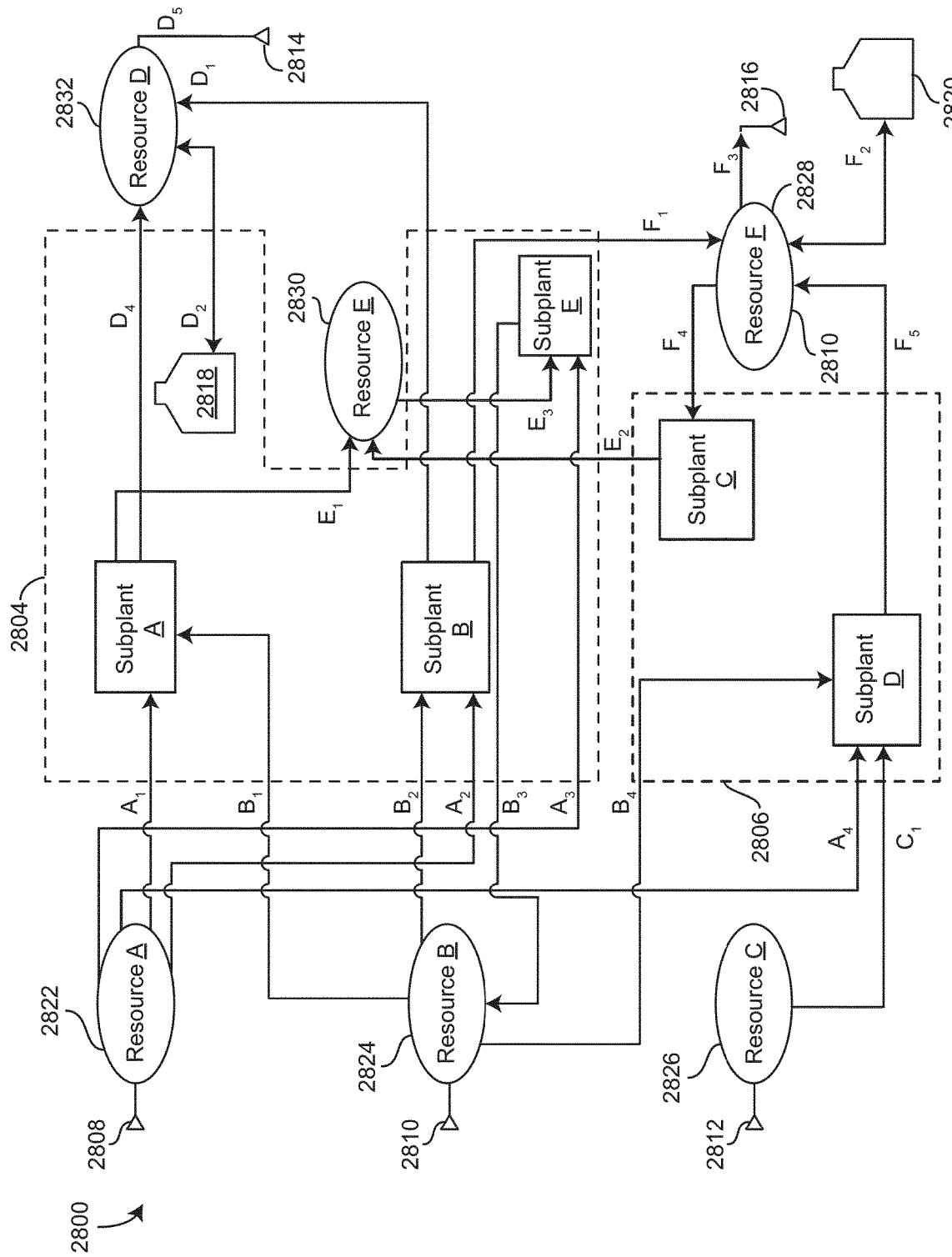
FIG. 28A is a block diagram of a resource diagram, according to some embodiments.
Figure 28B:
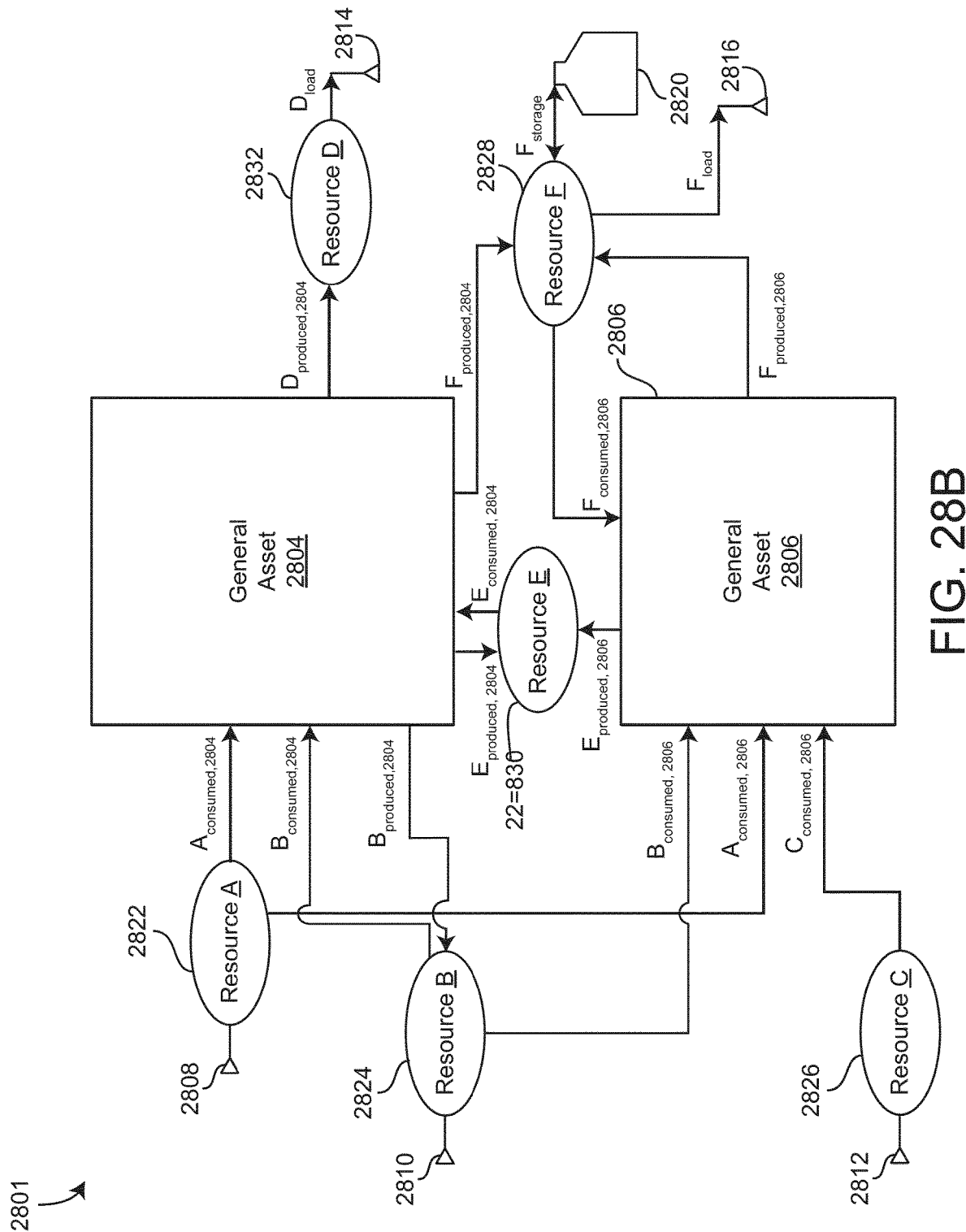
FIG. 28B is a block diagram of a non-granular resource diagram of the resource diagram of FIG. 28A, shown to include general assets, according to some embodiments.

Referring now to FIG. 28A, a resource diagram 2800, is shown, according to some embodiments. Resource diagram 2800 is shown to include various resources, sources, subplants, sinks, and storage assets. For example, resource diagram 2800 is shown to include resources A-F. In some embodiments, the various assets of resource diagram 2800 are grouped into general assets, shown as general asset 2804 and general asset 2806 in FIG. 28B. FIGS. 28A-B show only two general assets, however, more or less than two general assets may be used, according to some embodiments. In some embodiments, assets are grouped into general assets arbitrarily. In some embodiments, if a particular asset grouping yields an unsolvable configuration, the assets are re-grouped (either into more general assets, or less general assets, or a same number of general assets which include different assets). In some embodiments, resource diagram 2800 is determined by a user.

Referring to FIG. 28A, resource diagram 2800 is shown to include 12 total assets, according to some embodiments. Resource diagram 2800 includes assets shown as source 2808, source 2810, source 2812, subplant A, subplant B, subplant C, subplant D, subplant E, sink 2814, sink 2816, storage 2818, and storage 2820. Subplants A-E receive one or more resources as well as one or more operating parameters and function to convert the resource to a different type of resource according to a subplant model, according to some embodiments. For example, subplant A is shown receiving resource A and resource B, and outputting resource D and resource E, according to some embodiments. Subplant B receives resource A and resource B and outputs both resource D and resource F, according to some embodiments. Subplant C receives resource F and outputs resource E, according to some embodiments. Subplant D receives resource C and resource A and outputs resource F, according to some embodiments. In some embodiments, sinks 2814 and sink 2816 are building load requirements. For example, sink 2816 may be a hot water load requirement (e.g., an amount of hot water consumed by the building over a time window), and sink 2814 may be a chilled water load requirement (e.g., an amount of chilled water consumed by the building over the time window). In some embodiments, sink 2816 and sink 2814 are constraints which are applied to the optimization problem. For example, in some embodiments, sink 2816 and sink 2814 are required loads which the solution determined by asset allocator 402 must meet.

Any of the resources, sources, storage, subplants, and sinks shown in FIGS. 28A-B may be any of the resources, sources, storage, subplants, and sinks, as described in greater detail above with reference to FIG. 25.

Resource diagram 2800 is shown to include storage 2818 and storage 2820, according to some embodiments. In some embodiments, storage 2818 and storage 2820 store a resource for use at a later time. For example, storage 2818 receives resource D, stores resource D, and may later provide sink 2814 with resource D as determined by asset allocator 402, according to some embodiments. In some embodiments, storage 2818 provides resource D to sink 2814 at a later time, as determined by asset allocator 402. In some embodiments, storage assets may be general storage assets. General storage assets allow the dynamics of the storage (e.g., losses over time) to be represented by a state space model. For example, the state space model may predictably relate a total amount of stored resource with respect to time. In this way, general storage devices represent a time-variance of the storage device, rather than treating the stored resource as static. For example, if the storage device is a battery which stores charge, the stored charge may vary over time, as represented and predicted by a state space model.

Resource diagram 2800 is shown to include general asset 2804 and general asset 2806, according to some embodiments. In some embodiments, general asset 2804 is defined by subplant A, subplant B, subplant E, and storage 2818. General asset 2804 is a grouping of these assets and may be treated as a single asset by asset allocator 402. General asset 2806 is defined by subplant C and subplant D, according to some embodiments. In some embodiments, defining/grouping assets into general assets (e.g., general asset 2804 and general asset 2806) allows asset allocator 402 to optimize an infeasible asset allocation problem. In some embodiments, even if the asset allocation problem is feasible, general assets may be defined to decrease processing requirements of asset allocator 402 and simplify the asset allocation problem to decrease the amount of time it takes asset allocator 402 to solve the problem.

It should be noted that while general asset 2804 and general asset 2806 have been defined a particular way as shown in FIG. 28A, general asset 2804 and general asset 2806 may be defined differently than as shown. For example, general asset 2804 and general asset 2806 may be combined to form an overall general asset, according to some embodiments.

Alternatively, general assets 2804 and 2806 may be defined to include storage 2818 and storage 2820, respectively. In some embodiments, more or less than two general assets are defined. In some embodiments, each general asset (e.g., general asset 2804 and/or general asset 2806) includes sub-general assets. For example, each general asset 2804 and/or general asset 2806 may further define sub-general assets by grouping any of the assets into groups, similar to how general asset 2804 and general asset 2806 are defined for resource diagram 2800. In this way, multiple layers of optimization may be defined by grouping assets into general assets and sub-general assets.

Referring to FIG. 28B, a non-granular resource diagram 2801 is shown, according to some embodiments. Non-granular resource diagram 2801 is a simplified version of resource diagram 2800 shown in FIG. 28A in which several of the granular assets have been represented by aggregate general assets 2804 and 2806. In some embodiments, non-granular resource diagram 2801 represents a non-granular version of a system (e.g., a central plant, a building system, etc.) used to define a non-granular optimization problem. In some embodiments, non-granular resource diagram 2801 represents resource diagram 2800 after the general assets (e.g., general asset 2804 and general asset 2806) have been defined. In some embodiments, general asset 2804 and general asset 2806 are each treated as single assets. In some embodiments, general asset 2804 and general asset 2806 are each treated as subplants in the non-granular view of the system, since they may function similarly to subplants (e.g., receiving one or more resources and operating parameters and outputting one or more resources).

Non-granular resource diagram 2801 is shown to include eight assets, according to some embodiments. For example, non-granular resource diagram 2801 includes the assets of source 2808, source 2810, source 2812, general asset 2804, general asset 2806, sink 2814, sink 2816, and storage 2820, according to some embodiments. As shown in FIGS. 28A-B, non-granular resource diagram 2801 includes eight assets, whereas resource diagram 2800 includes twelve assets. By defining general asset 2804 and general asset 2806, four of the assets have been removed from consideration when asset allocator 402 optimizes the system shown in non-granular resource diagram 2801. In resource diagrams which contain a very large quantity of assets, defining general assets may remove an even greater number of assets from consideration when asset allocator optimizes a non-granular resource diagram for that resource diagram.

In some embodiments, asset allocator 402 first solves the non-granular optimization problem represented by non-granular resource diagram 2801, and then provides the determined asset allocations to each of the general assets 2804 and 2806. For example, after the non-granular optimization problem has been solved, the resource inputs and outputs for each general asset 2804 and 2806 to achieve the constraints of sink 2814 and sink 2816 are known. In some embodiments, the input and output of resources for each of general asset 2804 and general asset 2806 as determined by solving the non-granular optimization problem are provided to granular optimization problems for each of general asset 2804 and general asset 2806. In this way, asset allocator 402 may hierarchically define various general assets and sub-general assets which define various optimization problems, hierarchically solve the optimization problems (e.g., starting at the least granular level and proceeding to the most granular level), and provide the determined resource allocation to the next optimization problem. For example, as shown in FIG. 28B, asset allocator 402 first determines an optimal solution of the non-granular optimization problem represented by non-granular resource diagram 2801 (e.g., by determining asset allocation which satisfies the requirements of sink 2814 and sink 2816 and then determining resource distribution to general asset 2804 and general asset 2806 and/or general asset operations which minimize the cost function yet meet the sink requirements), and uses the determined resource allocation for each of the general assets 2804 and 2806 to solve each granular problem as represented by the assets within each of the general assets 2804 and 2806. Specifically, the non-granular optimization solution may determine a required total resource A, a required total resource B, etc., for general asset 2804 which meets the load requirements of sink 2814 and sink 2816. After these total resource inputs and/or outputs for general asset 2804 have been determined for each resource type, a non-granular optimization problem for general asset 2804 can be solved using the determined resource inputs/outputs as constraints for the non-granular problem.

Referring still to FIG. 28B, general asset 2804 is shown consuming resource A, resource B, and resource E, and outputting (e.g., producing, converting, etc.) resource D to resource pool 2832, resource B to resource pool 2824, and resource F to resource pool 2828, according to some embodiments. In some embodiments, sink 2814 receives a required load amount from resource pool 2832. In some embodiments, general asset 2804 stores some amount of resource D internally and can provide the stored resource D to resource pool 2832 as determined by asset allocator 402. In some embodiments, general asset 2804 produces resource B and provides the produced resource B to resource pool 2824, where it may be used by general asset 2804 again, and/or may be used by general asset 2806. In some embodiments, general asset 2804 produces resource F and provides resource F to resource pool 2828, which may be then used by general asset 2806, stored in storage 2820, or used by sink 2816 as required. In some embodiments, general asset 2804 functions similarly to a subplant, and has the relationship:

$$[B_{produced}, D_{produced}, F_{produced}]_{2804} = f(A_{consumed}, B_{consumed}, E_{consumed})_{2804}$$

where $f(A_{consumed}, B_{consumed}, E_{consumed})_{2204}$ is a model for general asset 2804. The model for general asset 2804 can be generated in a variety of ways including, for example, aggregating the models of the subplants or other assets which make up general asset 2804, or by performing a regression on general asset 2804 to determine the relationship between the input and output resources of general asset 2804, described in greater detail below. In some embodiments, various constraints can be determined based on non-granular resource diagram 2801 and/or various load constraints. For example, sink 2814 consumes an amount $D_{load}$ from resource pool 2832. Resource pool 2832 is directly supplied by general asset 2804. Therefore, the constraint $D_{produced,2804} = D_{load}$ can be determined. Likewise, general asset 2804 consumes resource E from resource pool 2830 which is directly supplied by general asset 2806, according to some embodiments. Therefore, the constraint $E_{consumed,2804} = E_{produced,2806}$ can be determined. Other constraints can be similarly determined.

General asset 2806 can likewise function similar to a subplant, according to some embodiments. In some embodiments, general asset 2806 functions as a subplant according to the relationship:

$$[E_{produced}, F_{produced}]_{2806} = f(A_{consumed}, B_{consumed}, C_{consumed}, F_{consumed})_{2806}$$

where $f(A_{consumed}, B_{consumed}, C_{consumed}, F_{consumed})_{2806}$ is a model relating the resource inputs to the resource outputs for general asset 2806. In some embodiments, the model for general asset 2806 is determined similarly to the model for general asset 2804 (e.g., by a regression, by aggregating models of the various subplants which define general asset 2806, etc.).

After asset allocator 402 has solved the non-granular optimization problem for non-granular resource diagram 2801, all of the resources consumed and produced as shown in FIG. 28B which optimally satisfy the given constraints (e.g., required resource load for sink 2814 and sink 2816) are known, according to some embodiments. These known resource production and consumption values can then be used to solve the more granular optimization problems for each of general asset 2804 and general asset 2806, as described in greater detail below.

Figure 29:
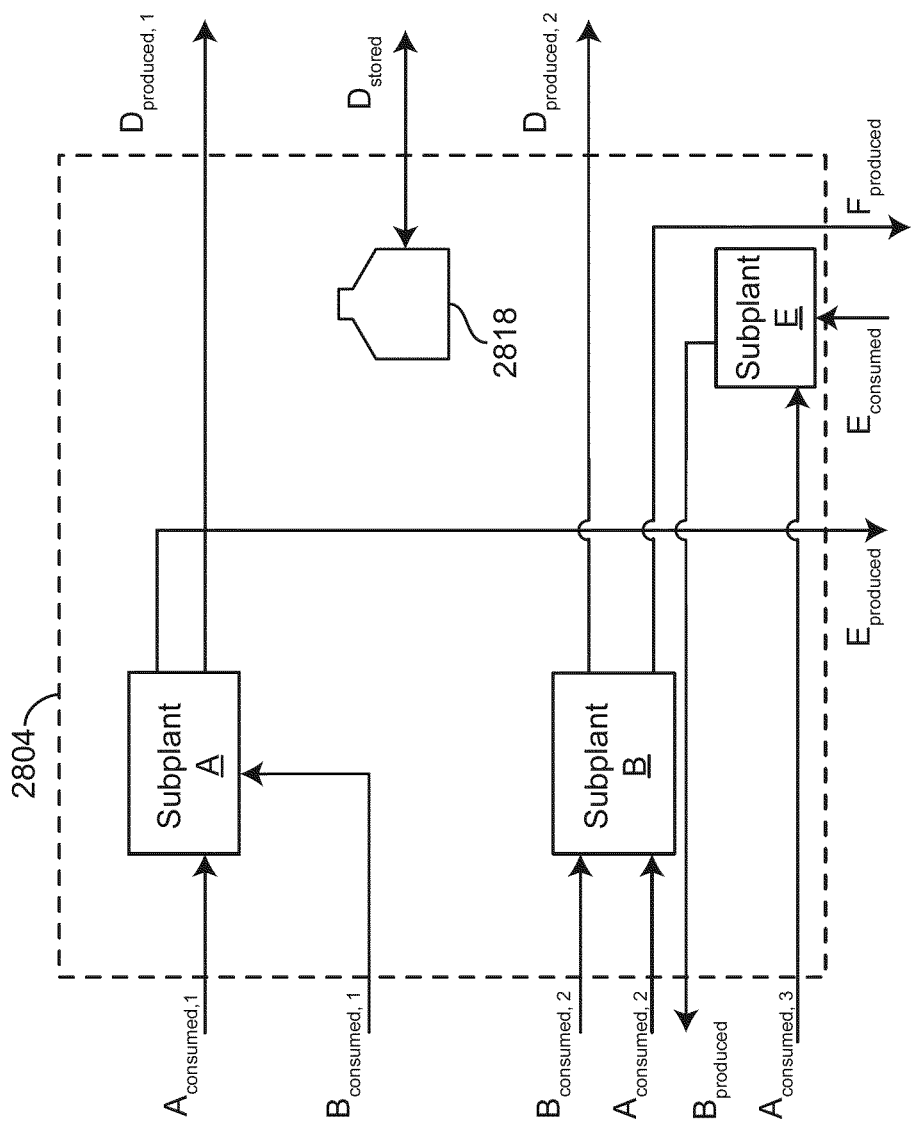
FIG. 29 is a block diagram of one of the general assets of FIG. 28B, according to some embodiments.

Referring now to FIG. 29, general asset 2804 is shown in greater detail, according to some embodiments. In some embodiments, the resource productions and consumptions of general asset 2804 as determined by asset allocator 402 for the non-granular optimization problem are used to determine optimal asset allocation for the assets which define general asset 2804. For example, in FIG. 23, general asset 2804 consumes various amounts of resource A, according to some embodiments. In some embodiments, subplant A consumes $A_{consumed,1}$, subplant B consumes $A_{consumed,2}$, etc. In order to meet the overall resource consumption/production of each resource as determined by the solution to the non-granular optimization problem, the sum of each resource entering and leaving general asset 2804 must equal the total resource as determined, according to some embodiments. For example, for resource A, a constraint based on the solution from FIG. 28B can be expressed as: $A_{consumed,1} + A_{consumed,2} + A_{consumed,3} = A_{consumed,2804}$, where $A_{consumed,2804}$ is known from the solution to the non-granular optimization problem. Likewise, for resource B, a constraint can be expressed as: $B_{consumed,1} + B_{consumed,2} = B_{consumed,2804}$ and $B_{produced} = B_{produced,2804}$, where $B_{produced,2804}$ and $B_{consumed,2804}$ are known from the solution to the non-granular optimization problem. For resource D, the constraint is: $D_{produced,1} + D_{produced,2} \pm D_{stored} = D_{produced,2804}$, where $D_{produced,2804}$ is known from the solution to the non-granular optimization problem. For resource E, the constraints are $E_{produced} = E_{produced,2804}$ and $E_{consumed} = E_{consumed,2904}$. It should be noted that resource production values have a positive value, while resource consumption values have a negative value as shown in the resource balances for each resource pool below.

Likewise, a constraint for each subplant can be determined using the subplant model. For subplant A, the constraint can be defined as: $[E_{produced}, D_{produced,1}] = f_A(A_{consumed,1}, B_{consumed,1})$ where $f_A$ is a subplant model of subplant A which relates the consumed resource A and resource B to the produced resource E and the produced resource D. Likewise, for subplant B the constraint can be defined as $[D_{produced,2}, F_{produced}] = f_B(A_{consumed,2}, B_{consumed,2})$ where $f_B$ is a subplant model of subplant B which relates the consumed resources A and B to the produced resources D and F. Likewise, for subplant E, the constraint can be defined as: $B_{produced} = f_E(A_{consumed,3}, E_{consumed})$ where $f_E$ is a subplant model of subplant E which relates the consumed resources A and E to the produced resource B.

In some embodiments, each of the resource pools as shown in FIG. 28B represent summing junctions, indicating a net amount of a particular resource. In some embodiments, resources which enter a resource pool have positive values, and resources which exit a resource pool have a negative value. For example, at resource pool 2828, a constraint can be defined as: $F_{produced,2806} + F_{produced,2804} - F_{load} - F_{consumed,2806} \pm F_{storage} = 0$. Likewise, each of the resource pools can be considered summing junctions which sum to zero, with inputs being positive, and outputs being negative, which determines the constraints shown below:

$$F_{produced,2806} + F_{produced,2804} - F_{load} - F_{consumed,2806} \pm F_{storage} = 0$$

$$E_{produced,2804} + E_{produced,2806} - E_{consumed,2804} = 0$$

$$D_{produced,2804} - D_{load} = 0$$

General assets 2804 and 2806 may be treated as subplants and may be subject to a variety of constraints, generated similarly to the constraints in greater detail above with reference to FIG. 9. The constraints may define, for example, relationships between input resources and output resources (i.e., resource conversion rates), maximum and minimum rates at which resources can be produced or consumed, or other constraints that define how general assets 2804 and 2806 operate. In some embodiments, a model of each general asset (e.g., general asset 2804 and general asset 2806) is used by asset allocator 402 to determine asset allocation. The generation of the models for the general assets is described in greater detail below with reference to FIGS. 29-30. In some embodiments, the subplant models for general assets 2804 and 2806 are similar to the subplant models described in greater detail above with reference to FIG. 9. In some embodiments, a resource pool is created with a positive load for productions of the general assets and a negative load for usages of the general assets. In some embodiments, the resource pool is used by asset allocator 402 to solve the non-granular optimization problem represented by non-granular resource diagram 2801.

Asset allocator 402 uses these constraints to determine various sets of resource combinations which achieve the resource consumptions and productions as determined by the non-granular optimization problem, according to some embodiments. Since the resource consumptions and productions for general asset 2804 as determined by the non-granular optimization problem optimally satisfy the required resources for sinks 2814 and 2816, the various sets of resource combinations which achieve these resource consumptions and productions also satisfy the required resources for sinks 2814 and 2816. In some embodiments, asset allocator 402 determines multiple combinations of resource allocation within general asset 2804 which satisfy the constraints as determined by the non-granular optimization problem. In this case, asset allocator 402 determines a cost function (described in greater detail above with reference to the description of asset allocator 402) for general asset 2804 and minimizes the cost function. In this way, asset allocator 402 determines asset allocation within general asset 2804 which cost-effectively provide sinks 2814 and 2816 with the required amount of resources.

Additionally, an overall model for general asset 2804 may be determined. The model may relate the resource production of general asset 2804 based on the resource consumptions of general asset 2804. In this way, the model can be used to determine resource productions for general asset 2804 based on the resources provided to and consumed by general asset 2804. In some embodiments, the model is an equation having the form:

$$[B_{produced}, D_{produced,1}, D_{produced,2}, E_{produced}, F_{produced}]$$
$$f_{2804}(A_{consumed,1}, A_{consumed,2}, A_{consumed,3}, B_{consumed,1}, B_{consumed,2}, E_{consumed})$$

where $f_{2804}$ is the model, relating the produced resources in terms of the consumed resources. In some embodiments, the model may be determined based on the models for each of the subplants which define general asset 2804. Each of these models may be added or otherwise combined to determine the overall model for general asset 2804. Adding the models for each of the subplants of general asset 2804 yields the equation:

$$[B_{produced}, D_{produced,1}, D_{produced,2}, E_{produced}, F_{produced}] = f_A(A_{consumed,1}, B_{consumed,1}) + f_B(A_{consumed,2}, B_{consumed,2}) + f_E(A_{consumed,3}, E_{consumed})$$

according to some embodiments. In some embodiments, the model can be mathematically defined as: $f_{2804} = f_A + f_B + f_E$. More generally, this equation may be applied to any general asset as: $f_{general,asset} = \Sigma(f_A + f_B + f_C + f_D + \ldots + f_n)$, where n is a number of subplants which make up the general asset. In some embodiments, the model takes into account an amount of a resource input/output (e.g., consumed and produced) by internal storage (e.g., storage 2818). For example, the model may include a storage model term $f_{storage}$ which determines an amount of resource D input or output to general asset 2804 based on an input or output determination of asset allocator 402 and/or varies based on time.

In some embodiments, the model of the general asset (e.g., general asset 2804) may be determined by a regression process. In some embodiments, each of the various consumed resources are varied (e.g., $A_{consumed,1}$ is varied), the produced resources are monitored, and a regression analysis is performed to determine a relationship between the consumed resources and the production resources. In some embodiments, one or both of the resource demand of sink 2814 and sink 2816 is varied and the consumed resources and produced resources of the general assets (e.g., general asset 2804) are monitored. A regression technique may be applied to the consumed resource information and the produced resource information to determine a model for the general asset which relates consumed resources to produced resources. The regression technique may be useful if one or more of the models of the subplants are unknown or if the subplant models cannot be combined to determine the model of general asset 2804.

Figure 30:
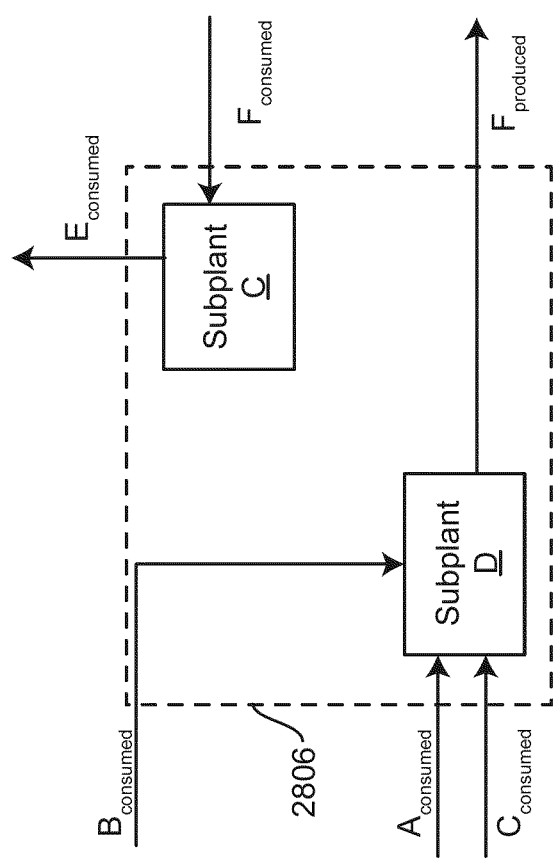
FIG. 30 is a block diagram of one of the general assets of FIG. 28B, according to some embodiments.

Referring now to FIG. 30, general asset 2806 is shown, according to some embodiments. In some embodiments, general asset 2806 is analyzed similarly to general asset 2804 as described in greater detail above with reference to FIG. 29. For example, various resource constraints of the consumed and produced resources of general asset 2806 may be determined, an overall model of general asset 2806 may be determined, and various subplant constraints may be determined.

For example, the required resource production and resource consumption of general asset 2806 as determined by the non-granular optimization problem may be used as constraints for the specific resources which are consumed or produced by general asset 2806, according to some embodiments. In some embodiments, the determined resource production and resource consumption are goals or targets for the optimization of general assets 2804 and 2806. In some embodiments, if a solution determined for granular optimization problems of general assets 2804 and 2806 does not meet the target/goal, a penalty is incorporated into the cost function associated with the granular optimization problems. As shown in FIG. 30, general asset 2806 is fairly simple, and it can be determined that $A_{consumed}$, $B_{consumed}$, $C_{consumed}$, $E_{consumed}$, $F_{consumed}$, and $F_{produced}$ are all directly determined by the non-granular optimization problem. In this case, any resource allocation which may otherwise be determined by performing a granular asset allocation is already determined by the non-granular optimization, however, it should be noted that general asset 2806 could be more complex and could require an additional granular optimization.

Hierarchical Approach

Figure 31:
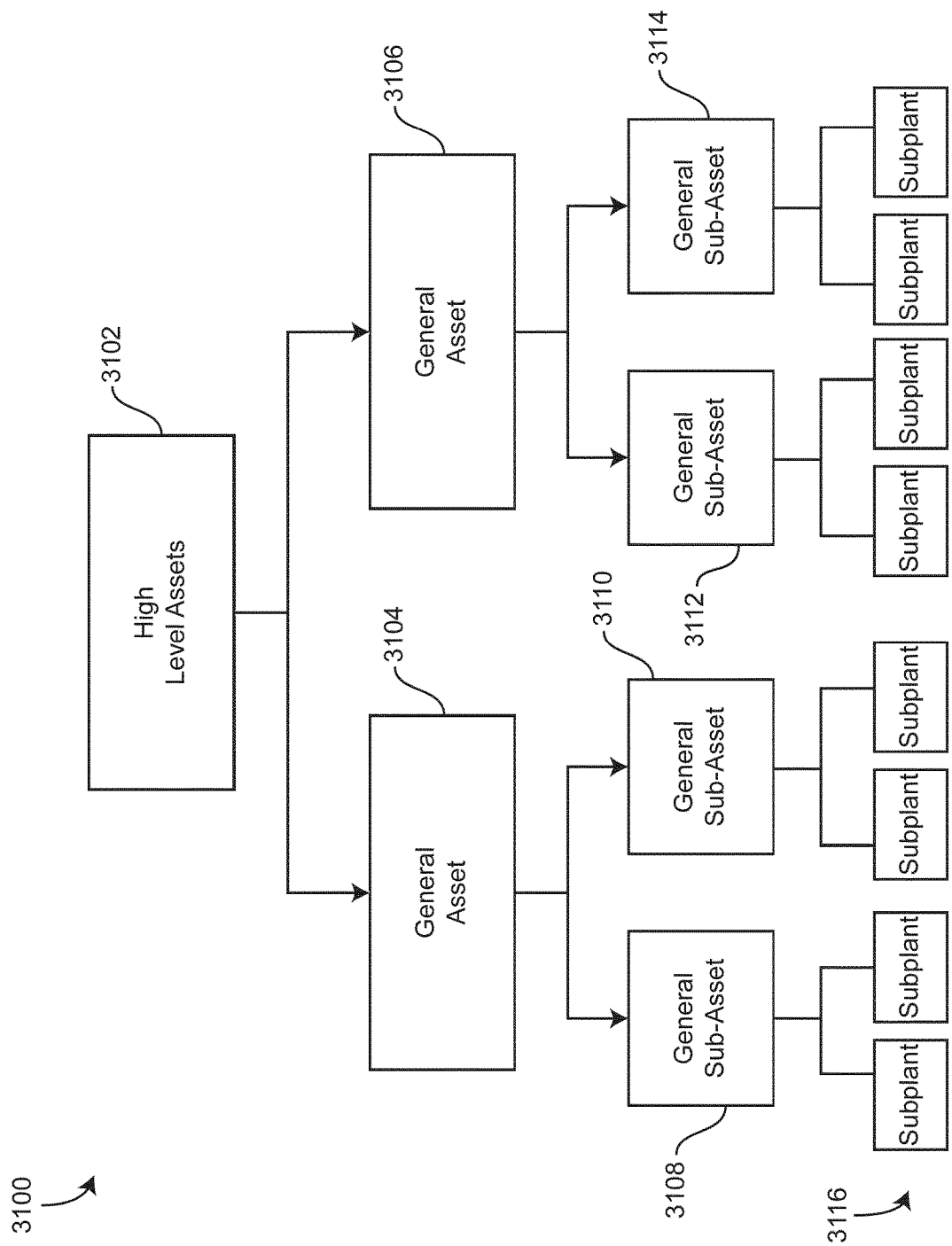
FIG. 31 is a block diagram of a hierarchical asset allocation approach, according to some embodiments.

Referring now to FIG. 31, a block diagram 3100 illustrating the logical progression of a hierarchical asset allocation method is shown, according to some embodiments. Each level of the hierarchy represents a view of the same underlying assets at a different level of abstraction or granularity. The top level is the least granular whereas the bottom level is the most granular. In some embodiments, top level assets 3102 include general asset 3104 and general asset 3106. In some embodiments, general asset 3104 and general asset 3106 include sub-general assets. For example, general asset 3104 includes sub-general asset 3108 and sub-general asset 3110, according to some embodiments. In some embodiments, general asset 3106 includes sub-general asset 3112 and sub-general asset 3114. Top level assets 3102 represent a non-granular (top level) optimization problem, which may include various sources, sinks, subplants, storage, etc., and may be optimized by asset allocator 402, according to some embodiments. In some embodiments, top level assets 3102 are grouped into general assets 3104 and 3106. The top level assets 3102 may then be optimized with the general assets to determine general resource and model inputs for each of the general assets 3104 and 3106. In some embodiments, the general resource inputs for each of the general assets 3104 and 3106 can be used as constraints to perform an optimization for general assets 3104 and 3106. In some embodiments, general assets 3104 and 3106 are used to determine optimal resource allocation and model inputs for sub-general assets 3108-3114. Finally, sub-general assets 3108-3114 may each be optimized to determine optimal asset allocation (e.g., resource consumption, model inputs, etc.) of subplants 3116. In this way, general assets 3104 and 3106 may be treated themselves as top level assets 3102, having sub-general assets which asset allocator 402 can optimize.

Asset allocation may be performed from a top-down (e.g., non-granular to granular) approach. For example, asset allocation may first be performed for top level assets 3102 to determine asset allocation for general assets 3104 and 3106. The determined asset allocation of each of general asset 3104 and 3106 may be used to perform asset allocation for the sub-general assets of each of general asset 3104 and general asset 3106. In this way, asset allocation may be performed for each of general asset 3104 and 3106 to determine optimal asset allocation for sub-general assets (e.g., 3108 and 3110) which define each general asset. After the optimal asset allocation for each sub-general asset has been determined (e.g., an optimal amount of a particular resource to consume/produce), asset allocation may be performed on each sub-general asset to determine optimal asset allocation for subplants 3116 which define/make up sub-general assets. In this way, block diagram 3100 represents a series of asset allocation problems. Specifically, block diagram 3100 represents seven asset allocation/optimization problems. The first asset allocation problem is performed at a top/non-granular level to determine asset allocation for general assets 3104 and 3106 (e.g., resource consumption and production), the second and third asset allocation problems are performed at a more granular level to determine asset allocation (e.g., resource consumption and production) for each of sub-general assets 3108-3114, and the fourth, fifth, sixth, and seventh asset allocation problems are performed at a most granular level to determine asset allocation (e.g., resource consumption and production) for each of subplants 3116. The number of asset allocation problems which asset allocator 402 performs is determined by the following equation:

asset allocation problems=# general assets+# sub general assets+1 according to some embodiments.

It should be noted that any number of general assets may be defined, and any number of sub-general assets may be defined. Additionally, further general assets may be defined within sub-general assets, further general assets may be defined within these general assets, etc.

While the hierarchical asset allocation method disclosed herein increases a number of asset allocation problems which must be optimized, each of the asset allocation problems are simpler (e.g., less resource inputs/outputs, etc.) when compared to an asset allocation problem which seeks to determine optimal asset allocation for all of the subplants without hierarchically grouping the subplants. In this way, the hierarchical asset allocation approach provides a non-granular approach to determining asset allocation by first determining overall asset allocation for general assets, and then progressively determining low-level asset allocation for the subplants. This approach reduces the complexity of the optimization processes and reduces the amount of processing time and processing resources required to complete the optimizations.

Power Grid General Assets

Figure 32:
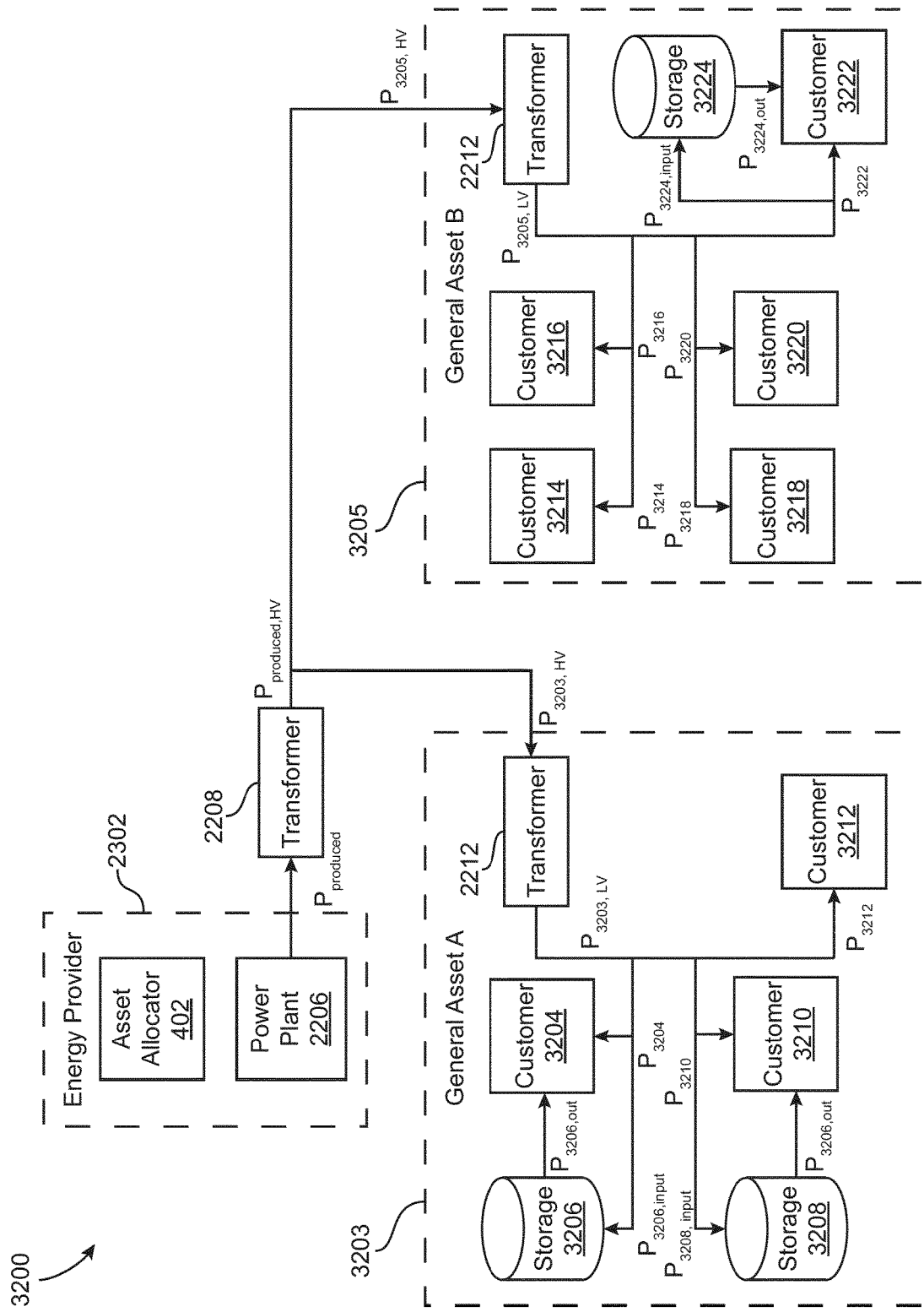
FIG. 32 is a block diagram of a resource diagram for a power grid, shown to include general assets, according to some embodiments.

Referring now to FIG. 32, a resource diagram 3200 of a power grid is shown, according to some embodiments. Resource diagram 3200 is shown to include energy provider 2302, according to some embodiments. In some embodiments, resource diagram 3200 includes general asset 3203 and general asset 3205. General asset 3203 is shown to include step down transformer 2212, customer 3204, storage 2306, storage 3208, customer 3210, and customer 3212, according to some embodiments. In some embodiments, customer 3204 receives power from step down transformer 2212, and stores some of the power received in storage 3206. Storage 3206 may provide customer 3204 with electrical power at a later time, according to some embodiments. In some embodiments, storage 3206 is modeled as a storage device in asset allocation system 2500, asset allocation system 400, and/or asset allocation system 2600. In some embodiments, customer 3204 receives $P_{3204}$ from step down transformer 2212. In some embodiments, step down transformer 2212 receives power at high voltage, $P_{3203,HV}$ and outputs power at a lower voltage, $P_{3203,LV}$. In some embodiments, step down transformer 2212 operates according to the function:

$$P_{3203,LV} = \eta_{step\ down} * P_{3203,HV}$$

In some embodiments, step down transformer 2212 provides the stepped down power to the various consumers within general asset 3203. For example, customer 3204 is shown receiving $P_{3204}$, customer 3210 is shown receiving $P_{3210}$, and customer 3212 is shown receiving $P_{3212}$, according to some embodiments. In some embodiments, a relationship between power provided by step down transformer 2212 and power consumed by the various assets of general asset 3203 can be expressed as:

$$P_{3203,LV} = P_{3204} + P_{3206,input} + P_{3210} + P_{3208,input} + P_{3212}$$

where $P_{3206,input}$ is power input to storage 3206, $P_{3208,input}$ is power input to storage 3208, $P_{3204}$ is power consumed directly by customer 3204, $P_{3210}$ is power consumed directly by customer 3210, and $P_{3212}$ is power consumed directly by customer 3212.

Likewise, a total amount of power consumed by each customer can be expressed by the following equations:

$$P_{3204,total} = P_{3206,out} + P_{3204}$$

$$P_{3210,total} = P_{3206,out} + P_{3210}$$

$$P_{3212,total} = P_{3212}$$

where $P_{3204,total}$ is a total amount of power consumed by customer 3204, $P_{3210,total}$ is a total amount of power consumed by customer 3210, and $P_{3212,total}$ is a total amount of power consumed by customer 3212 at a particular moment in time, according to some embodiments. Rearranging the above equations, yields the following equations:

$$P_{3204,total} - P_{3206,out} = P_{3204}$$

$$P_{3210,total} - P_{3206,out} = P_{3210}$$

$$P_{3212,total} = P_{3212}$$

according to some embodiments. From the above equations it can be seen that for customers which have an energy storage device (e.g., customers 3204 and 3210), the amount of power which must be provided by step down transformer 2212 and consequently by power plant 2206 is reduced by the amount provided by the energy storage device. This is especially advantageous at high demand times of day, when many customers are demanding large amounts of energy, according to some embodiments. In some embodiments, if the customers have an energy storage device, this allows power plant 2206 to have a more constant power output, since the customers can draw power from their energy storage devices at peak demand times of day.

Advantageously, this can reduce costs associated with purchasing energy, since electricity purchased at peak demand times typically include a demand charge, according to some embodiments.

Referring still to FIG. 32, similar equations can be determined for general asset 3205, according to some embodiments. In some embodiments, the equations determined based on the assets of general asset 3205 have the following form:

$$P_{3205,LV} = \eta_{step\ down} * P_{3205,HV}$$

$$P_{3205,LV} = P_{3214} + P_{3216} + P_{3218} + P_{3220} + P_{3224,input} + P_{3222}$$

$$P_{3214,total} = P_{3214}$$

$$P_{3216,total} = P_{3216}$$

$$P_{3218,total} = P_{3218}$$

$$P_{3220,total} = P_{3220}$$

$$P_{3220,total} = P_{3220} + P_{3224,out}$$

Referring still to FIG. 32, each of general assets 3203 and 3205 may be treated by asset allocator 402 treated as subplants, consuming some amount of resources (e.g., power) and producing another type of resource (e.g., thermal energy). In some embodiments, each of general assets 3203 and 3205 are treated as general assets which consume some amount of resource and include internal storage (e.g., storage devices 3224).

Energy Provider Controller

Figure 33:
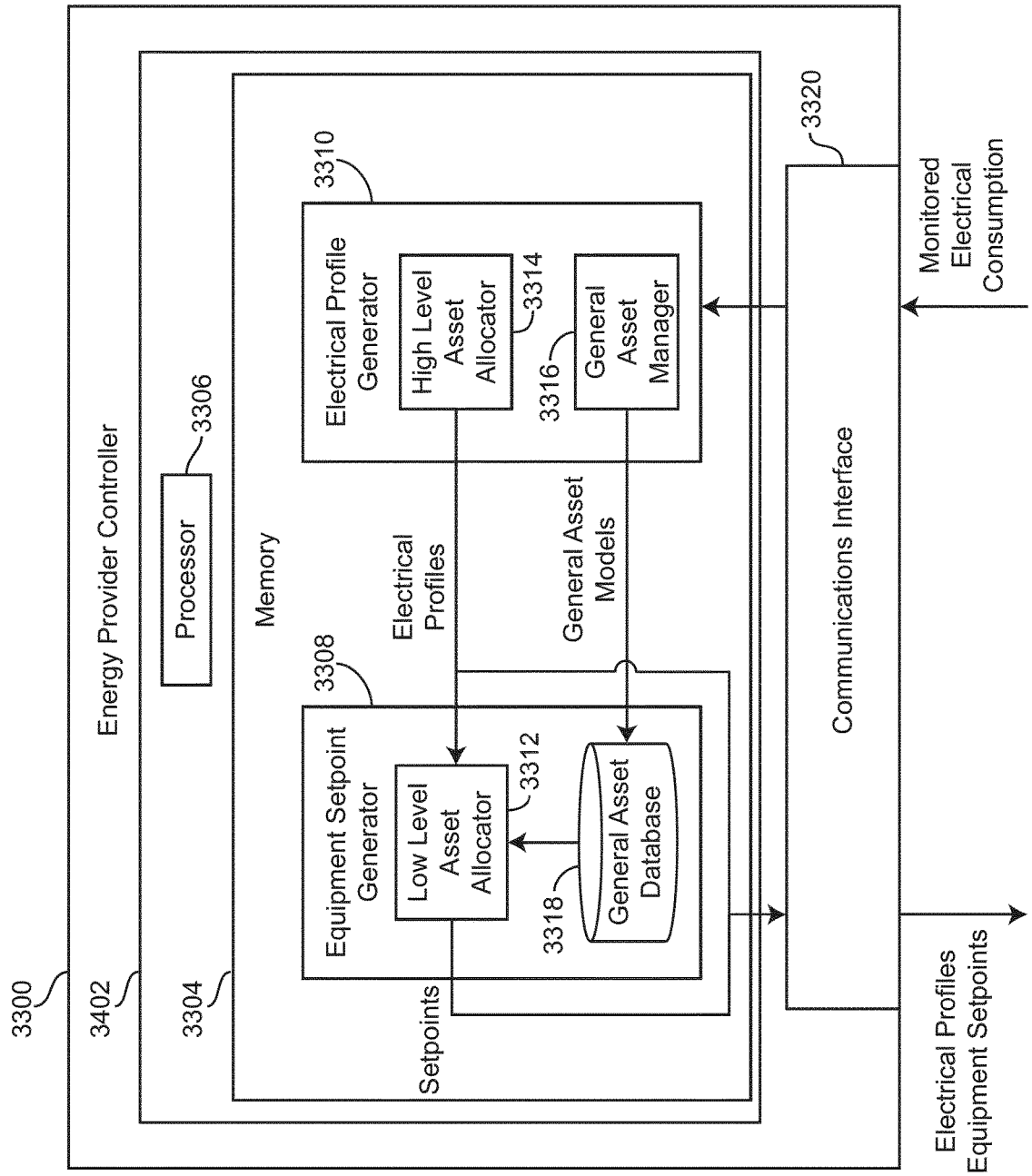
FIG. 33 is a block diagram of an energy provider controller, according to some embodiments.

Referring now to FIG. 33, an energy provider controller 3300 is shown, according to some embodiments. In some embodiments, energy provider controller 3300 is configured to receive monitored electrical consumption and determine an electrical profile for one or more general assets (e.g., zones, neighborhoods, blocks, regions, etc.) to follow. In some embodiments, energy provider controller 3300 determines equipment setpoints for the various equipment, devices, storage devices, subplants, sinks, etc., of the one or more general assets (e.g., zones, neighborhoods, blocks, regions, etc.) and/or various customers (e.g., houses, buildings, campuses, factories, etc.).

In some embodiments, energy provider controller 3300 is integrated within a single computer (e.g., one server, one housing, etc.). In various other exemplary embodiments, energy provider controller 3300 can be distributed across multiple servers or computers (e.g., that can exist in distributed locations). In another exemplary embodiment, energy provider controller 3300 may be integrated with an energy provider manager that manages multiple power grids/systems.

Energy provider controller 3300 is shown to include a communications interface 3320 and a processing circuit 3302. Communications interface 3320 may include wired or wireless interfaces (e.g., jacks, antennas, transmitters, receivers, transceivers, wire terminals, etc.) for conducting data communications with various systems, devices, or networks. For example, communications interface 3320 may include an Ethernet card and port for sending and receiving data via an Ethernet-based communications network and/or a WiFi transceiver for communicating via a wireless communications network. Communications interface 3320 may be configured to communicate via local area networks or wide area networks (e.g., the Internet, a building WAN, etc.) and may use a variety of communications protocols (e.g., BACnet, IP, LON, etc.).

Communications interface 3320 may be a network interface configured to facilitate electronic data communications between energy provider controller 3300 and various external systems or devices (e.g., transformer 2212, energy consumption data collection devices, etc.). For example, energy provider controller 3300 may receive information from transformers 2212 indicating energy consumption of general asset 3203 and/or general asset 3205 (e.g., electrical energy consumption, etc.). Communications interface 3320 may receive inputs from transformers 2212, customers (e.g., customers 3204, 3210, 3214, 3216, 3218, 3220, etc.) and may provide energy profiles to general asset 3203 and 3205 and/or operating parameters to various customers (e.g., customers 3204, 3210, 3214, 3216, 3218, 3220, etc.). The operating parameters may cause subplants or energy storage devices of general asset 3203 and/or general asset 3205 to activate, deactivate, or adjust a setpoint for various devices thereof.

Still referring to FIG. 33, processing circuit 3302 is shown to include a processor 3306 and memory 3304. Processor 3306 may be a general purpose or specific purpose processor, an application specific integrated circuit (ASIC), one or more field programmable gate arrays (FPGAs), a group of processing components, or other suitable processing components. Processor 3306 may be configured to execute computer code or instructions stored in memory 3304 or received from other computer readable media (e.g., CDROM, network storage, a remote server, etc.).

Memory 3304 may include one or more devices (e.g., memory units, memory devices, storage devices, etc.) for storing data and/or computer code for completing and/or facilitating the various processes described in the present disclosure. Memory 3304 may include random access memory (RAM), read-only memory (ROM), hard drive storage, temporary storage, non-volatile memory, flash memory, optical memory, or any other suitable memory for storing software objects and/or computer instructions. Memory 3304 may include database components, object code components, script components, or any other type of information structure for supporting the various activities and information structures described in the present disclosure. Memory 3304 may be communicably connected to processor 3306 via processing circuit 3302 and may include computer code for executing (e.g., by processor 3306) one or more processes described herein.

Memory 3304 is shown to include electrical profile generator 3310 and equipment setpoint generator 3308, according to some embodiments. In some embodiments, electrical profile generator 3310 is configured to receive, via communications interface 3320, monitored electrical consumption of one or more monitored areas (e.g., a zone, a neighborhood, a block, etc.). Electrical profile generator 3310 is configured to determine electrical profiles for the one or more monitored areas, according to some embodiments. In some embodiments, electrical profile generator 3310 receives a resource diagram (e.g., a granular resource diagram) which indicates various sinks, sources, subplants, storage devices, etc., of the one or more monitored areas. In some embodiments, electrical profile generator 3310 includes general asset manager 3316 configured to define one or more general assets. In some embodiments, the one or more general assets are general assets for which an electrical profile is to be generated. In some embodiments, the one or more general assets are neighborhoods, blocks, towns, cities, regions, etc. In some embodiments, the one or more general assets are or are similar to general asset 3203 and general 3404, consuming some amount of resource and having internal storage.

In some embodiments, general asset manager 3316 defines one or more general assets and determines models of the one or more general assets. In some embodiments, general asset manager 3316 uses any of the methods described above in greater detail with reference to FIGS. 28A-30 to define the one or more general assets and determine models. In some embodiments, general asset manager 3316 uses historical information to determine an empirical model of the one or more general assets. In some embodiments, general asset manager 3316 provides the one or more general assets and associated models to non-granular level asset allocator 3314 and/or equipment setpoint generator 3308 for use in determining electrical profiles and/or equipment setpoints. In some embodiments, general asset manager 3316 provides non-granular level asset allocator 3314 and/or equipment setpoint generator 3308 with information regarding the assets which define the one or more general assets (e.g., storage devices, sinks, sources, subplants, etc.) and the relationships between the assets. In some embodiments, non-granular level asset allocator 3314 is configured to determine an electrical profile by performing asset allocation on the general assets (e.g., the non-granular resource diagram).

In some embodiments, non-granular level asset allocator 3314 is configured to determine electrical profiles by performing asset allocation on the general assets subject to one or more constraints. In some embodiments, the one or more constraints ensure that building temperature of the customer does not exceed a predetermined maximum threshold value and/or go below a predetermined minimum threshold value. In some embodiments, non-granular level asset allocator 3314 uses $f_{customer}$ and $f_{thermal}$ as described in greater detail above with reference to FIG. 23. In some embodiments, for example, electrical profile generator 3310 includes models of one or more customers relating an amount of energy consumed ($E_{consumed}$) to an amount of heating/cooling provided to the customer ($Q_{HVAC}$). In some embodiments, electrical profile generator 3310 includes models ($f_{thermal}$) of one or more customers relating the amount of heating/cooling provided to the customer ($Q_{HVAC}$) and outdoor air temperature ($T_{OA}$) to an indoor air temperature ($T_{zone}$). In some embodiments, for example, customers may specify a minimum acceptable value of $T_{OA}$ and a maximum acceptable value of $T_{OA}$. In some embodiments, electrical profile generator 3310 is configured to determine a range of $E_{consumed}$ which produce the minimum acceptable value of $T_{OA}$ and the maximum acceptable value of $T_{OA}$. In some embodiments, the ranges of $E_{consumed}$ for one or more customers are applied as constraints such that non-granular level asset allocator 3314 does not determine an electrical profile which results in $T_{OA}$ exceeding the maximum allowable value or going below the minimum allowable value.

Referring still to FIG. 33, electrical profile generator 3310 is shown to include non-granular level asset allocator 3314, according to some embodiments. In some embodiments, electrical profile generator 3310 is configured to receive a non-granular resource diagram from general asset manager 3316 and determine an electrical profile. In some embodiments, non-granular level asset allocator 3314 is asset allocator 402 and is configured to perform asset allocation for asset allocation system 400 for the non-granular resource diagram as determined by and received from general asset manager 3316. In some embodiments, non-granular level asset allocator 3314 determines electrical profiles for the one or more monitored areas which minimizes a cost function over a future time period. In some embodiments, the asset allocation is subject to various constraints including but not limited to, demand constraints, resource production constraints, resource shipping constraints, general asset model constraints, sink constraints, etc. In some embodiments, the electrical profile facilitates knowing when to precool/preheat various customers of the general asset to prepare for power loss at certain times rather than commanding power down without warning.

In some embodiments, general asset manager 3316 provides general asset models and granular/non-granular resource diagrams to general asset database 3318 of equipment setpoint generator 3308. In some embodiments, general asset database 3318 stores the general asset models and the granular/non-granular resource diagrams and provides the general asset models and the granular/non-granular resource diagrams to equipment level asset allocator 3312 for determining equipment setpoints of the various customers which define the one or more general assets.

In some embodiments, equipment setpoint generator 3308 is configured to receive the one or more electrical profiles for the one or more monitored areas, as well as the granular and non-granular resource diagrams. In some embodiments, equipment setpoint generator 3308 is configured to determine equipment setpoints based on the information received from electrical profile generator 3310. In some embodiments, equipment setpoint generator 3308 performs asset allocation on each general assets at the granular level to determine optimal setpoints for the equipment of the various customers/assets which define the one or more general assets. For example, equipment level asset allocator 3312 may determine various temperature setpoints for the one or more customers/equipment which define the one or more general assets. In some embodiments, the temperature setpoints cause the one or more general assets to operate to meet the determined electrical profile. In some embodiments, equipment setpoint generator 3308 performs asset allocation with the electrical profiles considered as a constraint (e.g., an overall electrical consumption of each general asset which must be met) to determine various building/equipment/customer setpoints to optimally achieve the electrical profile. In some embodiments, equipment setpoint generator 3308 is performed by a local controller at each residential/customer/equipment level. For example, a local controller at a neighborhood level (e.g., at transformer 2212) may receive the electrical profiles and determine equipment setpoints (e.g., thermostat temperature setpoints, stationary storage device charging/discharging setpoints) for each customer.

In some embodiments, the setpoints are provided to the equipment/customers via communications interface 3320. In some embodiments, the setpoints are provided wirelessly (e.g., through the Internet) to thermostats of each customer. In some embodiments, the setpoints of the one or more customers are automatically adjusted according to the setpoints determined by equipment setpoint generator 3308. In some embodiments, the setpoints are only automatically adjusted if the one or more customers have voluntarily opted for automatic setpoint adjustment.

Advantageously, energy provider controller 3300 using the techniques and methods described throughout the present disclosure provides energy providers a way to optimize energy consumption of various zones, neighborhoods, cities, regions, etc. In some embodiments, the determined electrical profiles and/or the determined equipment/customer setpoints facilitates knowing when to preheat and/or precool to prepare for power loss at certain times (e.g., certain times of day, certain times of year, etc.) rather than commanding power down without warning. Additionally, the resource diagrams provided to energy provider controller 3300 can be adjusted to determine cost savings for each customer if each customer purchases a stationary energy storage device and/or if the customer opts to allow the energy provider to automatically adjust their setpoints, according to some embodiments. In some embodiments, the resource diagrams are modified to include a stationary storage device for each customer, and a difference between an amount of costs associated with purchasing electricity without the stationary storage device and with the stationary storage device is determined for each customer. In some embodiments, the energy provider can notify (e.g., by mail, through a smart-thermostat) the customers regarding costs savings associated with purchasing a stationary energy storage device. In some embodiments, the energy provider can also notify the customers regarding an amount of time required for cost savings associated with the purchased stationary energy storage device to offset an amount to purchase the stationary energy storage device.

In some embodiments, if one or more customers have not opted for automatic setpoint adjustment, the one or more customers are treated as sinks which consume some amount of uncontrollable electricity. In some embodiments, the amount of electricity which the one or more customers consume which cannot be adjusted is determined based on historical information. In some embodiments, energy provider controller 3300 or more specifically, equipment setpoint generator 3404 can determine energy consumption cost for each customer if the customer's setpoints are controllable and if the customer's setpoints are non-controllable. In some embodiments, the energy provide can determine a cost savings based on the difference between these two energy consumption costs and provide the one or more customers with a notification (e.g., via mail, via a smart-thermostat, etc.) regarding an amount of cost savings (e.g., daily cost savings, weekly cost savings, monthly cost savings, etc.) the customer can achieve if the customer opts to allow the energy provider to automatically adjust the customer's equipment setpoints.

Process for Determining Electrical Profiles and Equipment Setpoints

Figure 34:
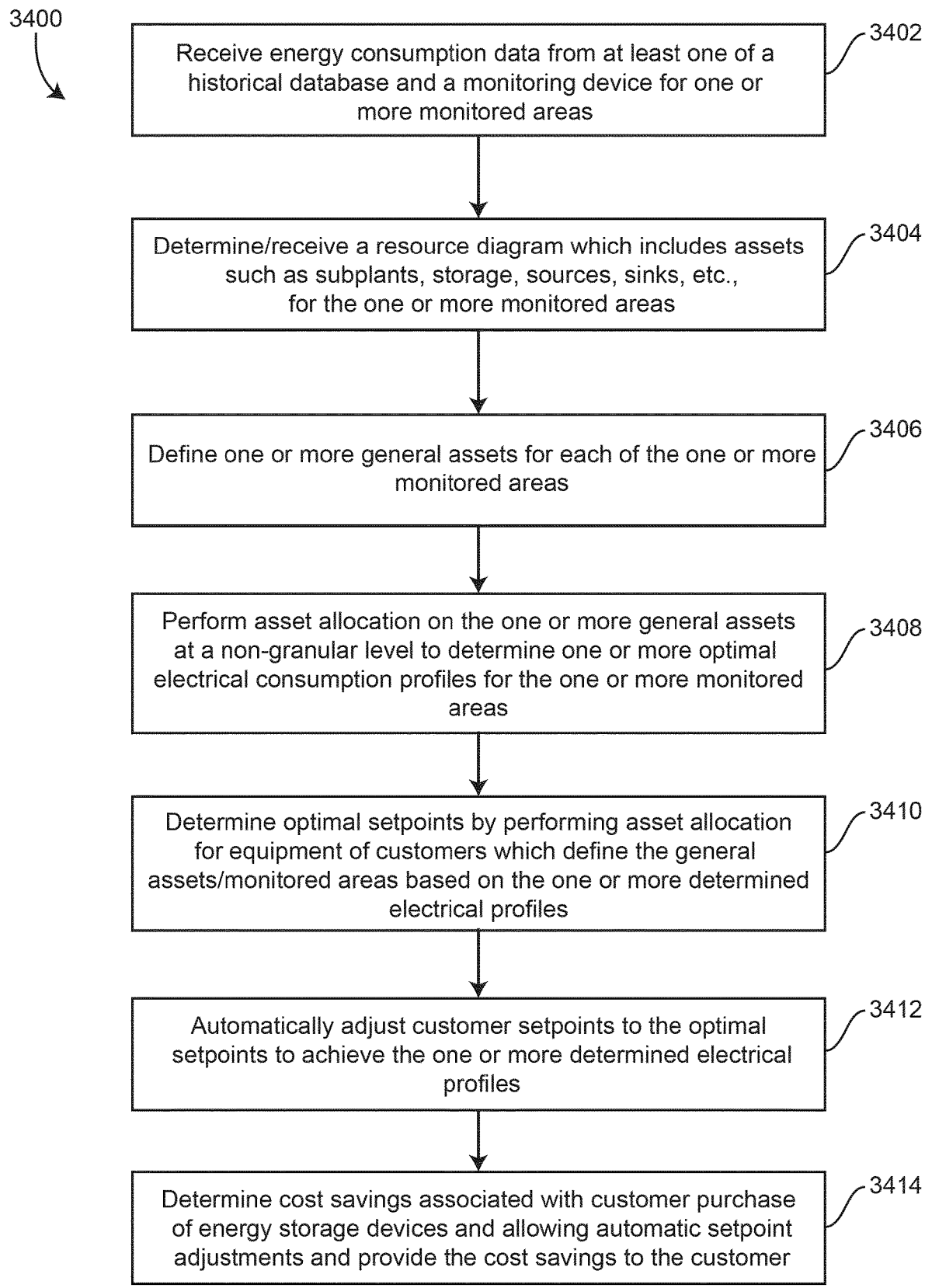
FIG. 34 is a flow diagram of a process for determining one or more customer setpoints and electrical profiles, according to some embodiments.

Referring now to FIG. 34, a process 3400 for determining optimal electrical profiles and equipment setpoint is shown, according to some embodiments. In some embodiments, process 3400 is used to determine electrical profiles which minimize electrical consumption of an area (e.g., a zone, a neighborhood, a block, etc.) or a group of customers. In some embodiments, process 3400 is used to determine automatic setpoint adjustments of various building equipment or thermostat setpoints of one or more customers. In some embodiments, process 3400 is implemented by energy provider controller 3300.

Referring still to FIG. 34, process 3400 is shown to include receiving energy consumption data from at least one of a historical database and a monitoring device for one or more monitored areas (or groups of customers, step 3402), according to some embodiments. In some embodiments, step 3402 is facilitated by a monitoring device at one or more transformers (e.g., transformer(s) 2212). For example, a device which monitors electrical consumption for a step-down transformer which serves a certain area (e.g., group of customers) may transmit electrical consumption information to a controller (e.g., energy provider controller 3300), according to some embodiments. In some embodiments, the information received from the one or more monitoring devices is transmitted to a remote database, and stored/used to determine an archetypal/seasonalized energy consumption of the monitored area(s). In some embodiments, the energy consumption information is received at a more granular level, directly from one or more customers. For example, some customers may have a smart thermostat configured to communicably connect with energy provider controller 3300 and provide energy provider controller 3300 with information regarding electrical usage of the customer over a time period (e.g., a day, a week, a month, etc.). In some embodiments, monitoring devices for various transformers/distributers which serve multiple zones/collections of customers transmit information regarding electrical consumption for the multiple zones/collections of customers to energy provider controller 3300. Additionally, the amount of energy consumed from a particular power plant is also known and provided to energy provider controller 3300, according to some embodiments. In this way, energy provider controller 3300 may receive electrical energy consumption at various layers, ranging from an amount of energy consumption of a particular customer to energy consumed from an entire power plant. In some embodiments, any of the energy consumption data is received by energy provider controller 3300.

Process 3400 includes determining/receiving a resource diagram which includes assets such as subplants, storage devices, sources, sinks, etc., (step 3404), according to some embodiments. In some embodiments, the resource diagram is determined based on the relationships between the various assets. In some embodiments, the resource diagram is determined based on information received from customers. For example, in some embodiments, certain customers have one or more stationary storage devices. If the customers have a smart thermostat, the smart thermostat may provide information regarding various storage devices or subplants which each customer has, according to some embodiments. In some embodiments, if the building system of a customer is unknown, the customer is treated as a general asset as described in greater detail above with reference to FIGS. 28A-32. In some embodiments, various collections of customers/consumers are treated as general assets. In some embodiments, the resource diagram is a comprehensive resource diagram of the power grid, including power plants as subplants, customers and regions of customers as general assets, etc.

Process 3400 includes defining one or more general assets for each of the one or more monitored areas (step 3406), according to some embodiments. In some embodiments, the one or more general assets are determined based on a common energy source. For example, if customers of a neighborhood receive energy from a local step-down transformer, the entire neighborhood/collection of customers which receive energy from the local step down controller may be defined as a general asset. In some embodiments, the one or more general assets are defined arbitrarily. In some embodiments, the one or more general assets consume some amount of resources (e.g., electricity) and include internal storage (e.g., some customers may have stationary storage devices which charge/discharge). In some embodiments, the one or more general assets are defined by general asset manager 3316.

Process 3400 includes performing asset allocation on the one or more general assets at a non-granular level to determine one or more optimal electrical consumption profiles for the one or more monitored areas/general assets (step 3408), according to some embodiments. In some embodiments, the one or more monitored areas/general assets are used to determine a non-granular resource diagram and asset allocation is performed for a future time period on the non-granular resource diagram without taking into account assets within the general assets. In some embodiments, the asset allocation is performed by energy provider controller 3300, or more specifically, non-granular level asset allocator 3314. In some embodiments, the electrical profiles indicate an amount of resource (e.g., electricity) which the general assets should consume over a time period to minimize cost associated with buying electricity from the consumer's perspective or producing electricity from the energy provider's perspective.

Process 3400 includes determining optimal setpoints for customer equipment which define the general assets/monitored areas based on the one or more determined electrical profiles by performing asset allocation (step 3410), according to some embodiments. In some embodiments, step 3410 is performed by equipment level asset allocator 3312. In some embodiments, equipment level asset allocator 3312 uses the electrical profiles as determined in step 3410 as constraints (e.g., electrical consumption of the collection of customers which must be met) to determine specific setpoints of customer thermostats and/or building equipment to satisfy the electrical profile at each time across a time period.

In some embodiments, step 3410 includes performing asset allocation on each of the general assets to determine a specific amount of resource which each customer should consume, or charge in stationary storage devices and discharge at a later time to satisfy the electrical profile. In some embodiments, step 3410 is performed on each general asset as defined in step 3406.

Step 3408-3510 can include defining an objective function and minimizing or optimizing the objective function to determine optimal setpoints or electrical consumption profiles for the one or more monitored areas, according to some embodiments. In some embodiments, the objective function is the objective function j as described in greater detail below with reference to FIGS. 35-36. The objective function J may include a term that indicates a cost of raw resource consumption of an energy provider, a term that indicates a cost of incentivizing buildings, consumers, customers, general assets, etc., to allow the energy provider to change or recommend control decisions for their campuses or building equipment, and a term that indicates cost savings or revenue generated from adjusting control decisions for the general assets, the customers, or the consumers of the refined resources. The objective function can be minimized or optimized subject to one or more constraints. The one or more constraints may include a constraint that relates an incentive level, predicted weather, and time to a predicted energy consumption of each general asset, or each consumer of the monitored area. The one or more constraints may also include a resource balance constraint that defines how various assets of the monitored areas interact or are interrelated with each other. The one or more constraints may also include a resource conversion constraint at the energy provider level that indicate an amount of time and an amount of input or raw resource required to produce an output or refined resource.

Process 3400 includes automatically adjusting customer setpoints to the optimal setpoints to achieve the one or more determined electrical profiles (step 3412), according to some embodiments. In some embodiments, the setpoints (e.g., equipment control variables, thermostat setpoints, etc.) are adjusted automatically only if the customer has opted in for automatic setpoint adjustment. In some embodiments, the customer setpoints are automatically adjusted by energy provider controller 3300.

Process 3400 includes determining cost savings associated with customer purchase of energy storage devices and allowing automatic setpoint adjustments and providing the cost savings to the customer (step 3414), according to some embodiments. In some embodiment, step 3414 includes repeating steps 3502-3512 assuming all customers have a stationary storage device, and determining a cost savings based on a difference between costs associated with each customer having a stationary storage device and each customer not having a stationary storage device. In some embodiments, the cost savings indicate an amount of money saved over a time period if the customer had a stationary storage device. In some embodiments, the cost savings are provided to the customers, indicating an amount of cost savings purchasing a stationary storage device would yield. In some embodiments, an amount of time required for the cost savings to offset a cost associated with purchasing a stationary storage device is also determined and the amount of time for the stationary storage device to offset purchase costs (e.g., to pay for itself) are provided to the customer. In some embodiments, the information regarding cost savings are provided to the customer as a notification on a smart thermostat. In some embodiments, steps 3502-3512 are repeated assuming each customer has opted for automatic setpoint adjustment, and assuming that each customer has opted for automatic setpoint adjustment in addition to having a stationary storage device. In some embodiments, an amount of cost savings associated with allowing the energy provider to automatically adjust the customer setpoints and an amount of cost savings associated with allowing the energy provider to automatically adjust the customer setpoints and having a stationary storage device are determined, and provided to the customers. In some embodiments, the cost savings information are provided to the customers through a smart thermostat.

Resource Diagrams

Figure 35:
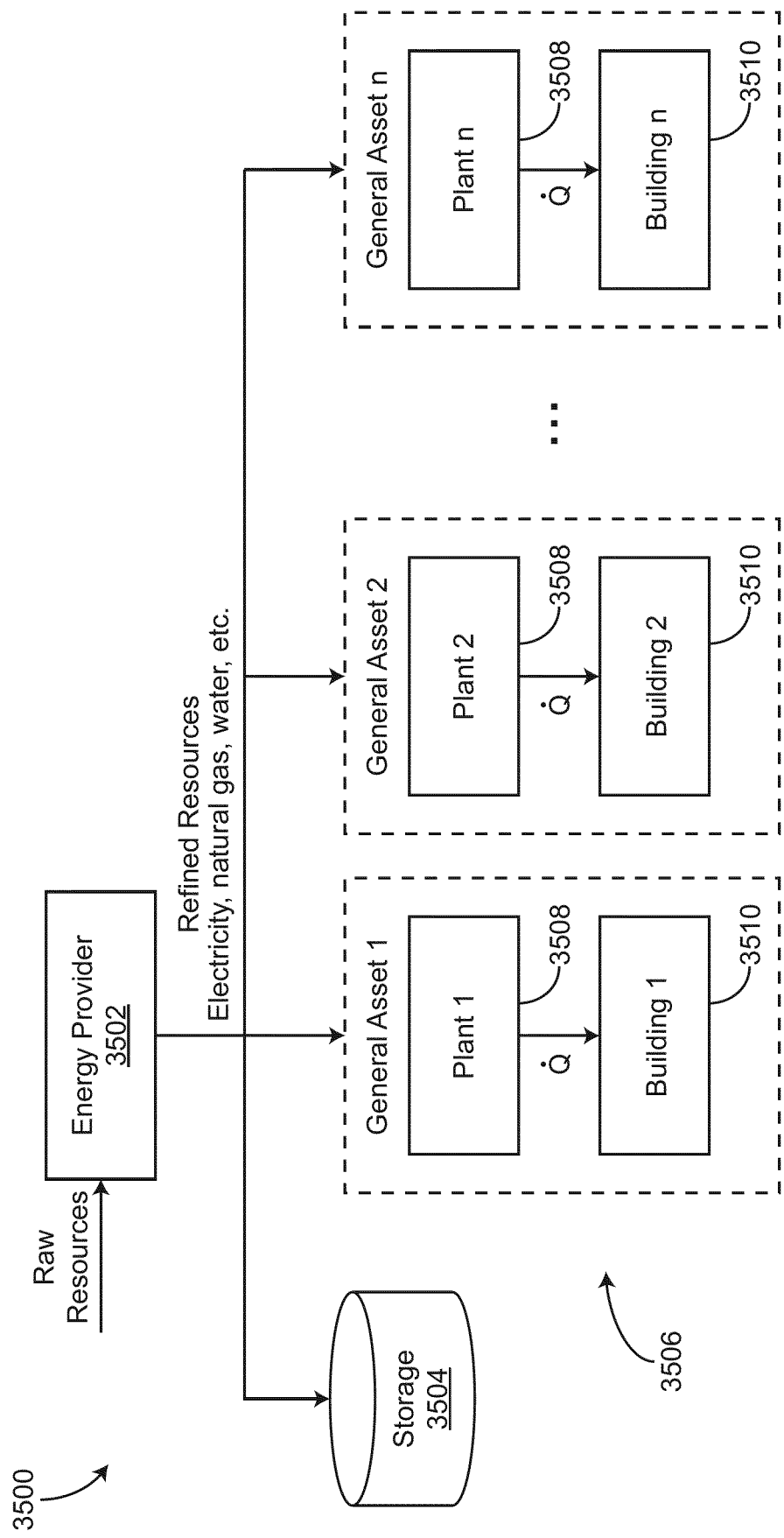
FIG. 35 is a block diagram of a resource diagram including an energy provider, storage, and multiple general assets, according to some embodiments.

Referring now to FIG. 35, a resource diagram 3500 illustrating a modeling framework that can be used by energy provider 3502 is shown, according to an exemplary embodiment. Resource diagram 3500 may represent any type of system in which an energy provider 3502 provides refined resources (e.g., electricity, natural gas, water, etc.) to various consumers of the refined resources, shown as general assets 3506. For example, resource diagram 3500 may represent a power transmission system, a power grid, a natural gas pipeline network, a water pipeline network, or any other type of resource distribution system. The amounts of raw resources consumed by energy provider 3502 at each timestep and/or the amounts of refined resources produced by energy provider 3502 and/or delivered to general assets 3506 at each timestep may be optimized by asset allocator 402, high level asset allocator 3314, low level asset allocator 3312, energy provider controller 3300, or any other systems or devices configured to perform the various optimizations described above. For example, energy provider controller 3300 can be configured to determine resource consumption profiles for each of general assets 3506 as well as a resource generation profile for energy provider 3502.

As shown in resource diagram 3500, energy provider 3502 can be configured to receive raw resources (e.g., unrefined coal, water, materials, etc.) from one or more raw resource providers. Energy provider 3502 may include power plant 2206 (e.g., a coal power plant, a nuclear power plant), raw resource storage 2204, energy provider 2302, or any other type of energy provider described above. Energy provider 3500 can be configured to convert the raw resources into refined resources and provide the refined resources to general assets 3506. Energy provider 3502 may function as a subplant and can receive raw resources and output refined resources (e.g., electricity, natural gas, etc.) to one or more consumers of the refined resources (e.g., sinks, other subplants, or storage). Energy provider 3502 can be modeled by energy provider controller 3300 as a subplant that consumes raw resources as an input to produce refined resources as its output.

Resource diagram 3500 is shown to include storage 3504 and multiple general assets 3506. General assets 3506 may be groups of systems, devices, or other components that are grouped into a general asset to facilitate modeling each group of components. For example, each general asset 3506 may include a plant 3508 and a building 3510. In some embodiments, energy provider controller 3300 is configured to generate general assets 3506 using any of the techniques described in greater detail above with reference to FIGS. 28A-31. Each general asset 3506 may be a consumer or a customer that receives the refined resources from energy provider 3502 (e.g., through an electric power grid, a piping system, a natural gas delivery system, etc., or any other resource delivery system or structure). In some embodiments, one or more general assets 3506 includes multiple plants 3508, buildings 3510, or customers.

Each of plants 3508 can be configured to use the refined resources from energy provider 3502 to provide heating or cooling for a corresponding building 3510. For example, plants 3508 may represent or include building equipment, HVAC equipment, etc., that operate using the refined resources provided by energy provider 3502 to provide heating or cooling for the corresponding building 3510.

Resource diagram 3500 is shown to include one or more storage devices 3504. Storage device 3504 may be modeled by energy provider controller 3300 as storage 430 as described in greater detail above with reference to FIG. 25. For example, energy provider controller 3300 may be configured to determine times to charge or discharge refined resources from storage 3504 to general assets 3506.

Energy provider controller 3300 can be configured to use any of the techniques described herein (e.g., generating a cost function, optimizing the cost function across a plurality of steps of a time horizon subject to one or more constraints, etc.) to determine control decisions, setpoints, daily energy consumption profiles, etc., for any of the consumers of energy provider 3502. For example, energy provider controller 3300 can provide setpoints to various equipment of plants 3508 so that plants 3508 operate to provide heating or cooling for buildings 3510 as determined by energy provider controller 3300. Energy provider controller 3300 can also determine an amount of energy or cost savings associated with operating plants 3508 according to a specific setpoint and may provide recommendations or notifications regarding potential cost savings to the various consumers of energy provider 3502. In some embodiments, energy provider controller 3300 determines a daily energy consumption profile for the various plants 3508 or consumers of energy provider 3502 and provides the daily energy consumption profile as a recommendation to the consumers or customers.

Figure 36:
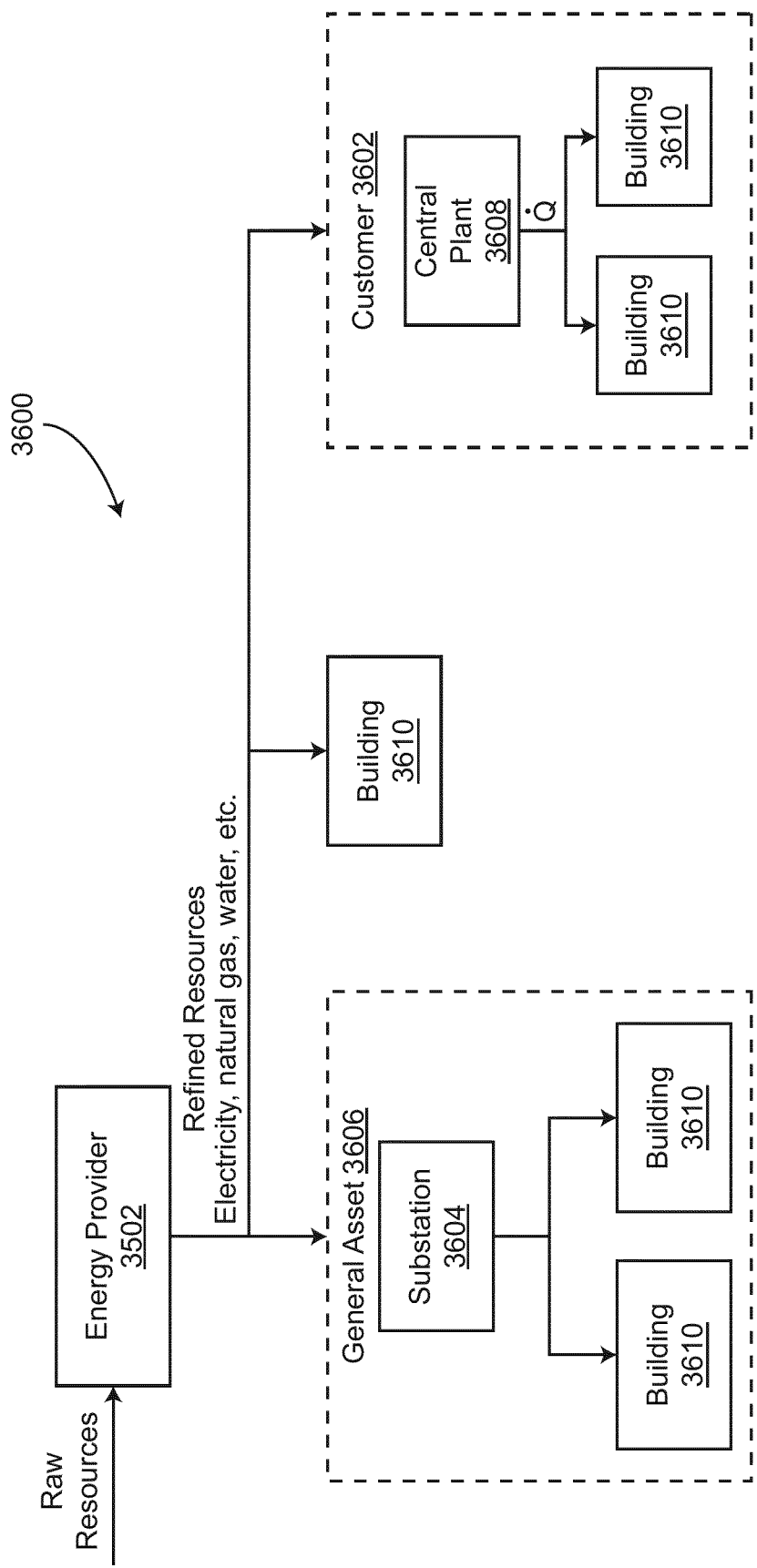
FIG. 36 is a block diagram of a resource diagram including an energy provider that provides refined resources to a general asset, a building, and a customer that includes multiple buildings, according to some embodiments.

Referring particularly to FIG. 36, another resource diagram 3600 is shown. Resource diagram 3600 may be similar to resource diagram 3500. Resource diagram 3600 includes energy provider 3502, a general asset 3606, a building 3510, and a customer 3602. As shown in FIG. 36, energy provider 3502 may provide refined resources directly to building 3610 or directly to general asset 3606 or customer 3602 (e.g., to a central plant 3608 of customer 3602). Each of general asset 3606, building 3610, and customer 3602 may consume electricity, natural gas, or water and can be modeled by energy provider controller 3300 as a sink for various refined resources.

Customer 3602 can include central plant 3608 which may operate to provide heating or cooling to one or more buildings 3510. For example, customer 3602 may be a building campus including multiple buildings 3610 with a central plant or multiple plants that operate to provide heating or cooling to the multiple buildings 3610.

General asset 3606 can be a consumer of the refined resources (e.g., electricity, natural gas, water, etc.) and may include a substation 3604 as well as buildings 3610 that receive resources from substation 3604. Substation 3604 can be configured to store or discharge the refined resources to various buildings 3610 as required by the buildings 3610 or to various customers 3602 or lower level general assets 3606.

Referring again to FIG. 33, energy provider controller 3300 can be configured to define an objective function J for optimizing the distribution of resources as shown in any of the resource diagrams described above (e.g., for resource diagram 3600, resource diagram 3500, resource diagram 3200, block diagram 3100, resource diagram 2800, a resource diagram of system 2600, a resource diagram of power distribution system 2200, etc.). The objective function J can be the same as or similar to the objective function shown and described in greater detail above with reference to FIG. 9.

The objective function J may be defined by energy provider controller 3300 as:

$$J = \Sigma cost_{raw,resources} + \Sigma cost_{incentives} - \Sigma rev_{refined,resources}$$

where J is a total cost over a time horizon (e.g., summed across each timestep of the time horizon), $\Sigma cost_{raw,resources}$ is a total cost of raw resources consumed or purchased by energy provider 3502 (e.g., summed across the time horizon), $\Sigma cost_{incentives}$ is a total cost of incentives provided by energy provider 3502 (e.g., monetary incentives provided to buildings or consumers of the refined resources for participating in various incentive-based demand response programs), and $\Sigma rev_{refined,resources}$ is an amount of revenue gained by energy provider 3502 in exchange for the refined resources provided to general assets (e.g., general assets 3506, general asset 3606, customer 3602) or buildings 3510 or buildings 3610. For example, the revenue term $\Sigma rev_{refined,resources}$ may represent the cost of purchasing the refined resources from energy provider 3502.

In some embodiments, the cost of raw resources consumed or purchased by energy provider 3502, $\Sigma cost_{raw,resources}$, depends on when the raw resources are purchased or consumed. For example, a price of raw resources consumed by energy provider 3502 may change at different times of the month, different time of the year, based on supply and demand, etc. Accordingly, the summation $\Sigma cost_{raw,resources}$ may be a summation of the amounts of each raw resource purchased at each timestep multiplied by the time-varying prices of the raw resources at each timestep. For example, the summation $\Sigma cost_{raw,resources}$ may be:

$$\Sigma cost_{raw,resources} = \Sigma(res_1)(price_1) + \Sigma(res_2)(price_2) + \ldots + \Sigma(res_n)(price_n)$$

where $res_1$ is an amount (e.g., pounds, tons, cubic feet, etc., or any other quantity) of a first resource (e.g., raw coal, nuclear materials, water, etc.) purchased, $price_1$ is a price per amount (e.g., $/quantity) of the first resource, $res_2$ is an amount (e.g., pounds, tons, cubic feet, etc., or any other quantity) of a second resource (e.g., raw coal, nuclear materials, water, etc.) purchased, $price_2$ is a price per amount (e.g., $/quantity) of the first resource, etc., and $res_n$ is an amount (e.g., pounds, tons, cubic feet, etc., or any other quantity) of an nth resource (e.g., raw coal, nuclear materials, water, etc.) purchased, and $price_n$ is a price per amount (e.g., $/quantity) of the nth resource. The summation shown above may be for all raw resources purchased by energy provider 3502 across each timestep of a time horizon (e.g., an optimization period).

In some embodiments, energy provider 3502 can control the amounts of each raw resource purchased at each timestep, but cannot control the time-varying prices. Thus, the amounts of raw resources purchased at each timestep may be decision variables in the objective function, whereas the corresponding prices may be provided as inputs to the objective function. The objective function may include a decision variable representing the amount of each raw resource purchased by energy provider 3502 at each timestep of the optimization period.

In some embodiments, the cost of incentives, $\Sigma cost_{incentives}$, depends on the value of the incentives (e.g., dollars) as well as the degree to which the consumers of the refined resources take advantage of the incentives. Each incentive may be associated with a price (e.g., a fixed price or a price per unit of refined resource) that is paid by energy provider 3502 when a consumer of the refined resources takes advantage of the incentive. For example, an incentive associated with a demand response program offered by energy provider 3502 may be based on an amount by which a consumer of the refined resources reduces its demand for the refined resources (e.g., $/kW of electric load reduction, $/liter of water reduction, etc.). In some embodiments, the cost of incentives, $\Sigma cost_{incentives}$, has the form:

$$\Sigma cost_{incentives} = \Sigma b_{customer} cost_{participate} + \Sigma a_{customer} price_{incentive}$$

where $b_{customer}$ is an array of binary values (e.g., 1 or 0) indicating whether particular customers have opted to allow energy provider 3502 to adjust their temperature setpoints, equipment operation, etc., (e.g., to participate in the demand response program), $cost_{participate}$ is a fixed cost amount for a customer that chooses to participate in the demand response program, $a_{customer}$ is an array of non-binary values (e.g., an array of normalized values) indicating to what degree each particular customer uses an incentive provided by energy provider 3502, and $price_{incentive}$ is a cost per amount or degree of incentive use (e.g., $/incentive use) that is multiplied by the degree to which each particular customer uses the incentive provided by energy provider 3502. The array of binary values $b_{customer}$ may include a corresponding binary value (1 or 0) for each customer. A binary value of 1 may indicate that the corresponding customer participates in the demand response program, while a binary value of 0 may indicate that the corresponding customer does not participate in the demand response program. In this way, the cost of incentives $\Sigma cost_{incentives}$ can include both a first amount (i.e., $\Sigma b_{customer} cost_{participate}$) that is based solely on a number of customers that participate in the demand response program, regardless of a degree to which the customers use the incentive, and a second amount (i.e., $\Sigma a_{customer} price_{incentive}$) that is based on a degree to which each customer that participates in the demand response program uses the incentive.

In some embodiments, energy provider 3502 can control the prices associated with the incentives and therefore the prices can be included as decision variables in the objective function. However, whether a given consumer of the refined resources takes advantage of the incentive and the degree to which the incentive is utilized may be controlled by the consumers of the refined resources. Additionally, the prices associated with the incentives may be time-varying. Accordingly, the objective function may include a price decision variable for each incentive offered by energy provider 3502 at each timestep of the optimization period.

In some embodiments, the amount of revenue $\Sigma rev_{refined,resources}$ gained from providing the refined resources to the consumers is an optional term.

Energy provider controller 3300 can minimize or optimize the objective function J to determine resource consumption profiles for the various customers that consume the refined resources or to determine setpoints for equipment of the various customers (e.g., setpoints of plants 3508, central plant 3608, substation 3604, etc.). Energy provider controller 3300 can use the functionality of asset allocator 402 to determine a cost-effective solution or control decisions for the customers/consumers that minimizes the total cost J over the time horizon.

Energy provider controller 3300 may minimize or optimize the objective function subject to one or more constraints. In some embodiments, the constraints include models that predict the expected behavior of the consumers of the refined resources with respect to their demand for the raw resources and their participation in the incentive programs offered by energy provider 3502. For example, each general asset 3506 or general asset 3606 or customer (e.g., customer 3602) may consume an amount of a refined resource (e.g., electricity) as determined according to a corresponding model f. The model f for each general asset 3506 or general asset 3606 or customer (e.g., building 3510, customer 3602, building 3610, etc.) may have the form:

$$E(t)=f(P_{incentive}, \text{weather}, t)$$

where $E(t)$ is an amount of energy or other refined resource predicted to be consumed by each general asset 3506 or general asset 3606 or customer (e.g., building 3510, customer 3602, building 3610, etc.) at a time t (i.e., the demand for the refined resources), $P_{incentive}$ is the price set by energy provider 3502 for participating in an incentive program at time t (e.g., $\text{price}_{incentive}$), weather is predicted weather conditions at time t (e.g., outdoor air temperature, humidity, etc.), t is time, and f is a function that relates $P_{incentive}$, weather, and time t to the amount of energy or other refined resource predicted to be consumed by each general asset 3506 or general asset 3606 or customer at time t. The incentive price $P_{incentive}$ can be set by energy provider 3502 (i.e., by modulating a corresponding decision variable in the objective function) and is expected to impact the demand $E(t)$ for refined resources. For example, a high incentive price $P_{incentive}$ may greatly reward the consumers of the refined resources to participate in the incentive programs and may result in a lower demand for the refined resources, whereas a low incentive price $P_{incentive}$ may only moderately reward the consumers of the refined resources to participate in the incentive programs and may result in a relatively higher demand for the refined resources (i.e., relative to the expected demand associated with the higher reward).

It should be understood that multiple models f, each predicting a consumption of a different refined resource, can be associated with each general asset 3506 or general asset 3606 or each customer (e.g., building 3610, building 3510, customer 3602, etc.). For example, energy provider controller 3300 can use an energy consumption model $f_{1,energy}$ that predicts electrical energy consumption for a first customer, a water consumption model $f_{1,water}$ that predicts water consumption for the first customer, a natural gas consumption model $f_{1,gas}$ that predicts natural gas consumption for the first customer, etc., an energy consumption model $f_{2,energy}$ that predicts electrical energy consumption for a second customer, a water consumption model $f_{2,water}$ that predicts water consumption for the second customer, a natural gas consumption model $f_{2,gas}$ that predicts natural gas consumption for the third customer, etc., and different models for any nth customers to predict consumption of any of a variety of refined resources. More generally, energy provider controller 3300 may use multiple models $f_{customer, refined\ resource}$ which are customer-specific as well as refined resource-specific. These models can be generated, obtained, or calculated, by energy provider controller 3300 or energy provider 3502 based on a historical set of refined resource consumption data for each customer or general asset 3506. Energy provider controller 3300 may be configured to use any of a variety of model generation techniques (e.g., multi-variable regressions, neural networks, etc.) to generate the multiple models for customer-specific and refined resource-specific consumption predictions.

In some embodiments, the constraints include models that predict the degree to which the consumers of the refined resources take advantage of the incentive programs offered by energy provider 3502. For example, the models that predict the degree to which the consumers of the refined resources take advantage of the incentive program may have the form:

$$a_{customer,j}=g_j(\text{price}_{incentive,j})$$

for a jth customer, where $g_j$ is a jth model that predicts a degree or amount $a_{customer,j}$ to which the jth customer or consumer participates in the incentive program, and $\text{price}_{incentive,j}$ is an incentive price provided to the jth customer. In some embodiments, the model $g_j$ is unique for each customer or consumer or general asset (e.g., general asset 3506 or general asset 3606) and may be generated by energy provider 3502 or energy provider controller 3300 based on a historical dataset of $a_{customer,j}$ and $\text{price}_{incentive,j}$ using a model generation technique. In some embodiments, the model $g_j$ is uniform across the various customers, consumers, general assets 3606, or general assets 3506 and can be generated by energy provider 3502 or energy provider controller 3300 based on a historical dataset of $a_{customer,j}$ and $\text{price}_{incentive,j}$ which may be aggregated across the various customers, consumers, or general assets 3506, using a model generation technique. A high value of the incentive price $\text{price}_{incentive}$ may motivate more participation and result in a higher value of $a_{customer,j}$, while a lower value of the incentive price $\text{price}_{incentive}$ may be associated with a lower value of $a_{customer,j}$. Increasing the incentive price $\text{price}_{incentive}$ may impact the total cost J of the objective function by increasing a likelihood of consumer, customer, general asset 3606, or general asset 3506 participation, which may increase $a_{customer}$, and by increasing the cost of incentives (by increasing the $\Sigma a_{customer}\text{price}_{incentive}$ term).

Energy provider controller 3300 may minimize or optimize the objective function subject to a resource balance constraint. The resource balance may indicate inter-relationships of a particular resource diagram that energy provider controller 3300 operates to optimize so that an amount of each refined resource provided by energy provider 3502 and storage 3504 to the consumers (e.g., customers, general assets 3506, etc.) is equal to an amount of each refined resource consumed by the consumers and input to storage 3504. For example, the resource balance constraint may have the form:

$$\Sigma res_{provider}+\Sigma res_{storage,out}=\Sigma res_{consumed}+\Sigma res_{storage,in}$$

where $\Sigma res_{provider}$ is a total amount of a particular refined resource provided or output by energy provider 3502 across a time horizon (e.g., across an optimization time period), $\Sigma res_{storage,out}$ is a total amount of the particular refined resource output from storage 3504 across the time horizon, $\Sigma res_{consumed}$ is the total amount of the particular refined resource consumed by consumers (e.g., general assets 3506, customers, buildings 3510, etc.) over the time horizon, and $\Sigma res_{storage,in}$ is the total amount of the particular refined resource input to storage 3504 over the time horizon.

Energy provider controller 3300 may be configured to use any of the techniques described in greater detail above with reference to FIGS. 28A-31 (e.g., to obtain a resource balance for a resource diagram that includes general assets). Energy provider controller 3300 can also be configured to implement any of the functionality of asset allocator 402 as described in greater detail above with reference to FIG. 4 to generate the resource balance constraint. The resource balance constraint may ensure that a solution determined by energy provider controller 3300 is physically feasible given a layout and interrelationships of the various assets of the resource diagram or the system that energy provider controller 3300 operates to optimize.

Energy provider controller 3300 may also minimize or optimize the objective function subject to one or more constraints that define the relationships between the amount of each raw resource consumed by energy provider 3502 and the amount of each refined resource produced by energy provider 3502. For example, energy provider 3502 can be modeled as one or more "resource converters" or subplants that operate to consume raw resources as an input and output the refined resources for consumption and use by customers 3602, general assets 3506, buildings 3510, etc., or any other refined resource consumers. Energy provider controller 3300 may store and use one or more models that relate an amount of raw resources consumed to an amount of refined resources produced as constraints on the optimization of the objective function.

In some embodiments, the models that relate raw resource consumption to refined resource production are static models that can be used to determine the amount of each raw resource needed to produce a given amount of a refined resource at any instant in time. Static models may be useful for situations in which the conversion of raw resources to refined resources occurs quickly such that the amount of raw resources consumed at a particular time can be assumed to result in a corresponding amount of refined resources produced at that same time. In other embodiments, the models may include dynamic components that account for an amount of time required to produce the refined resources (e.g., production time constraints). Dynamic models may be useful for situations in which there is a significant time delay between the time at which the raw resources are consumed and the time at which the refined resources are produced. For example, the amount of raw resources produced at timestep k can be modeled as resulting in a corresponding amount of refined resources at timestep k+d where d is the time delay representing the amount of time required to convert the raw resources into the refined resources. In some embodiments, a combination of static models and dynamic models are used to represent the production of different refined resources that exhibit different production dynamics.

Production time constraints can be used to translate a predicted demand for refined resources at the consumers at a future time step into a need to produce and ship or transit refined resources to the consumers at an earlier time step. For example, assuming the transit or production time for electrical energy is one week, a predicted demand for electrical energy at the consumers at time step k (i.e., a prediction that the consumers will consume X units of electrical energy at time step k) can be translated into a need to produce and transmit X units of electrical energy at time step $k-1_{week}$. An example of such a production time constraint is shown in the following equation:

$$res_{energy,arrive,k} = res_{energy,produce,k-1week}$$

where $res_{energy,arrive,k}$ is the predicted demand for electrical energy at time step k (i.e., the amount of electrical energy that needs to be delivered to the consumers at time step k) and $res_{energy,produce,k-1week}$ is the corresponding amount of electrical energy to be produced and transmitted at time step k−1 week.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the systems and methods as shown in the various exemplary embodiments is illustrative only. Additionally, any element disclosed in one embodiment may be incorporated or utilized with any other embodiment disclosed herein.

What is claimed is:

1. A method for controlling production of one or more refined resources by an energy provider, the method comprising:
    performing an optimization of an objective function subject to a constraint to determine an amount of the refined resources for the energy provider to produce and a value of an incentive at a plurality of times within a time period, wherein the amount of the refined resources for the energy provider to produce and the value of the incentive are decision variables in the optimization and provided as outputs of the optimization, and wherein the constraint defines a relationship between a predicted demand for the refined resources by one or more consumers of the refined resources and the value of the incentive;
    offering the incentive at the value determined by performing the optimization to the one or more consumers of the refined resources; and
    providing setpoints for equipment of the energy provider that cause the equipment to produce the amount of the refined resources determined by performing the optimization.

2. The method of claim 1, wherein the relationship between the predicted demand for the one or more refined resources by the one or more consumers of the refined resources and a value of incentive models and predicts energy consumption behaviors of the one or more consumers of the refined resources for a plurality of different values of the incentive.

3. The method of claim 1, wherein the incentive comprises a monetary award provided from the energy provider to the consumers of the refined resources in exchange for the consumers of the refined resources reducing the demand for the refined resources.

4. The method of claim 1, wherein the objective function accounts for an incentive cost predicted to be incurred by the energy provider as a result of offering the incentive, the incentive cost based on the value of the incentive at the plurality of times within the time period.

5. The method of claim 1, wherein the objective function accounts for a raw resource cost of raw resources consumed by the energy provider to produce the refined resources, the raw resource cost based on a time-varying price of the raw resources over the time period.

6. The method of claim 1, wherein the objective function accounts for a refined resource revenue gained by the energy provider in exchange for providing the refined resources to the consumers of the refined resources.

7. The method of claim 1, wherein the constraint requires the amount of the refined resources for the energy provider to produce to meet or exceed the demand for the refined resources by the consumers of the refined resources.

8. The method of claim 1, wherein the constraint requires the amount of the refined resources for the energy provider to produce to be equal to a summation comprising:
    the demand for the refined resources by the consumers of the refined resources; and
    an amount of the refined resources to be stored in one or more resource storage devices.

9. The method of claim 1, wherein providing setpoints for the equipment of the energy provider comprises operating the equipment of the energy provider to produce the amount of the refined resources determined by performing the optimization.

10. A system for controlling production of one or more refined resources by an energy provider, the system comprising one or more processing circuits configured to:

perform an optimization of an objective function subject to a constraint to determine an amount of the refined resources for the energy provider to produce and a value of an incentive at a plurality of times within a time period, wherein the amount of the refined resources for the energy provider to produce and the value of the incentive are decision variables in the optimization and provided as outputs of the optimization, and wherein the constrain defines a relationship between a predicted demand for the refined resources by one or more consumers of the refined resources and the value of the incentive;

offering the incentive at the value determined by performing the optimization to the one or more consumers of the refined resources; and provide setpoints for equipment of the energy provider that cause the equipment to produce the amount of the refined resources determined by performing the optimization.

11. The system of claim 10, wherein the relationship between the predicted demand for the one or more refined resources by the one or more consumers of the refined resources and a value of incentive models and predicts energy consumption behaviors of the one or more consumers of the refined resources for a plurality of different values of the incentive.

12. The system of claim 10, wherein the incentive comprises a monetary award provided from the energy provider to the consumers of the refined resources in exchange for the consumers of the refined resources reducing the demand for the refined resources.

13. The system of claim 10, wherein the objective function accounts for an incentive cost predicted to be incurred by the energy provider as a result of offering the incentive, the incentive cost based on the value of the incentive at the plurality of times within the time period.

14. The system of claim 10, wherein the objective function accounts for a raw resource cost of raw resources consumed by the energy provider to produce the refined resources, the raw resource cost based on a time-varying price of raw resources over the time period.

15. The system of claim 10, wherein the objective function accounts for a refined resource revenue gained by the energy provider in exchange for providing the refined resources to the consumers of the refined resources.

16. The system of claim 10, wherein the constraint requires the amount of the refined resources for the energy provider to produce to meet or exceed the demand for the refined resources by the consumers of the refined resources.

17. The system of claim 10, wherein the constraint requires the amount of the refined resources for the energy provider to produce to be equal to a summation comprising:

the demand for the refined resources by the consumers of the raw resources; and an amount of the refined resources to be stored in one or more resource storage devices.

18. The system of claim 10, wherein the one or more processing circuits are configured to operate the equipment of the energy provider to produce the amount of the refined resources determined by performing the optimization.

19. A method for controlling production of one or more refined resources by an energy provider, the method comprising:

determining an amount of the refined resources for the energy provider to produce and a value of the incentive at a plurality of times within a time period based on a constraint, wherein the amount of the refined resources for the energy provider to produce and the value of the incentive are decision variables in an optimization and provided as outputs of the optimization, and wherein the constraint defines a relationship between a predicted demand for the refined resources by one or more consumers of the refined resources and the value of the incentive;

offering the incentive at the value determined by performing the optimization to the one or more consumers of the refined resources; and providing setpoints for equipment of the energy provider that cause the equipment to produce the amount of the refined resources determined by performing the optimization.

20. The method of claim 19, wherein the relationship between the predicted demand for the one or more refined resources by the one or more consumers of the refined resources and a value of incentive models and predicts energy consumption behaviors of the one or more consumers of the refined resources for a plurality of different values of the incentive.

* * * * *